United States Patent [19]
Jam et al.

[11] Patent Number: 5,787,483
[45] Date of Patent: Jul. 28, 1998

[54] HIGH-SPEED DATA COMMUNICATIONS MODEM

[75] Inventors: Mehrban Jam, Fremont; Ran-Fun Chiu, Los Altos, both of Calif.

[73] Assignee: Hewlett-Packard Company, Palo Alto, Calif.

[21] Appl. No.: 532,923

[22] Filed: Sep. 22, 1995

[51] Int. Cl.$^6$ .................................................. G06F 12/00
[52] U.S. Cl. ........................... 711/158; 711/109; 711/169; 711/211; 711/151
[58] Field of Search ................. 379/98; 375/222; 348/10, 12, 7; 370/397

[56] References Cited

U.S. PATENT DOCUMENTS

| | | | |
|---|---|---|---|
| 4,514,825 | 4/1985 | Nordling | 379/98 |
| 4,521,891 | 6/1985 | Biba et al. | 375/222 |
| 4,553,161 | 11/1985 | Citta | 348/10 |
| 5,155,590 | 10/1992 | Beyers, II et al. | 348/12 |
| 5,488,412 | 1/1996 | Mejeti et al. | 348/10 |
| 5,534,913 | 7/1996 | Mejeti et al. | 348/7 |
| 5,544,164 | 8/1996 | Baran | 370/397 |

*Primary Examiner*—Tod R. Swann
*Assistant Examiner*—Fred Fei Tzeng

[57] ABSTRACT

A computer network for high-speed data communication, has a data transmission cable with a root and at least one leaf node. A signal conversion system (SCS) is attached to the root, and at least one client station is attached to a leaf node. The SCS consists of a transmitter that transmits down-stream data onto said cable in a first frequency band; and a receiver that receives data from said client stations on a second frequency band; wherein said down-stream data includes synchronization and acknowledgement signals. Each client station has a receiver that receives data on said first frequency band, and a transmitter that transmits data on a second frequency band according to synchronization signals received on said first frequency band.

The computer network is controlled by a method comprising transmitting down-stream from the signal conversion system (SCS) a control signal having synchronization information on a first frequency band, receiving said control signal at client stations, transmitting up-stream from said client stations to said SCS on a second frequency band, the transmission being timed with respect to said synchronization information, and acknowledging on said first frequency band successful receipt by said SCS of said up-stream transmission.

The client station's transmission packets may include requests for reserved slots on said second frequency band for subsequent transmissions, and the SCS has a scheduler operable to determine a start time for requested reserved slots, and transmits the start time for the requested reserved slots. The client stations are operable to wait to continue transmission until after waiting for the start time.

Other systems and methods are disclosed.

2 Claims, 27 Drawing Sheets

HIGH-SPEED DATA COMMUNICATIONS MODEM

CROSS REFERENCE TO RELATED APPLICATIONS

This application is related to copending application Ser. No. 08/532.918, entitled "High-Speed Data Communications Network System and Method," filed Sep. 22, 1995, commonly assigned with the present invention.

FIELD OF THE INVENTION

The present invention relates to data communication, and more particularly to the two-way communication of data on a cable.

BACKGROUND OF THE INVENTION

Formerly, computer networks were in the province of academia, large research communities, corporations, and governmental agencies. Over time, these networks have evolved to contain many more computer users and uses within their domains. Furthermore, the networks have to a large extent become connected ("internetworked") to form a world wide network of computers known as the Internet and new types of computer networks have become available. Thus, it has become more likely than not that a computer is connected to some type of computer network.

A consequence of this ever increasing connectivity of computers is that the amount of information available "on-line" has become huge. For example, as of August, 1995, one popular search tool of information available on the Internet (Lycos http:\\www.lycos.com) contained an index of 5.6 million web-pages. Similarly, the on-line services, such as America Online, Compuserve, and Prodigy, compete based on the amount of information available through their particular services.

While information distribution is an important use of computer networks, computer connectivity provides many other valuable services. One example is electronic mail. Another is electronic commerce.

For all these reasons, it has become generally recognized that while in the past it was true that being connected to a network or an on-line service could provide a competitive advantage, in modern business and for the sake of education, it has become a necessity.

Many users of on-line services and the Internet connect to these networks via modems and conventional telephone lines. While this is adequate for some uses, it is undesirable for others. It is has the advantage of providing a dedicated connection between a user and a computer to which that user is connected. And it makes use of a connection line, the telephone line, which most households and offices are already connected to. By providing a dedicated connection to the user, there is no need for resolving collisions between users who attempt to access the network simultaneously. All such conflicts are resolved at the computer to which the multiple users are connected. (Of course, if that computer is connected to other computers on shared lines, conflicts between these computers must be resolved).

However, telephone lines are a less than ideal way of connecting computers. First, there is the obvious drawback that in a home-computing environment, a home may be equipped with only one telephone line. Thus, extended on-line use would tie-up the telephone line, which might be needed for other uses. There are also technical problems with telephone lines. These lines are intended for voice communication having a transmission band-width limited to 3.2 KHz. As a consequence, digital communication over telephone lines is of a relatively low bit rate. Typically, a modem modem connecting a personal computer to a telephone line is limited to 28.8 kbps.

It is therefore desirable to provide alternative technologies for connecting home computers to computer networks.

One type of technology that increases the band-width for connections of home computers and small-office computers to computer networks is ISDN lines. These are dedicated lines intended for digital communication between computers. ISDN has much higher band-width than telephone lines. However, most homes and small-offices are not equipped with ISDN lines and few are prepared to take on the expense of having ISDN installed.

A technology that has made its way to most homes and small-offices is cable tv networks. Unlike telephone networks, which provide dedicated lines to each home, in cable tv systems all subscribers in a neighborhood share the cable. However, there is much greater band-width available, as compared to telephone lines, on the cables used by most cable tv systems.

For these reasons it is desirable to provide two-way data communication between home/small-office computers and computer networks over existing cable tv systems.

Because all the cable tv subscribers in one neighborhood share one cable, there is a possibility that multiple computers connected to such a network would simultaneously transmit data on that cable. Such concurrent transmission would result in garbled data and neither transmitter's message would be successfully received by the intended recipient, unless there is a mechanism for avoiding or resolving such contention problems.

The problem of avoiding contentions on shared computer networks have been addressed in a variety of ways. One early approach is known as the ALOHA system.

ALOHA originated at the University of Hawaii and was initially primarily used for communication using broadcast radio. The communication over a shared cable is also a broadcasting system in that all stations attached to the cable receive any signal that is transmitted over that cable.

ALOHA's basic principle is to allow every user who shares the common channel to broadcast a message at any given point in time. The transmitting user then listens to the channel for its own message. If the message is not received (by the user who sent it), the user knows that the message must for some reason have become destroyed. Very likely, the message was destroyed by another message simultaneously sent by another user. To resolve this contention for the common channel both users "back-off" a random amount of time before resending the message. Thus, if two users attempt to send a message at time t, their respective messages would become destroyed. By backing off random amounts of time, the first user would resend its message at t+r1 and the second user its message at t+r2. If r1 and r2 are different (which they should usually be if they are truly randomly selected), there should be no conflict between the two messages the second time they are sent.

A drawback to ALOHA is that the likelihood of contention is very high. The channel efficiency rate for ALOHA is a mere 18%.

One improvement of ALOHA is slotted-ALOHA. In slotted-ALOHA, time is divided into specified intervals and messages may only be sent during these intervals, i.e., no message is allowed to span over interval boundaries. The channel efficiency of slotted-ALOHA is 38%.

For a discussion of ALOHA, slotted-ALOHA and the derivation of the channel efficiency rates see, Tanenbaum, Andrew, *Computer Networks*, second edition, Prentice-Hall, pp. 121–124.

Current solutions for data communication on Cable TV systems include LANMCN-AT of Zenith Corporation and LCP of LANcity Corporation, Andover, Mass. These products share a common design philosophy. In both, the upstream data, i.e., the data transmitted from the end-user to the cable system head-end, is transmitted through the lower band of the broadcast spectrum (below the frequency bands dedicated for downstream data). This upstream data is manipulated in one of two ways. The first alternative is to frequency translate to a higher band of the spectrum, and the second is to demodulate the data. The manipulated data is then retransmitted on the high-band. All modems, including the modem at the head-end site, transmit on the low band. The transmitted data is either frequency translated or demodulated. All modems, then, receive on the high band.

The upstream data and downstream data have the same bandwidth and data rate. In fact, because the modem at the head-end is treated like all other modems in the system, there is no distinction between upstream and downstream data.

There are several problems with this type of solution for digital data communication on a cable TV cable. First, the transmission characteristics of the downstream band differs from that of the upstream band. The upstream band (low band) is much noisier than the downstream band. To achieve the same data rate in both bands, the downstream band is made to conform to the upstream band. Thus, the method fails to achieve the full data rate potential of the downstream band.

Second, in most cases the upstream data is intended for a remote server and not for a peer end-user. Therefore, retransmitting the data on the downstream band wastes downstream band width.

Therefore it would be desirable to provide a high-speed data communication system, with a high efficiency rate, that utilize a shared cable, and that fully utilizes the available bandwidth of the transmission cable.

Other advantages and features of the invention will be made apparent in connection with the following detailed description.

SUMMARY

It is an object of the invention to provide high-speed two-way video, audio, and data communication on a network of computers connected by one cable.

It is a further object of the invention to provide a reservation system to allow client stations in a network to communicate with a signal conversion system.

It is a further object of the invention to provide a system for high-speed data communication in which several devices access a shared memory in parallel.

An additional object of the invention is to allow parallel devices access to a shared memory at an average throughput of one memory access per clock cycle.

These and other objects are achieved by providing a computer network for high-speed data communication, having a data transmission cable with a root and at least one leaf node. A signal conversion system (SCS) is attached to the root, and at least one client station is attached to a leaf node. The SCS consists of a transmitter that transmits down-stream data onto said cable in a first frequency band; and a receiver that receives data from said client stations on a second frequency band; wherein said down-stream data includes synchronization and acknowledgement signals. Each client station has a receiver that receives data on said first frequency band, and a transmitter that transmits data on a second frequency band according to synchronization signals received on said first frequency band.

The computer network follows the steps of a method comprising transmitting down-stream from the signal conversion system (SCS) a control signal having synchronization information on a first frequency band, receiving said control signal at client stations, transmitting up-stream from said client stations to said SCS on a second frequency band, the transmission being timed with respect to said synchronization information, and acknowledging on said first frequency band successful receipt by said SCS of said up-stream transmission.

The client station's transmission packets may include requests for reserved slots on said second frequency band for subsequent transmissions, and the SCS has a scheduler operable to determine a start time for requested reserved slots, and transmits the start time for the requested reserved slots. A client station that has requested reserved slots waits continue its transmission until that start time.

DETAILED DESCRIPTION OF THE PREFERRED EMBODIMENTS

Figure 1:
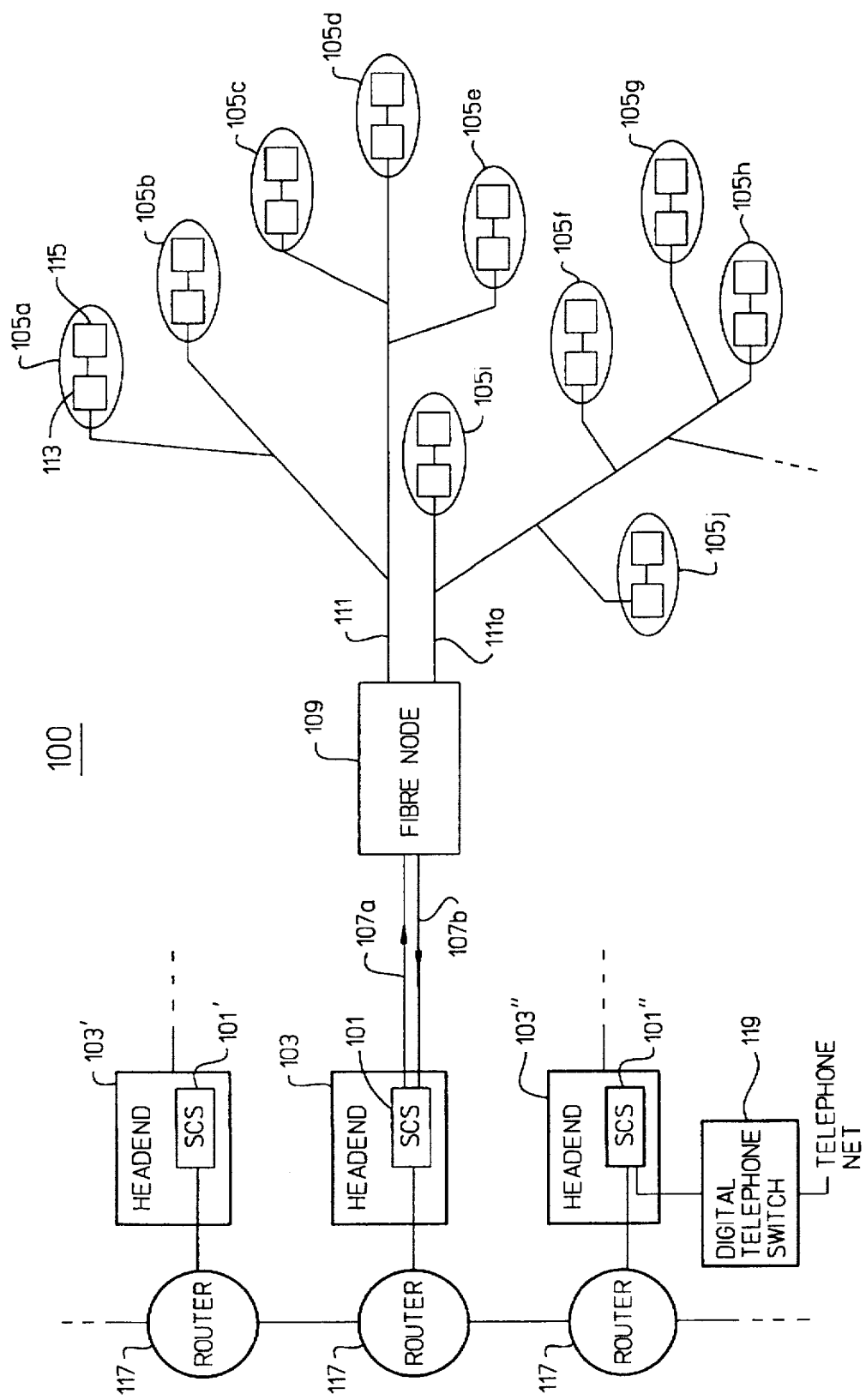
FIG. 1 is an illustration of a neighborhood cable tv system adapted according to the present invention to provide data-communication between a Signal Conversion System (SCS) located at the head-end and client stations located at the subscriber locations.

FIG. 1 is an illustration of a neighborhood cable tv system 100 adapted according to the present invention to provide data-communication between Signal Conversion System (SCS) 101 located at a head-end 103 and client stations 105a–j located at subscriber locations. Each SCS 101 is connected to a packet router 117 that routes data packets to and from remote server stations. In an alternative connection scheme, an SCS 101, e.g., 101", interfaces locally or remotely to a circuit switcher 119 for circuit switched constant bit rate services. The latter may be used to provide a digitized voice connection to a telephone network.

In many cable tv systems about 500 to 2000 subscribers are attached to the same headend 103. The headend 103 communicates with the various subscriber locations 105 via optic fibre cables 107a and 107b connected to a fibre node 109. The fibre node 109 is further attached via coaxial cables 111a and 111b. The fibre node 109 contains a mechanism for converting between optical and electrical signals. The communication between a router 117 and an SCSs 101 is digital. However, the communication between the headend 103 and the subscriber locations is in an analog form.

The SCS 101 converts the digital communications signals between routers 117 and the analog communications that occur on the optic fibre and coaxial cables of a Cable TV system.

Each client station 105 contains a Cable modem 113 connected to a computer 115. In alternative embodiments the computer 115 is substituted with other devices that would benefit from data communication with the headend 103 over the cable 111. Examples, of such alternatives include set-top boxes for making requests for particular cable tv operations, e.g., video-on-demand type services, and interactive television.

Figure 2:
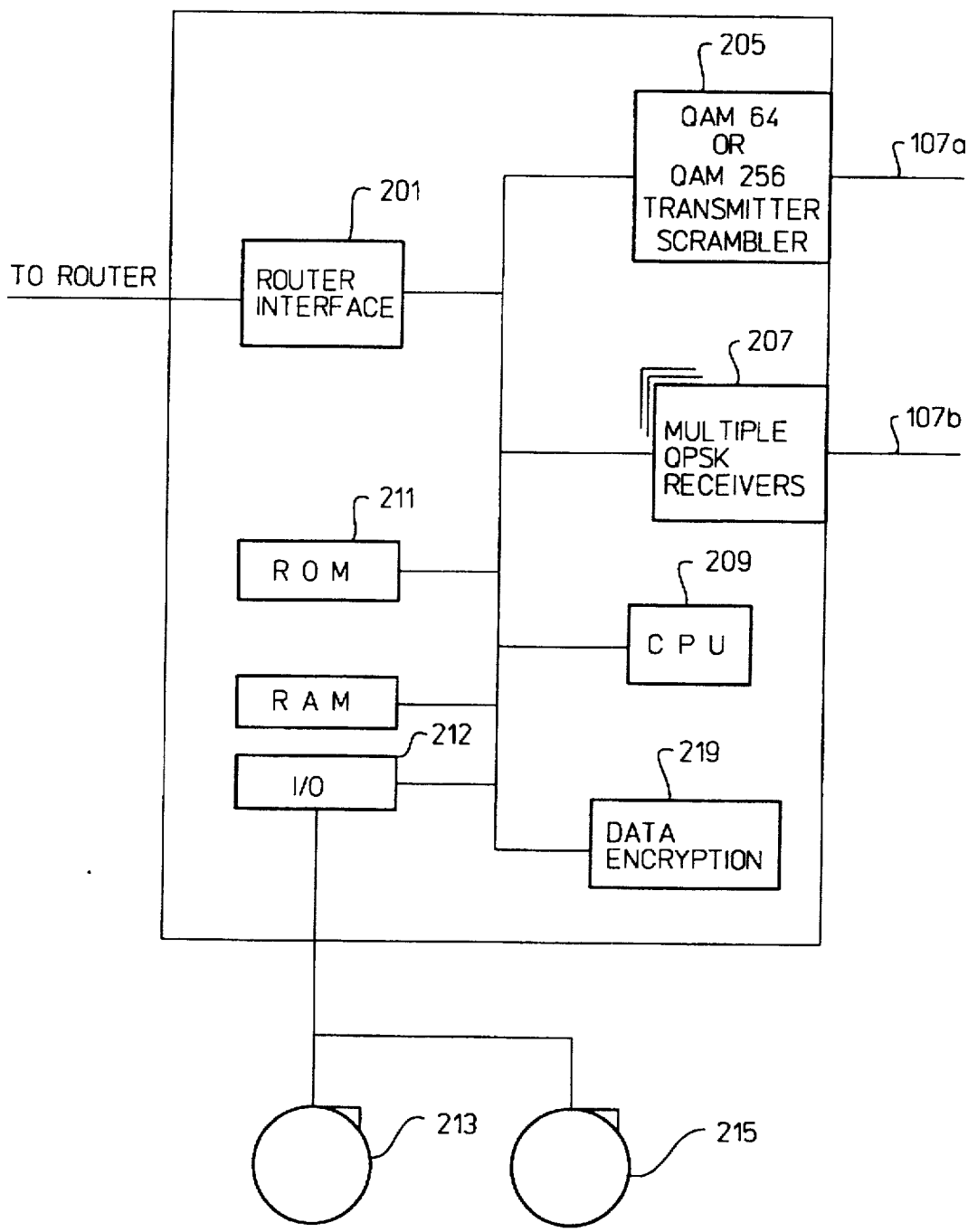
FIG. 2 is a schematic of Signal Conversion System (SCS) according to the present invention.

FIG. 2 is a block diagram of the Signal Conversion System (SCS) 101. The Signal Conversion System (SCS) 101 is attached to the fibre cables 107a and 107b. Using a transmitter 205 the SCS 101 transmits data using 64-QAM (64 bit Quadrature Amplitude Modulation) or 256-QAM (256 bit QAM) transmission format onto the fibre cable 107a. Using multiple receiver 207, the SCS 101 receives QPSK data on several channels on the fibre cable 107b. Both transmitter 205 and receiver 207 are connected to a SCS bus 203.

The SCS 101 contains a router interface 201 that is connected to a router 117. The ROUTER interface 201 receives and transmits digital data packets, for example internet protocol (IP) packets, or ATM cells, to the router 117. The ROUTER interface 201 is connected to the internal bus 203 for transferring data to and from other components of the SCS 101.

A Central Processing Unit (CPU) 209 manages the conversion of data between 64-QAM, QPSK, and the digital packet format of the router interface 201. The CPU 209 also directs data traffic on the bus 203. Furthermore, much of the data transmitted and received on cables 107a and 107b require extensive processing and formatting. The CPU 209 is responsible for this processing and formatting. Many of the procedures for controlling the operation of the CPU 209 are stored in a ROM 211 connected to the bus 203. A RAM 213 for storing data during processing and retransmission is further connected to the bus 203. Other procedures for controlling the operation of the SCS 101 and its components such as CPU 209 are stored in secondary storage devices 213 and 215, both connected to the bus 203 via an I/O unit 217.

In many instances data transmitted to and from the SCS via cables 107a and 107b are encrypted. The CPU 209 calls upon a data encryption device 219 to execute the encryption and decryption tasks. In a preferred embodiment the SCS uses the Data Encryption Standard DES for encryption.

Figure 3:
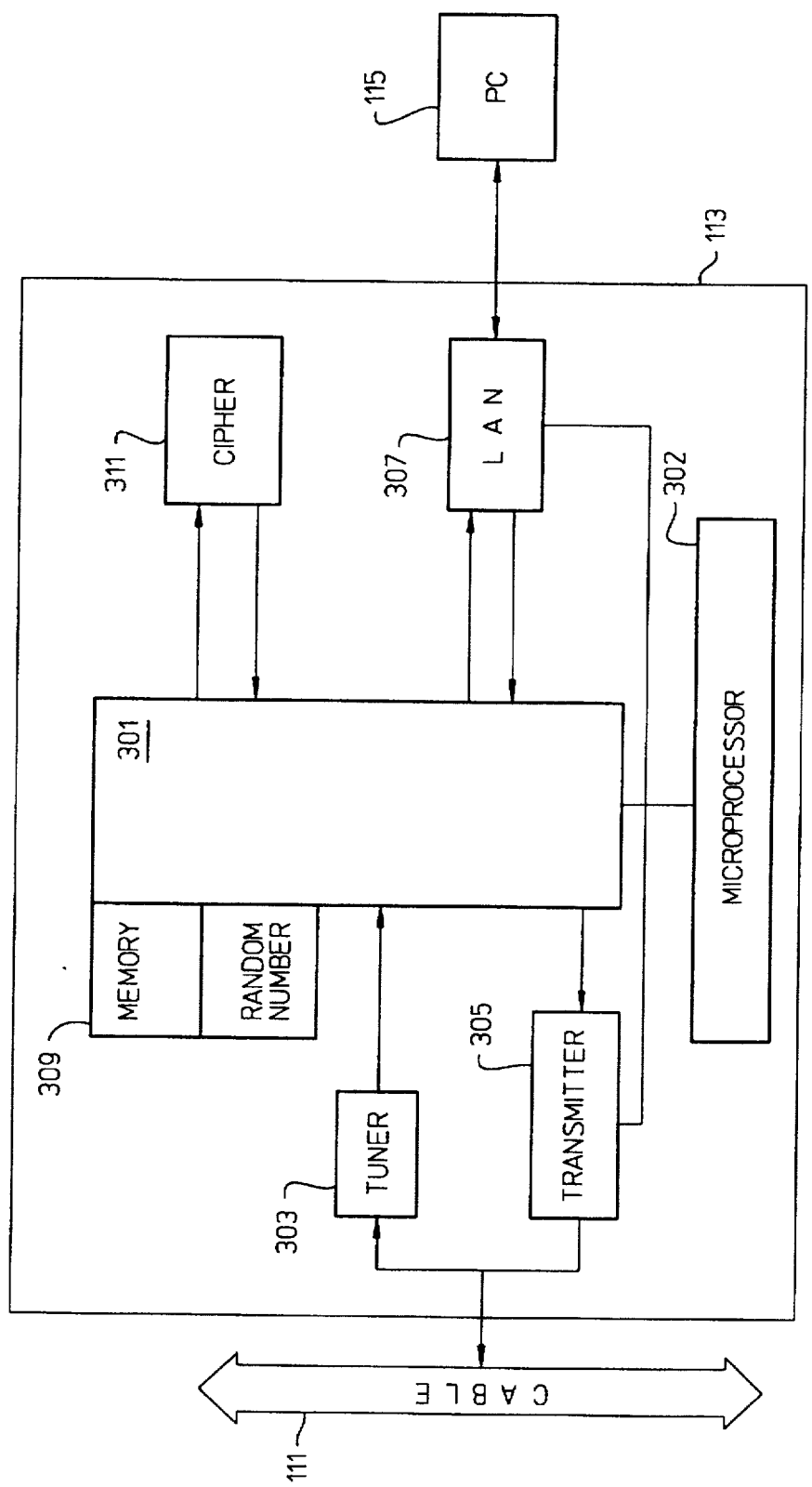
FIG. 3 is a high-level schematic of a cable modem used in accordance with the cable tv system of FIG. 1.

FIG. 3 is a high-level schematic diagram of the cable modem (CM) 113 connected to a cable 111 and a personal computer (PC) 115. The CM 113 receives data signals from the cable into a tuner 303 and transmits data signals onto the cable by a transmitter 305. In the preferred embodiment, the tuner 303 is a 64-QAM receiver and the transmitter is a QPSK transmitter.

At a high-level of description, the CM 113 is responsible for filtering signals transmitted between the PC 115 and the cable 111, for encrypting/decrypting these signals (as necessary), for buffering data, and for translating between the communication protocol for on-cable transmissions and the communication protocol for modem-to-PC transmissions. These and other functions (as discussed below) are accomplished by a variety of component circuits. The heart of the CM 113 is a control circuit 301. The control circuit 301 is connected to the other component circuits, and with the aid of a microprocessor 302 controls timing, and device sharing among the various other component circuits.

The communication between the CM 113 and the PC 115 is accomplished by a local area network (LAN) transceiver circuit 307. The LAN circuit is connected to the control circuit 301. In the preferred embodiment, the particular i/o interface between the CM 113 and the PC 115 uses the 10-baseT protocol, but other modem-to-PC protocols are acceptable alternatives. In alternative embodiments, other LAN protocols, such as Hewlett-Packard Company's 100BaseVG protocol may be used.

Information transmitted between the PC 115 and the cable 111 are buffered in the cable modem in a random access memory 309 connected to the control circuit 301. As discussed below, communication between the CM 113 and the cable system is subject to collision with messages being sent by other client stations 105. Furthermore, collisions are avoided by using a reservation system. The collision handling and reservation system is transparent to the PC 115. Therefore, while waiting to be transmitted a message is buffered in the RAM 309. Furthermore, additional processing of an incoming or outgoing message is required by the CM 113 prior to retransmission to the cable 111 or the PC 115, respectively. Such processing includes encryption and decryption. The encryption/decryption is executed by a cipher circuit 311 connected to the control circuit 301.

Communication over the cable 111 is possible by using frequency multiplexing techniques over a frequency range from 5 MHz to 750 MHz. Standard tv channels are usually transmitted in the above 50 MHz range. Each such channel is 6 MHz wide. Typically the below 50 MHz frequencies are unstructured and very noisy. In the preferred embodiment, up-stream communication (communication from the CM 113 to the SCS 101) occur on a 2 MHz wide frequency band in the 5 to 42 MHz frequency spectrum, and down-stream communication (from the SCS 101 to the CM 113) occur on a standard 6 MHz wide tv channel in the 50 MHz and above range, and is referred to hereinafter as the down-stream channel. Thus, the 5 to 42 Mhz band serves as the spectrum in which a communication channel from the client stations 105 to the SCS 101 can be selected and the band above 50 MHz serves as the spectrum from which communication channels from the SCS 101 to the client stations 105 can be selected.

Alternative embodiments provide for multiple communication channels in each direction. Such alternatives are natural extensions of the described preferred embodiment and are within the scope of the present invention. For illustrative purposes, the present invention is described in the context of the one-channel per direction embodiment. However, a person skilled in the art will realize how to apply the invention to the multiple-channel alternatives.

Figure 4:
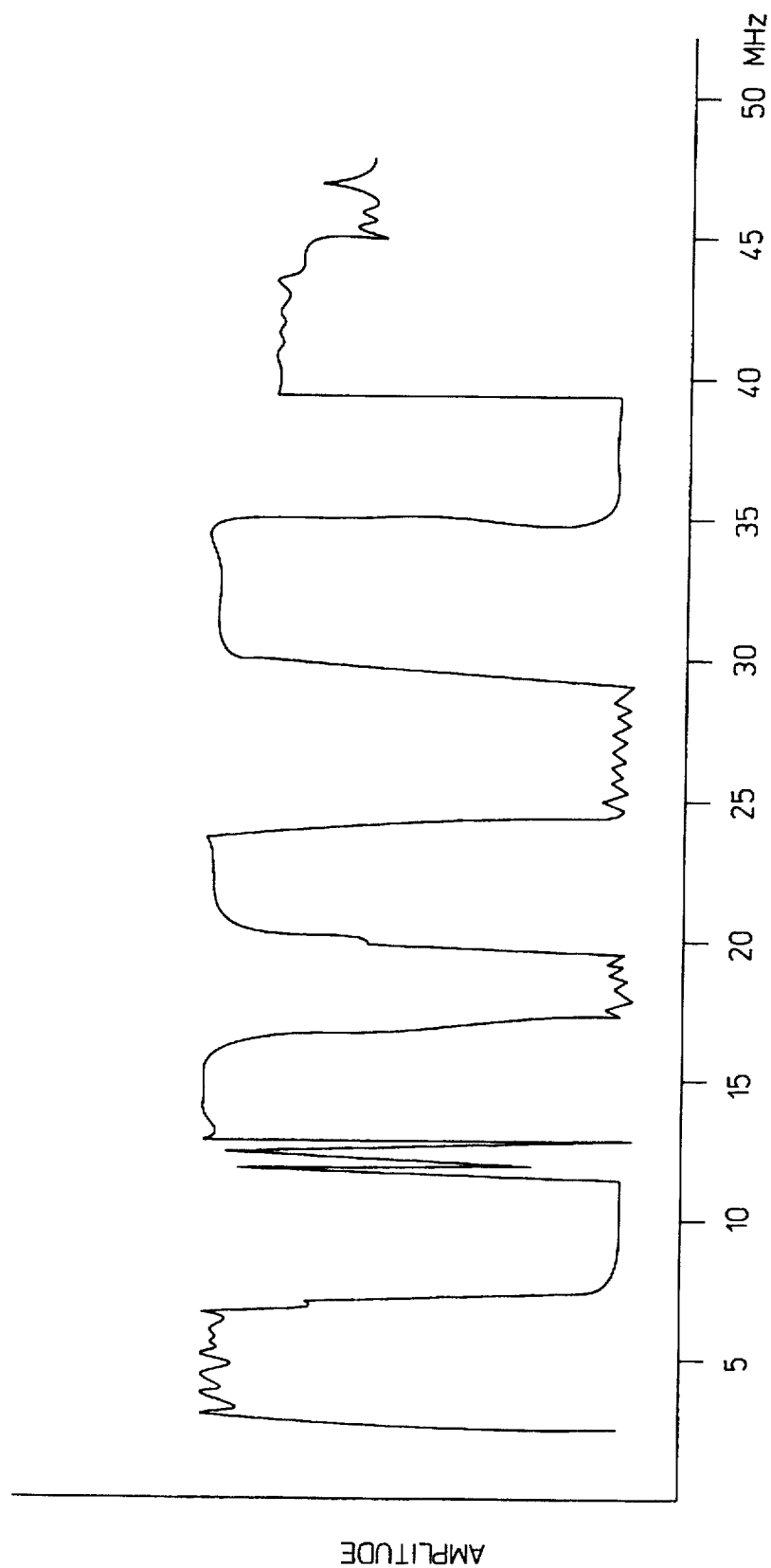
FIG. 4 is a graph showing an example of amplitudes versus frequency for a portion of the frequency spectrum for a cable tv cable.

FIG. 4 is a graphical example of signals transmitted below 50 MHz. As can be seen in this example, there are some regions with very little activity, e.g., between 8 and 12 MHz, 15 and 20 MHz, 23 and 27 MHz, and 31 and 37 MHz. Other areas are very noisy. The Signal Conversion System (SCS) 101 continuously monitors the 5 to 42 MHz frequency band to locate 2 MHz-wide bands that are not noisy. After having located such a band, the Signal Conversion System (SCS) 101 broadcasts the frequency (e.g., the center or beginning) of the 2 MHz band to the client stations 105. This 2 MHz band is used by the client stations 105 to transmit data to the Signal Conversion System (SCS) 101, and will hereinafter be referred to as the "up-stream channel". In the multiple-channel alternative embodiment, the Signal Conversion System (SCS) 101 locates more than one 2 MHz wide band with low activity and broadcasts the frequency of each such band.

In the preferred embodiment down-stream communication uses 64-QAM. In 64-QAM six bits per symbol of data is broadcast simultaneously. In the present invention one of those bits is used for control information and the remaining five bits are payload data. The control bit is referred to hereinafter as the "control channel".

Figure 5:
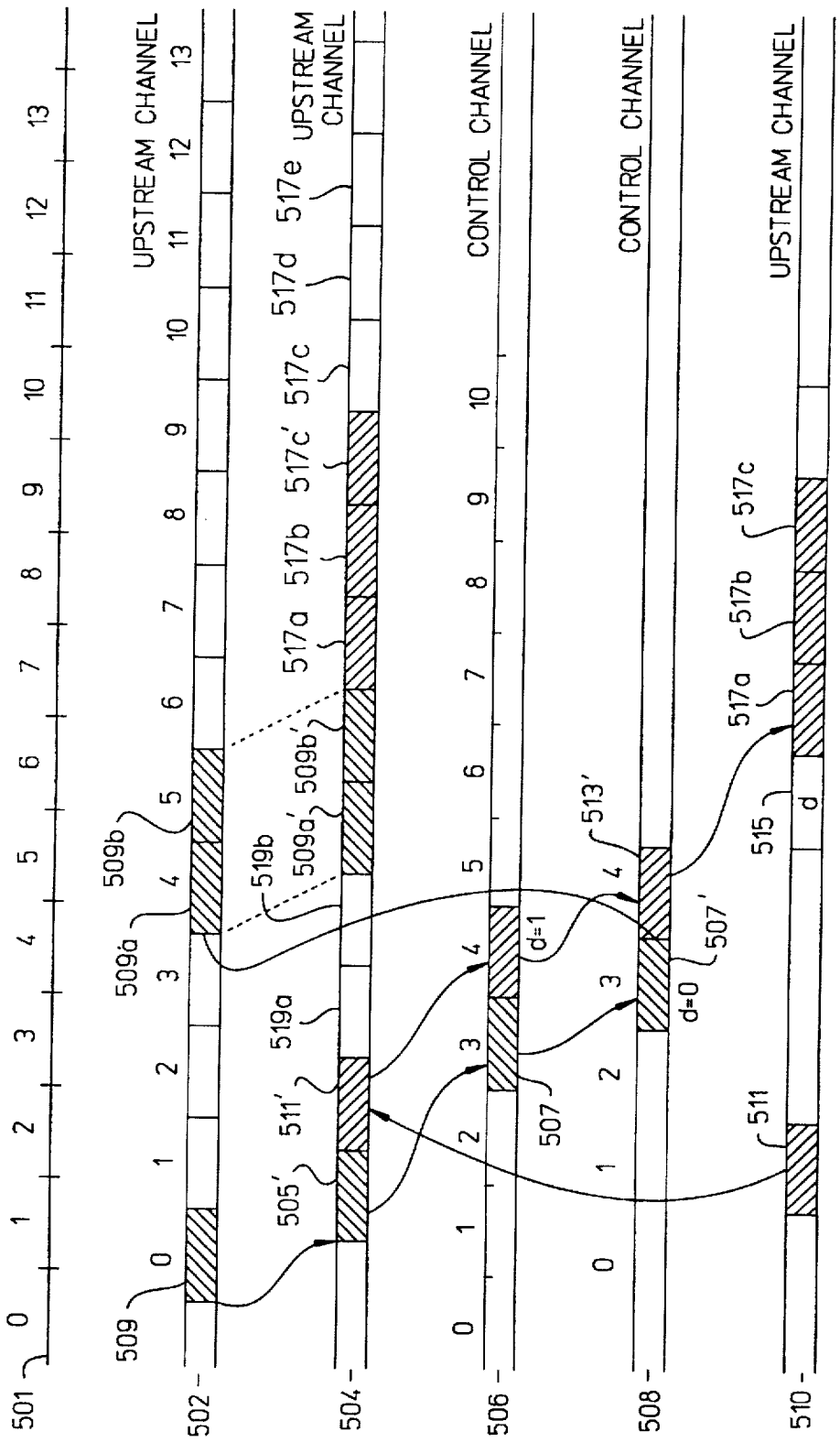
FIG. 5 is an illustration of exemplary activity on the down-stream channel and up-stream channel.

FIG. 5 is an illustration of exemplary activity on the down-stream channel and up-stream channel. For up-stream communication time is divided into even-length intervals called slots. Each slot is identified by a number. Slot numbers are sequential and range from 0 to a Maximum__Count with the slot number reset to 0 after the Maximum__Count is reached. In the preferred embodiment the Maximum__Count is less than 32. Other embodiments would allow larger Maximum__Count values. The Maximum__Count is programmable by the SCS. In the illustration of FIG. 5, 14 slots (0 through 13) are illustrated by time line 501. The slot boundaries of time line 501 are with respect to the Signal Conversion System (SCS) 101. Because there are time delays associated with the propagation of data along the cable, the various client stations 105 will communicate and receive data at different boundaries.

The length of each time slot is represented by a fixed number of downstream control channel frames. The number of frames per slot is programmable by the Signal Conversion System (SCS) 101. However, this ratio (frames/slot) remains fixed until reset. The time slot is sized to include the time required to transmit the largest allowed transmission packet upstream during contention and the difference in round-trip propagation delay between the client station 105 nearest to the SCS 101 and the client station 105 furthest away from SCS 101.

Figure 6A:
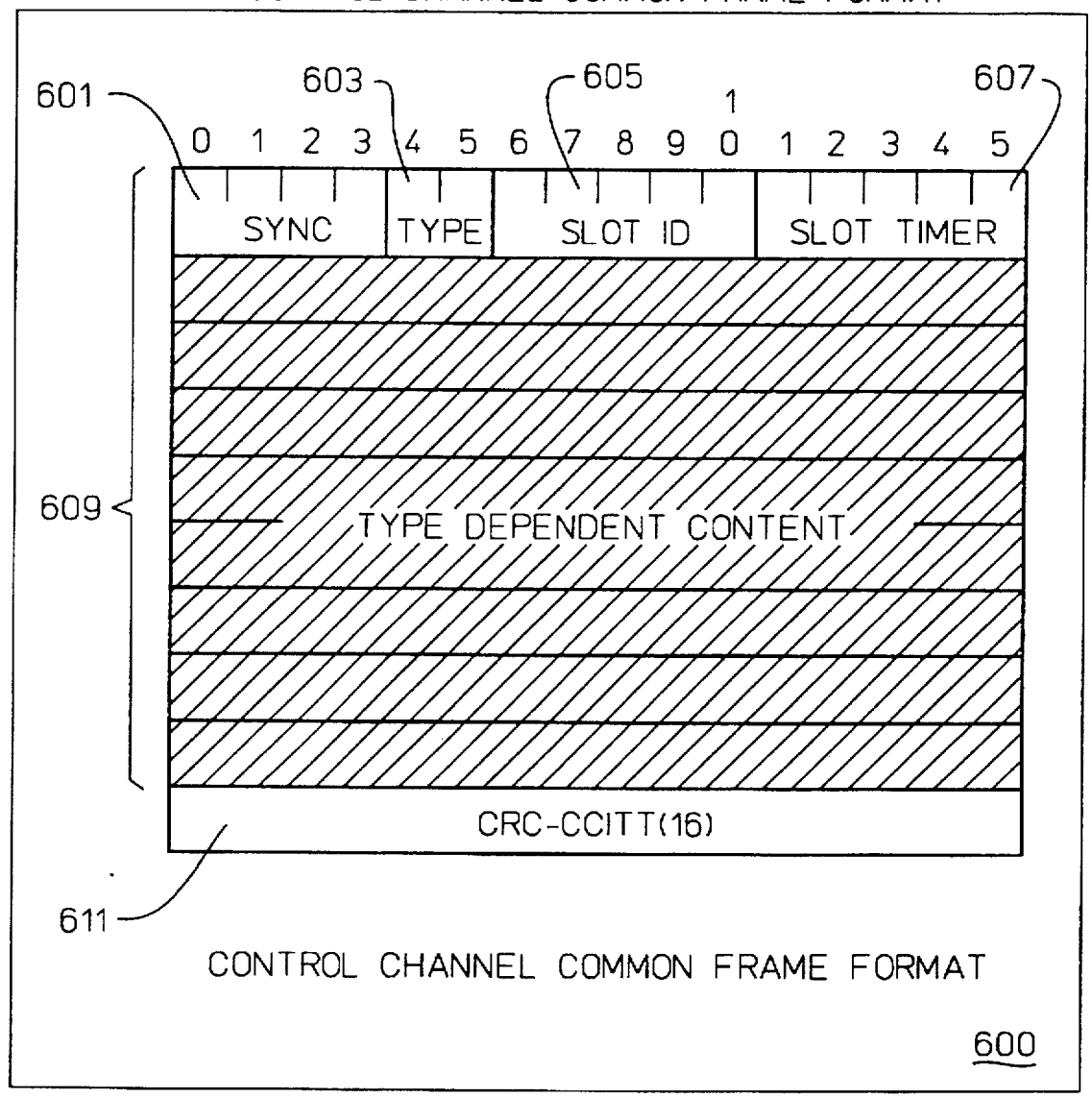
FIG. 6(a) is an block diagram of the common frame format for the downstream control channel.

A control frame is the basic unit of communication between the Signal Conversion System (SCS) 101 and the various client stations 105 in the control channel. In the preferred embodiment a control frame is 20 bytes long. There is a common frame format. FIG. 6(a) is a block diagram of the common frame format. Each frame follows the general structure shown in FIG. 6(a). Each frame starts with a Sync flag 601. The framing of the downstream control channel uses the SYNC flag 601 to denote the beginning of the frame. In the preferred embodiment the SYNC flag has the value "0110", but other bit sequences may be adopted by convention.

In the preferred embodiment there are 4 types of frames: acknowledgment frame, control frame, variable bit rate (VBR) data frame, and constant bit rate (CBR) data frame. The type is identified by the type field 603. Next is a five bit field giving the Slot ID for the frame 605. The maximum value for the Slot ID is programmable by the Signal Conversion System (SCS) 101.

Slots are divided into two classes: contention slots and reserved slots. During a contention slot, all of the client stations 105 or a subset of client stations 105 may transmit onto the up-stream channel. Reserved slots are dedicated to one particular client station 105 and only that particular client 105 may transmit packets of information on the up-stream channel.

In the illustration of FIG. 5, two client stations 105a and 105b compete for time on the upstream channel. Line 502 is an illustration of the transmissions placed on the upstream channel by client station 105a, line 504 is an illustration of the reception of messages on the upstream channel by the Signal Conversion System (SCS) 101, line 506 is an illustration of the transmissions placed on the control channel by the Signal Conversion System (SCS) 101, line 508 is an illustration of the reception of messages on the control channel by the client stations 105a and 105b, and line 510 is an illustration messages placed on the upstream channel by the client station 105b.

The messages sent out by the Signal Conversion System (SCS) 101 sets the beat for upstream transmissions. During contention slots, all transmissions are done such that a transmission packet is communicated in its entirety within a slot. However, during reserved slots, a packet of data may cross slot boundaries. The client stations 105 monitors the control channel to find out when slots begin and end. Because of transmission delays, these slot boundaries are perceived to be at different times by the various client stations 105, depending on distance from the Signal Conversion System (SCS) 101.

In line 502 of FIG. 5 client station 105a sends in time slot 0 a request 505. Because of the propagation delay, from the perspective of the Signal Conversion System (SCS) 101, the client station 105a commences the transmission part of the way into time-slot 0.

In the following discussion, for illustrative purposes, packets of data are shown as consuming entire time-slots. In reality a packet consumes less than a time-slot and the time-slots are sized such as to allow for propagation delays. Packets of information are indicated as the received version of a packet sent by another station by using the same reference numeral suffixed with an apostrophe, e.g., a client station may send a packet 505, when received, it is shown as packet 505'.

Line 504 is an illustration of the view of the up-stream channel from the perspective of the Signal Conversion System (SCS) 101. Again, because of the propagation delay, the Signal Conversion System (SCS) 101 receives the packet 505 at a time later than when it was sent, as is indicated by packet 505'. The Signal Conversion System (SCS) 101 then processes the packet 505. A packet of data sent from the client station 105 may be self-contained, i.e., it is a complete communication of information to the Signal Conversion System (SCS) 101. But, because sometimes a client station 105 desires to transmit more information than will fit in one packet, i.e., more than what can be transmitted in one time slot, an initial packet sent from a client station 105 may include a request to reserve additional future slots for transmission of the balance of the communication. In the example of FIG. 5, client station 105a desires to transmit information that will span a total of three time slots. Therefore, the initial packet 505 includes a reservation request for two additional dedicated time slots.

In processing the request, the Signal Conversion System (SCS) 101 allocates two future time slots for client station 105a. Line 506 is an illustration of the control channel, from the perspective of the Signal Conversion System (SCS) 101. Subsequent to the allocation, the Signal Conversion System (SCS) 101 transmits on the control channel an acknowledgment message 507 to the client station 105. The acknowledgment message indicates to the client station 105 that the message has been received and in the case of a reservation request, how many time slots the client station must wait to transmit the balance of the communication. In the example of FIG. 5, no other reservations have been made at the time the Signal Conversion System (SCS) 105 receives the reservation request packet 505 from client station 105a, therefore the client station 105a can commence transmission of the balance of the communication upon receipt of the acknowledgment message in packet 507'. Accordingly, the acknowledgment message packet 507 indicates to the client station 105a that the delay length (the time the client station 105a must wait prior to transmitting the balance) is zero.

Due to the propagation delay, although the client station 105a commenced transmitting packet 505 in time-slot 0, it was not completely received by the Signal Conversion System (SCS) 101 until part of the way into time-slot 2. Because all transmissions are done on time slot boundaries, the Signal Conversion System (SCS) 101 waits until the beginning of time-slot 3 before commencing transmitting the acknowledgment packet 507. Line 508 is an illustration of the control-channel from the perspective of client station 105a. The acknowledgment message packet 507' is received by the client station 105a who recognizes from the message that its reservation request packet 505 has been honored by the Signal Conversion System (SCS) 101 and that its reserved slots are to be transmitted without delay. Therefore, client station 105a transmits on the up-stream channel (as illustrated as line 502) the balance of its communication in packets 509a and 509b.

In the example of FIG. 5, the client station 105b desires to transmit four packets of information. As discussed above, it may send one packet which includes a reservation request for the following three. Accordingly, the client station 105b sends a first reservation request packet 511. The request message packet 511 includes the reservation request for three time-slots.

As shown in line 504 the Signal Conversion System (SCS) 101 receives the request message 511'. In processing the request for the reservation of three additional dedicated time-slots, the Signal Conversion System (SCS) realizes that by the time the client station 105b receives an acknowledgment, the client station 105a will have transmitted the first packet 509a in the balance of its communication, but still needs an additional time slot for the second packet 509b. Therefore, the acknowledgment message packet 513 indicates to client station 105b that its reservation has been accepted and that after it receives the acknowledgment packet 513' it should commence transmitting its balance of packets after a delay of one time slot. This delay is indicated as time slot 515. Following the delay, the client station 105b transmits the balance of three packets 517a, 517b, and 517c on the upstream-channel 510. These are received by the Signal Conversion System (SCS) 101 as packets 517a', 517b', and 517c'.

Any slot that is not specifically reserved is a contention slot. Therefore, in the example, because the first reserved slot is slot number 4, slots 0 through 3 are contention slots. Slots 4 through 8 were reserved by client stations 105a and 105b. However, no reservations were made for slots 9 through 13, which therefore are contention slots.

In the example of FIG. 5, there is no collision during contention slots. A collision between client station 105a and 105b may have occurred at some time before time-slot 0. Each frame contains a checksum. The checksum is a cyclic redundancy check, for example as defined by CCITT X.25.

When a collision occurs the messages become garbled. Therefore, the checksum calculation fails. Whenever the Signal Conversion System (SCS) 101 detects that the checksum calculation has failed, it does not send the acknowledgment message. Hence, neither client station 105 would receive an acknowledgment. The expected time delay between sending a message and receiving the acknowledgment is known (it is the maximum propagation delay plus processing time). Thus, when a client station 105 does not receive the acknowledgment within this expected time, it knows that the transmission failed. Because collisions are a likely source of transmission failure, the collision resolution mechanism of the client station 105 is invoked.

In one embodiment, the collision resolution mechanism of the client stations 105 is similar to the Ethernet scheme. Each of the colliding client stations 105 back-off a random amount of time. At the end of their respective random amounts of time, the client stations 105 again attempt to transmit their respective messages. A random number generator 313 connected to the control circuit 301 calculates a random number used to back-off. In one embodiment, the range for the number of slot times to delay before retransmission is a function of how many attempts to transmit has been made. The number of slot times to delay before the nth retransmission attempt is chosen as a uniformly distributed random integer r in the range:

$$0 \leq r < 2^k$$

where k=min (n, 7)

If a maximum allowed number of retransmit attempts fail, an error condition is reported by the CM 113. In the preferred embodiment the maximum number of retransmit attempts is sixteen.

In an alternative embodiment, collision handling is accomplished by only allowing retransmission from certain groups of modems. On successive retries, a smaller subset of modems are allowed retransmission. In this embodiment, the CMs 113 in the system are arranged in a binary tree. When the SCS 101 detects that it is receiving garbled messages, it sends out messages to turn off certain CMs 113. At first the SCS 101 descends one level from the root of the tree and successively turns off all CMs in the first half of the tree and then reactivates those CMs and turns off the second half. If the SCS 101 still detects collisions, it descends one more level and branch-by-branch successively turns on and off all CMs in a particular branch at that level. The SCS 101 repeats this procedure until either it no longer detects collisions or until it has descended to the leaves of the binary tree.

Figure 6B:
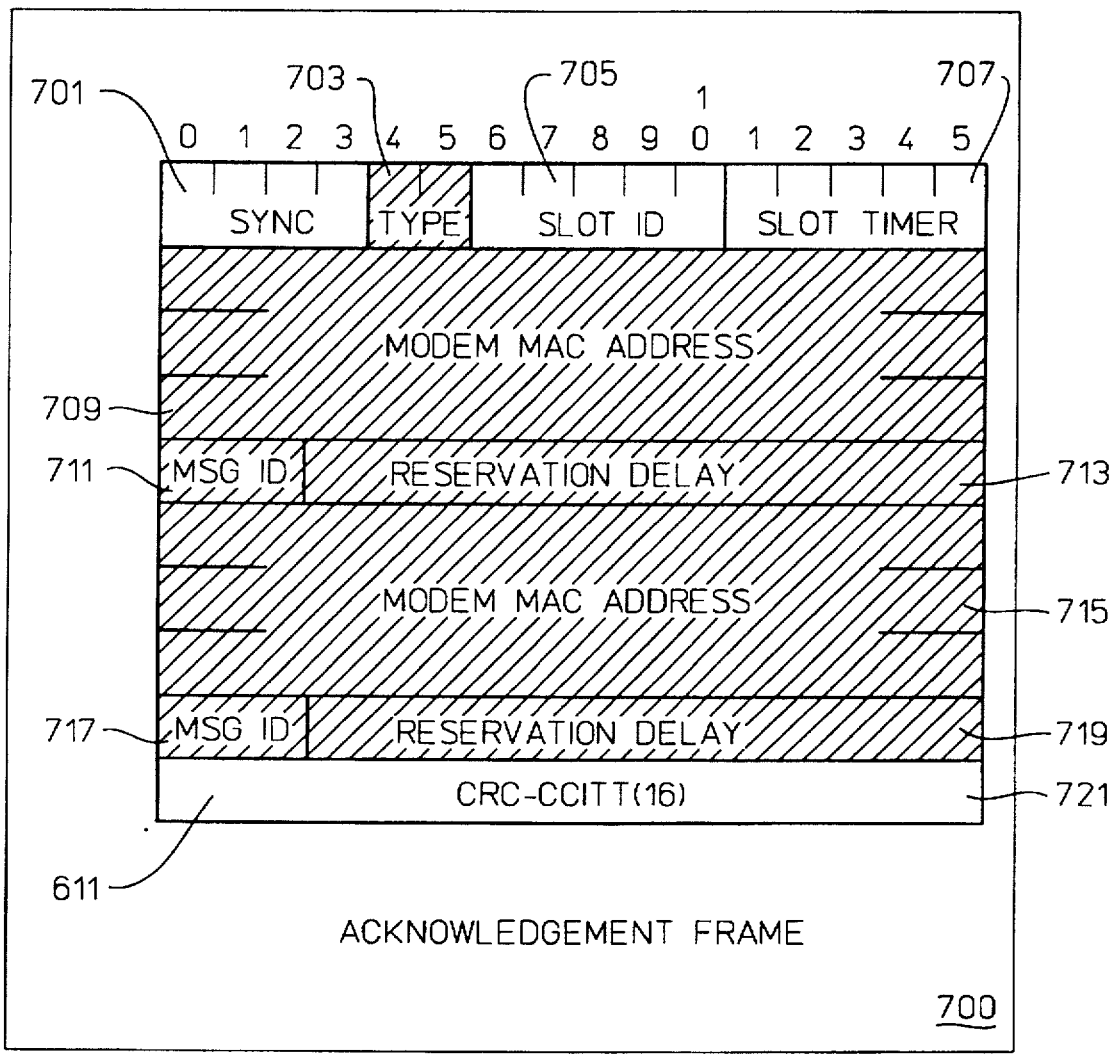
FIG. 6(b) is a block diagram of the format of a down-stream acknowledgement frame sent on the control channel.

FIG. 6(b) is a block diagram of the format of a downstream acknowledgement frame 700 sent on the control channel. When the Signal Conversion System (SCS) 101 successfully receives a message from one of the client stations 105, as indicating by a successful checksum calculation, the Signal Conversion System (SCS) 101 transmits an acknowledgment frame 700, as shown in FIG. 6(b). The acknowledgment frame 700, as all other frames, follows the general format of frame 600 of FIG. 6(a). As such in contains a SYNC field 701, a frame type field 703 ('00' in the case of an Acknowledgment frame 700), slot id 705 and slot timer 707 fields, and a checksum field 721. These fields 701, 703, 705, 707, and 721 correspond to fields 601, 603, 605, 607, and 611, respectively.

The type dependent content 609 of the Acknowledgment frame 700 may be used to acknowledge up to two messages from client stations 105 transmitting on different upstream channels. The modem MAC address of the first of these client stations 105 is given in field 709, and for the second client station 105 in field 715 from a different channel.

When a client station 105 sends a message to the Signal Conversion System (SCS) 101, the client station 105 assigns a message id to that message. The message id being acknowledged is echoed back to the client station 105 by the Signal Conversion System (SCS) 101 in Msg ID field 709 and 717, respectively.

In the event that the message being acknowledged contains a reservation request, the number of slots that the client station 105 must wait before sending the balance is sent in the Reservation Delay fields 713 and 719, respectively.

In the preferred embodiment there are eleven subtypes of control frames. Other embodiments include additional subtypes of control frames. These control frame subtypes are:

* Idle Subframe
* Slot/Channel Status Subframe
* Disable/Enable Cable Modem Request
* Switch Upstream/Downstream Channel Request
* Echo Request
* Get/Set Parameter Request
* Key Exchange Initiation Request
* Power Level Adjustment Reply.

Each of these subframe types follow the general format given in FIG. 6(a) and contain additional fields for their specific subframe type. The type field 603 is set to the value "01" to signify that the frame is a control frame. Following the slot-timer field 607, control frames contain a two-byte long subframe type field.

While in operation, the Signal Conversion System (SCS) 101 continuously transmits control frames. Thus, if during a particular time-slot the Signal Conversion System (SCS) 101 has no down-stream information to send, the Signal Conversion System (SCS) 101 nevertheless sends a control frame. This frame, contains the subframe type field of "00". The balance of the frame is a pseudo-random sequence. The pseudo-random sequence should be as random as possible to provide enough transitions for the 64-QAM receiver tuner 303 to stay in sync with the transmitter 305.

The Channel/Slot status subframe type is sent by the SCS 101 as the first frame of each time slot. This frame carries the occupancy status of the next time slot for each active upstream channel as well as the information of the current available upstream and downstream channel. The Channel/Slot status subframe contains the following specific fields (Table 1):

TABLE 1

| | | |
|---|---|---|
| Channel Occupancy Bitmap | 32 bits | Each two-bit nibble corresponds to one upstream channel, indicating: 11 - channel busy (reserved) 00 - channel free (contention) 01 - low-priority contention 10 - high-priority contention |
| QAM Symbol Usage Bitmap | 16 bits | Each two-bit nibble indicates the format of the non-control bits in the QAM symbol. Default is zero. |
| Version | 4 bits | Version number of protocol used. |
| Channel Type | 4 bits | 0 = 64-QAM Data 1 = 256-QAM Data Others: to indicate other formats |
| NTSC Channel Number | 8 bits | Downstream NTSC Channel Number |
| Slot Max TU | 2 bytes | The Maximum size (in bytes) of a Transmission Unit without reservation (for upstream) |
| Upstream Ch Num | 1 byte | Available Upstream Channel number |
| Bits per symbol | 2 bits | Number of bits per Symbol for upstream data: 0–1 bit (BPSK) 1–2 bits (QPSK) 2, 3 - reserved |
| Symbol Rate | 6 bits | The number of symbol per second: 0 – Default Value N -- $2^{-n}$ * Max Value |
| Center Frequency | 2 bytes | The center frequency of an available upstream channel in multiples of 25 KHz. |

(Many of the fields for the Channel/Slot Status Subframe type are used by other subframe types. Therefore, the description of those Subframe types below make reference to Table 1.)

The Disable/Enable Cable Modem Request subframe type is used by the Signal Conversion System (SCS) 101 to turn on and off a particular cable modem 113. The subframe type is 0x03 for Disable and 0x05 for Enable. The Disable/Enable CM subframe is a six-byte MAC modem address field that uniquely identifies the particular CM 113 the frame is directed to.

The Switch Upstream Channel Request subframe type is used by the SCS 101 to direct a CM 113 to switch its upstream communication to a different channel. As discussed above, the upstream frequency range can be relatively noisy. Therefore, from time-to-time during normal operation of the Signal Conversion System (SCS) 101, the SCS 101 may sense the desirability of having upstream communications to it on a different frequency. Furthermore, the Signal Conversion System (SCS) 101 may also detect a high usage of a particular upstream channel and a relatively low usage on another upstream channel, and, therefore, request that certain CMs 113 change frequency to balance the usage amongst the various upstream channels.

The Switch Upstream Channel Request subframe contains a six-byte field for modem MAC address towards which the request is directed. The subframe also contains fields to identify the current upstream channel number (1 byte), the current number of bits per symbol (2 bits, see Table 1), the current symbol rate (6 bits, see Table 1), and the center frequency of the current upstream channel (2 bytes, see Table 1). Additionally, the subframe also contains fields to identify the channel number of the upstream channel to switch to (1 byte), the new number of bits per symbol (2 bits, see Table 1), the new symbol rate (6 bits, see Table 1), and the center frequency of the new channel (2 bytes, see Table 1).

The Switch Downstream Channel Request subframe type is sent by the Signal Conversion System (SCS) 101 to direct a CM 113 to switch its receiver to start receiving on the one designated in the request frame. The frame contains a six-byte field for the Modem MAC address and 1-byte field for the downstream NTSC Channel number to switch to.

The Echo Request subframe type is sent by the Signal Conversion System (SCS) 101. Upon receipt of the echo request, the client station 105 sends an Echo Reply message (discussed below in Section on Upstream Channel Format) to the Signal Conversion System (SCS) on one of the upstream channels. The Echo Request subframe type contains a Modem MAC Address field (6 bytes) and a Test ID field (4 bytes). The Test ID field contains a random number set by the Signal Conversion System (SCS) 101.

The Get/Set Parameter Request subframe types are used primarily for SNMP (Simple Network Management Protocol). The SNMP Proxy agent located at the Signal Conversion System (SCS) 101 utilizes the Get/Set Parameter Request to get information about the client stations 105 or the CMs 113 located at the client stations 105, or to clear or set certain CM/client station parameters. The Get and Set Parameter Requests are differentiated by having different values for the Subframe Type field. The Get and Set Parameter requests contain a Modem MAC address field (6 bytes) for identifying the cable modem 113 to which the request is directed and a Parameter ID field (1 byte). The Set Request subframe type also contains an up to seven bytes long contents field containing the new value for the parameter. The following are some of the parameters that may be retrieved or set by the Get/Set Parameter Request subframe:

* Payload channel CRC error count
* Payload missed buffer error count
* Payload received packet count
* Control channel CRC error count
* Control channel missed buffer count
* Control channel received packet count
* Upstream transmission retry count
* Upstream transmitted packet count
* Selftest (perform/report)
* Perform/report result of a particular test
* Upstream encryption
* Firmware flag #n (set/reset/report)
* Firmware registers (read/write/report)

The DES Key Exchange subframe type is used by the Signal Conversion System (SCS) 101 to instruct the CM 113 to initiate a DES Key handshake. The key exchange uses the Diffie-Hellman key exchange algorithm. The DES Key exchange request subframe contains a Modem MAC Address field (6 bytes) for identifying the cable modem 113 to which the request is directed.

Downstream Payload Channel

Figure 6C:
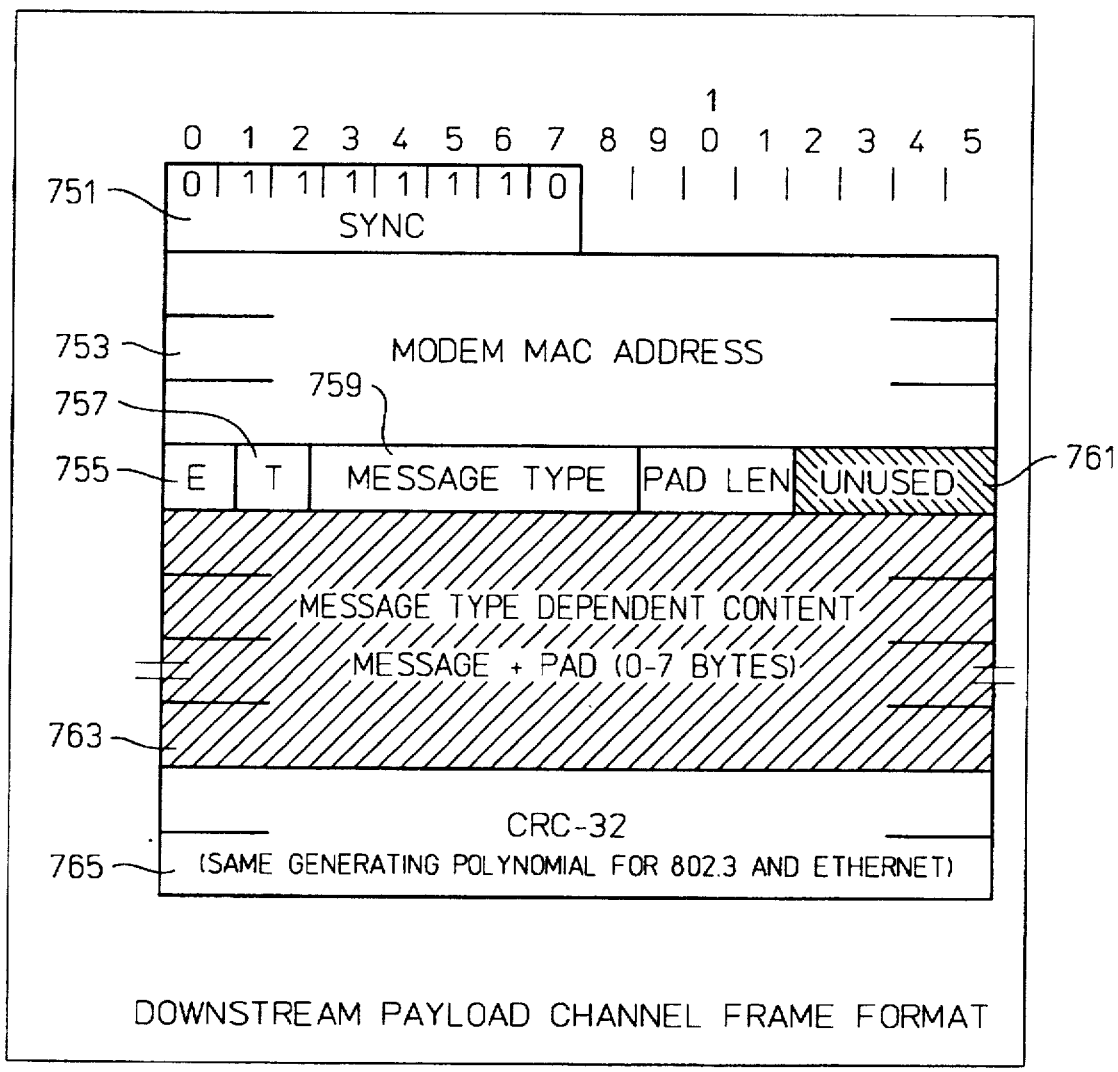
FIG. 6(c) is a block diagram of the downstream payload data frames transmitted from the SCS to the cable modems.

FIG. 6(c) is a block diagram of the downstream payload data frame 749 transmitted from the SCS 101 to the cable modems 113. Field 751 is a byte-long Sync flag containing the bit string '01111110'. The rest of the frame is zero-inserted to ensure that there is no other six-bit string of ones in a frame. Thus, if a CM 113 encounters a string of five ones followed by a zero, the CM knows that zero bit has been inserted by the SCS and needs to be discarded prior to processing the data.

Next is a six-byte Modem MAC address field 753 for identifying the recipient of the frame. For multicast packets, the MAC address field 753 contains the multicast MAC address of the subscribers' Cable Modem 113.

Field 755 is a one-bit encryption flag for indicating to the CM 113 whether the transmitted data is encrypted (1) or clear text (0).

There are two types of payload frames: ones that carry subscriber data and ones that carry modem control messages. Field 757 is a one-bit flag for indicating whether the frame has subscriber data (0) or a modem control message (1).

Field 759 is a six-bit field for identifying the type of message. The message types include:

For subscriber data:
* Ethernet frame
* ATM Cell

For Modem Management Messages
* Add Multicast Address Request
* Delete Multicast Address Request
* DES Key Exchange Reply
* Test Request Field 760 is a three-bit field for identifying the pad length in number of bytes. For encryption purposes, the payload is a multiple of eight bytes long. Therefore, upto seven bytes may be used to pad the length of the message to ensure that the payload satisfies this goal. In an alternative embodiment where encryption is not required or where an encryption standard that does not require a message length being a multiple of eight, the pad and pad length fields are not needed.

Field 761 is a five-bit field of unused bits. These bits are added to keep the message field 763 from wrapping byte boundaries. Field 763 is a variable length (in byte increments) field of message type dependent content. To be consistent with the Ethernet MTU, the MTU in the message content field is set to 1514. The message content field 763 is padded with up to seven bytes to ensure that its length in bytes is a multiple of eight.

Field 765 is a four-byte long CRC-32 checksum that uses the Ethernet polynomial cyclic redundancy check scheme.

In the preferred embodiment, there are four types of modem management messages. A first two modem management message types are the Add multicast address request and Delete multicast address request. The Add multicast address request directs the CM 113 to which it is directed to add a multicast address to the list of multicast addresses it subscribes to and the Delete multicast address request directs the CM 113 to delete a specified multicast address from its subscription list. For the Add and Delete multicast address request the content field 763 contains a six-byte field for the multicast address and a 1 byte Hash key field. The hash key is the upper six bits of CRC-32 of the multicast address. The lower six bits of the Hash key field contains these six bits. The hash key can be used by the CM 113 to more quickly retrieve the multicast address that needs to be deleted.

A third modem management message is the DES Key Exchange reply which is a response message to a CMs 113 request for a key exchange. The response contains two numbers N2 and N3. N2 is a 200 to 400 bits long result of $B^{R2}$ mod P and N3 is the result of encrypted N1 under the key K where K is derived from $N1^{R2}$ mod P. B and P are numbers known to the SCS 101 and all the CMs 113. R2 is a random number chosen by the SCS 101 each time it receives a Key Exchange request. The DES Key Exchange is not encrypted.

A fourth modem management message is the Test request message type. The Test request message type is initiated by the SCS 101 to verify the state of the path to a CM 113 as well as to verify that encryption/decryption logic at both ends are correct. The CM 113 responds with a Test reply. If encryption is turned on, the Test request message and the corresponding Test reply are encrypted.

Upstream Channel Messages

Figure 7:
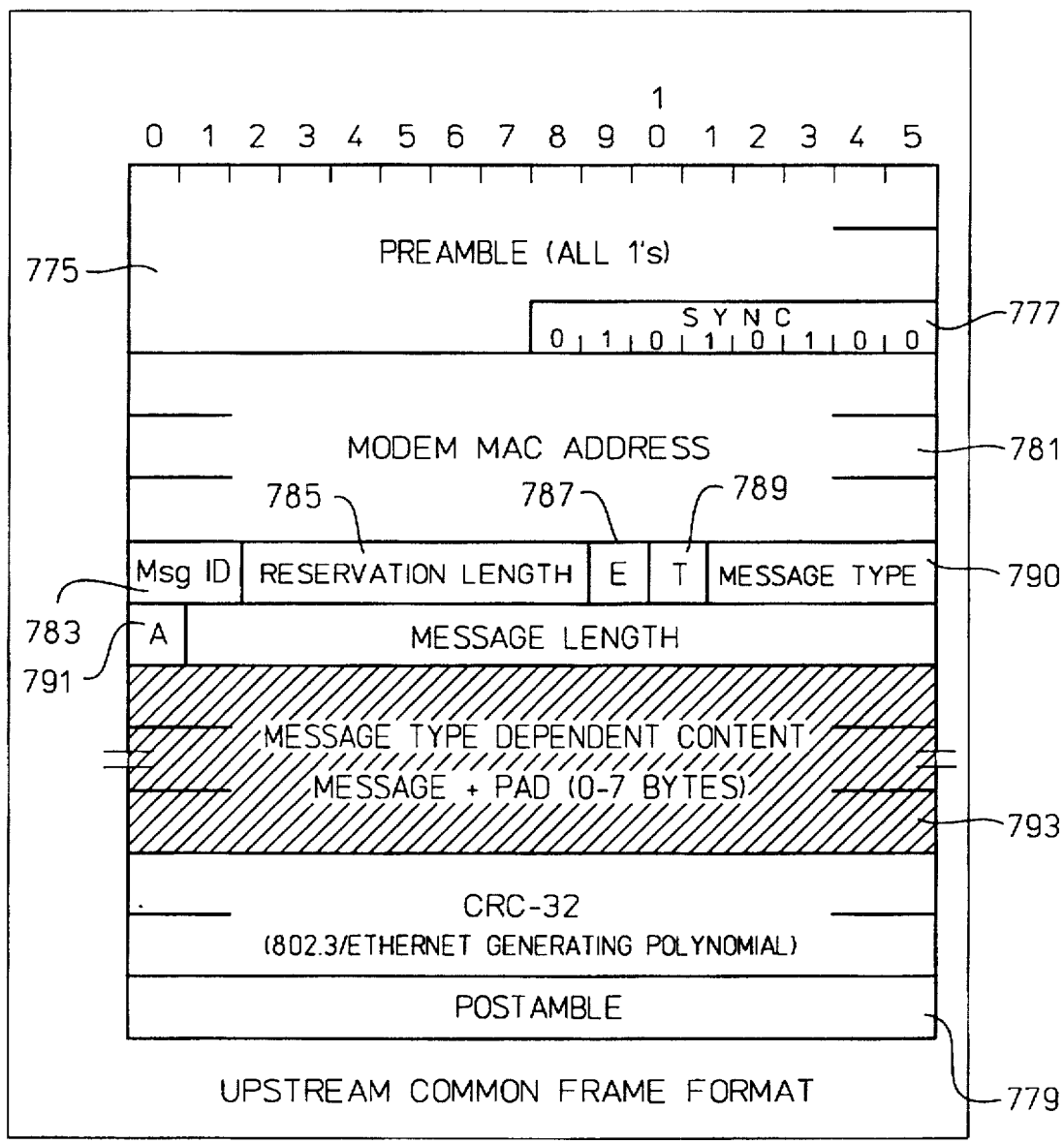
FIG. 7 is a block diagram of a common format for an upstream channel frame.

The Upstream frames carry subscriber data from client stations 105 as well as Modem Control Messages from the CMs 113. The Upstream frames also contain time slot reservation requests from the CMs 113 for transferring packets too large to be communicated in one packet. FIG. 7 is a block diagram of a common format for an Upstream channel frame 773. The first field is a five-byte preamble field 775 of all 1s followed by a one byte SYNC flag 777 containing "01010100". Fields 775 and 777 denote the beginning of an upstream frame. Frames are ended with a pad field 779 that ensures that the total length of the frame is no less than MinTU (the minimum size of an upstream data frame.

Field 781 contains the six-byte MAC address of the CM 113. Field 783, the Message ID Field, is a 2-bit field that contains a message number assigned by the CM 113. The SCS 101 when acknowledging a message includes this message number.

Field 785 is the reservation length field. This field is a six-bit field indicates to the SCS 101 the number of time slots the CM 113 needs to transfer one or more packets. The Reservation Length Field 785 is ignored if it contains all zeros. Any packet that is larger than MaxTU must be transferred through reserved time slots. In the preferred embodiment, recursive reservation is not permitted.

The Encryption Flag 787 is a one-bit flag for indicating whether the message content is encrypted (1) or clear text (0). A Frame Type bit 789 is used to indicate whether the message content is subscriber data (0) or a modem control message (1). The Frame Type bit 789 is followed by a 6-bit Message Type Field 790. The following are examples of message types:

For Subscriber Data:
* Reservation Request
* Ethernet Frame
* ATM Cell

For Modem Management Messages
* Disable CM Reply
* Enable CM Reply
* Switch Upstream Channel Reply
* Switch Downstream Channel Reply
* Echo Reply
* Get Parameter Reply
* Set Parameter Reply
* ADD Multicast Reply
* Delete Multicast Reply
* DES KEY Exchange Request
* DES KEY Exchange ACK
* Power Level Adjustment Request
* Test Reply An ACK Flag 791 indicates to the SCS 101 whether the CM 113 requires an acknowledgment (1) or whether no acknowledgment is required (0). Because large packets are transferred using reserved slots, an ACK is not used for transfer of large packets.

The Message Length field is a 15-bit long field for indicating the number of bytes of the Payload Message field 793. The Payload Message field 793 contains the actual message transferred to the SCS 101 and is dependent on the message type (Field 790). For encryption/decryption purposes the message is padded to ensure that its length is a multiple of eight.

The Frame format concludes with a CRC-32 checksum field 795 followed by the postamble field 779.

Upstream Modem Messages

Table 2 indicates the contents of the Payload Message Field 793 for the various message types;

TABLE 2

| Message type | Payload Message Field 793 contents |
| --- | --- |
| Disable/Enable CM Reply | Status: 0 - Done with no error<br>N - Error Code |
| Switch Upstream Channel/Switch Downstream Channel Reply | Status: 0 - Done with no error<br>N - Error Code |
| Echo Reply | Test ID: Random number sent by SCS 101 |
| Get Parameter Reply | Parameter ID: CM Parameter ID<br>Status: 0 - Done with no error<br>N - Error Code<br>Content: Parameter value |
| Set Parameter Reply | Parameter ID: CM Parameter ID<br>Status: 0 - Done with no error<br>N - Error Code |
| ADD/Delete Multicast Address Reply | MAC Address: Multicast MAC Address<br>Status: 0 - Done with no error<br>N - Error Code |
| DES Key Exchange Request | N1: Result of "$B^{R1}$ mod P" |
| DES Key Exchange ACK | Message length is zero. The message itself serves as the acknowledgment. |
| Power Level Adjustment Request | Message length is zero. The message itself serves as an indication to the SCS 101 that the CM 113 wishes to adjust its power |
| Test Reply | Message: the same message as the one the CM 113 received from the SCS in the Test Request |
| Ethernet Frame | Destination MAC: the MAC address of the intended recipient. This could be any modem somehow reachable by the SCS 101, e.g., another PC, or a remote server connected to the Internet<br>Source MAC: The PC MAC address of the PC 115.<br>Ethernet Type: The type of Ethernet.<br>Body: Ethernet frame body conforming to the Ethernet Type. |
| Reservation Request without data. Note: any of the other upstream frame types can also make reservation requests | Message length is zero. The Reservation Length Field 785 indicates the number of time slots needed to transmit a subsequent packet. |

Cable Modem 113

Figure 8:
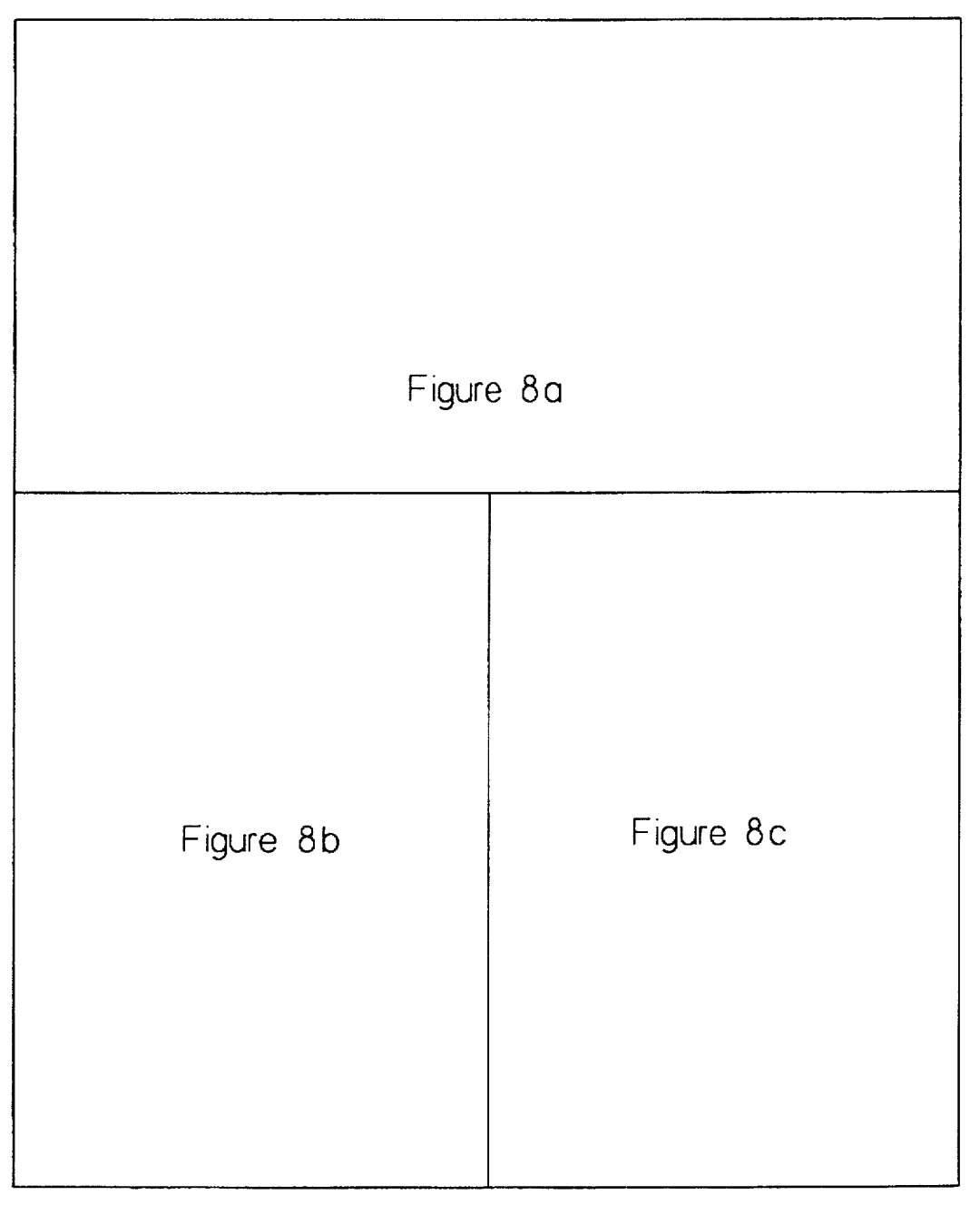
Figure 8A:
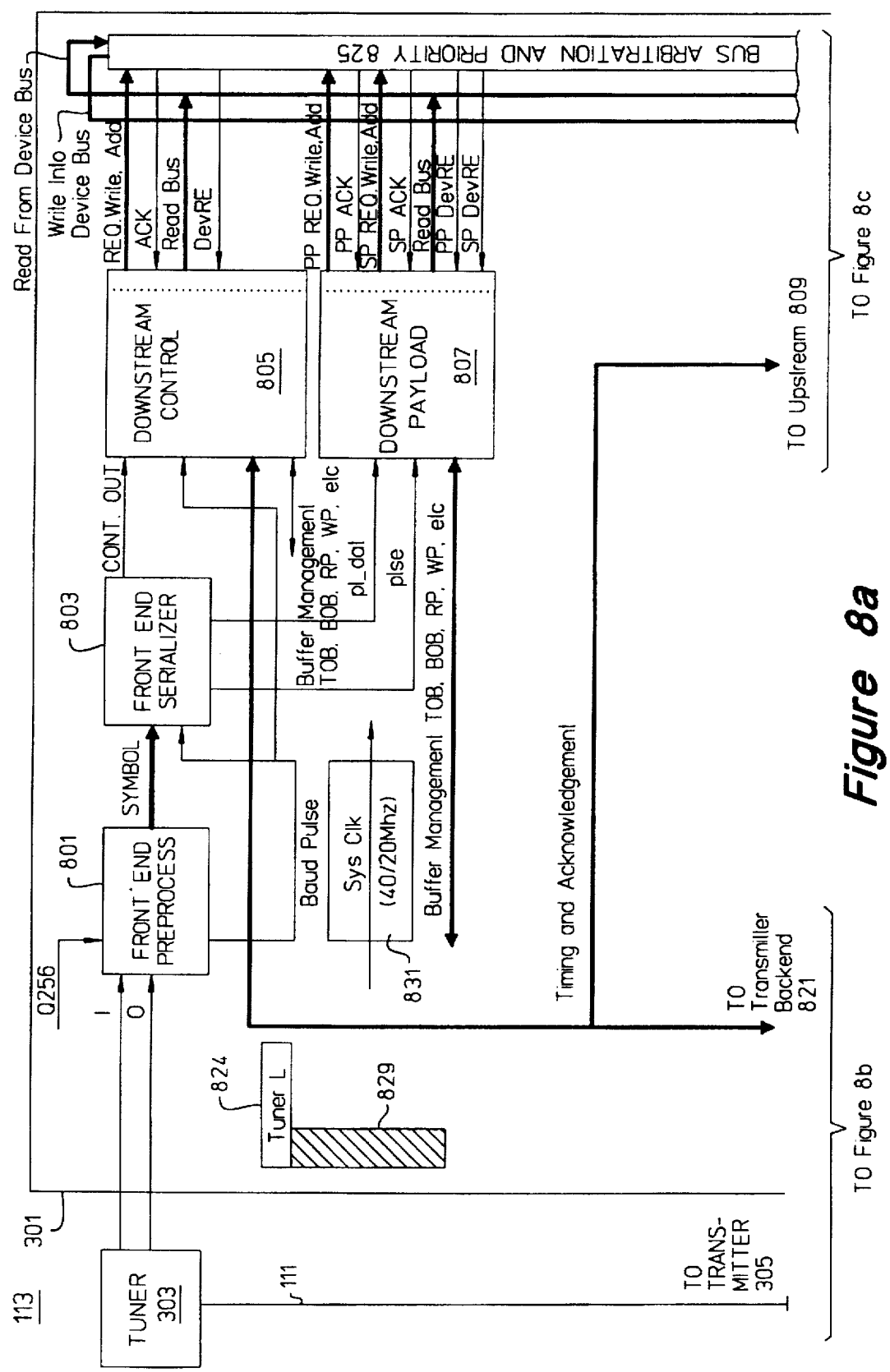
FIG. 8 shows in greater detail a cable modem of the present invention.
Figure 8B:
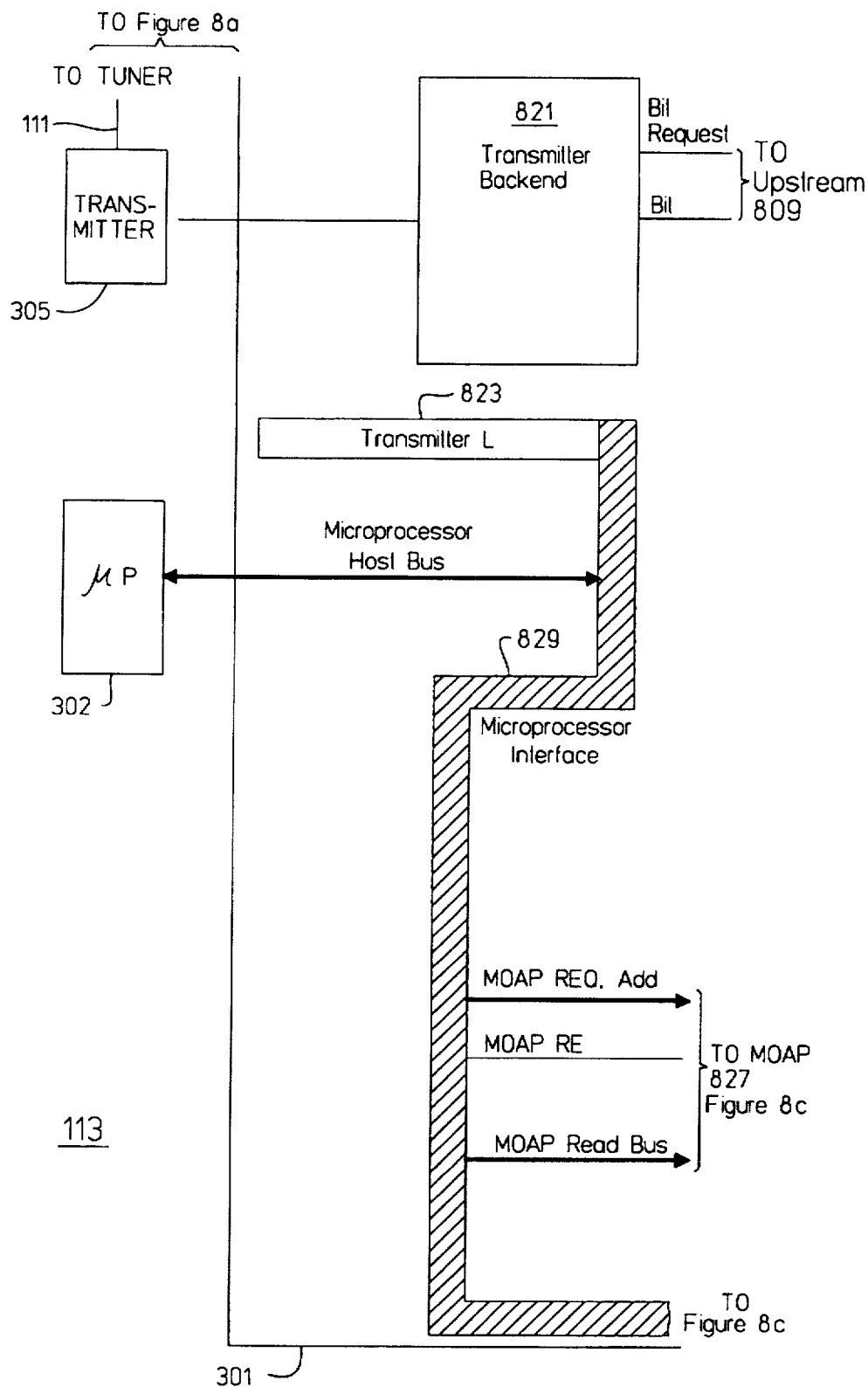
Figure 8C:
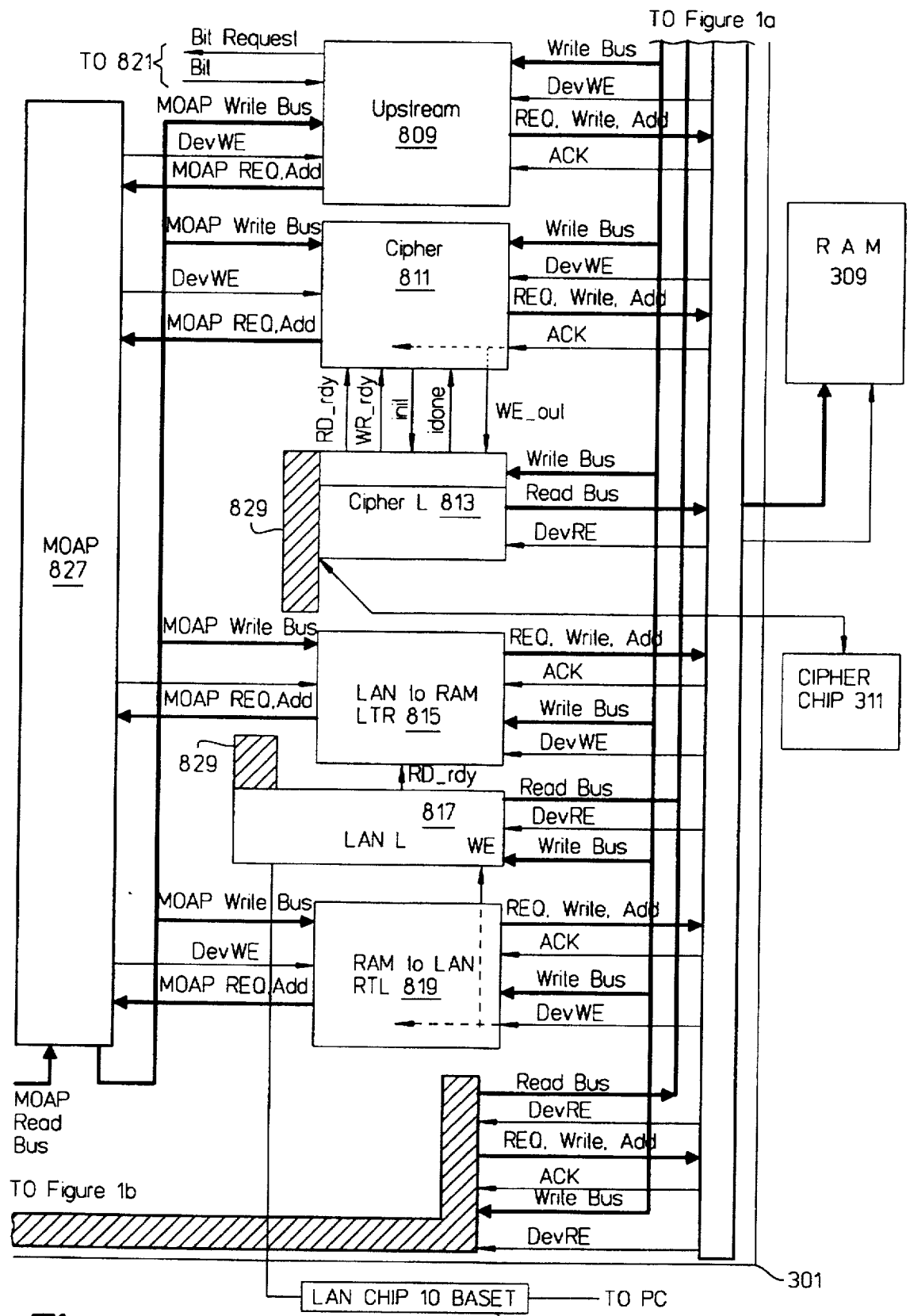

FIG. 8 shows in greater detail a cable modem 113 of the present invention. As shown in FIG. 3, the modem consists of a control circuit 301 connected to several external devices, such as tuner 303, transmitter 305, RAM 309, a cipher circuit 311, a LAN interface 307, and a microprocessor 302. The control circuit 301 is a data processing and data routing circuit that controls the information flow between these various external circuits.

The tuner and demodulator 303 is a standard broadcast tuner combined with a demodulator that receives a television broadcast signal from the cable 111 and outputs the I and Q signals from the QAM data encoding format.

The control circuit 301 consists of several interconnected functional devices. This set of devices includes a Front End Preprocessor (FEP) 801, a Front End Serializer 803, a Downstream Control Device (DCD) 805, a Downstream Payload Device 807, an Upstream Device (UD) 809, a Cipher Device (CD) 811, a Cipher Chip Interface (CCI) 813, a LAN-to-RAM Device (LTR) 815, an LAN Interface (LANI) 817, a RAM-to-LAN Device (RTL) 819, a Transmitter Backend (TB) 821, a TRansmitter Interface (TRI) 823, and a Tuner Interface (TUI) 824. The CCI 813, the LANI 817, the TRI 823, and the TUI 824 all are connected via a microprocessor interface (MI) 829.

Devices 805, 807, 809, 811, 815, 819, and 823, are all connected via a Bus Arbitration and Priority Controller (BAPC) 825 to the RAM 309. The devices 805, 807, 811, 815, 819, and 823 are connected to the BAPC 825 via two busses, a Read Bus 831 and a Write Bus 833. A register file, Master of all Pointers (MOAP) 827 contains pointers and offsets for blocks of data stored in RAM 309.

A note on nomenclature convention used herein, the various devices may each be viewed as i/o buffers that are written to or read from. Thus, if the BAPC 825 transfers data to a device, it "writes to" the device, if the BAPC 825 transfers data from a device, the BAPC "reads from" the device.

Figure 9:
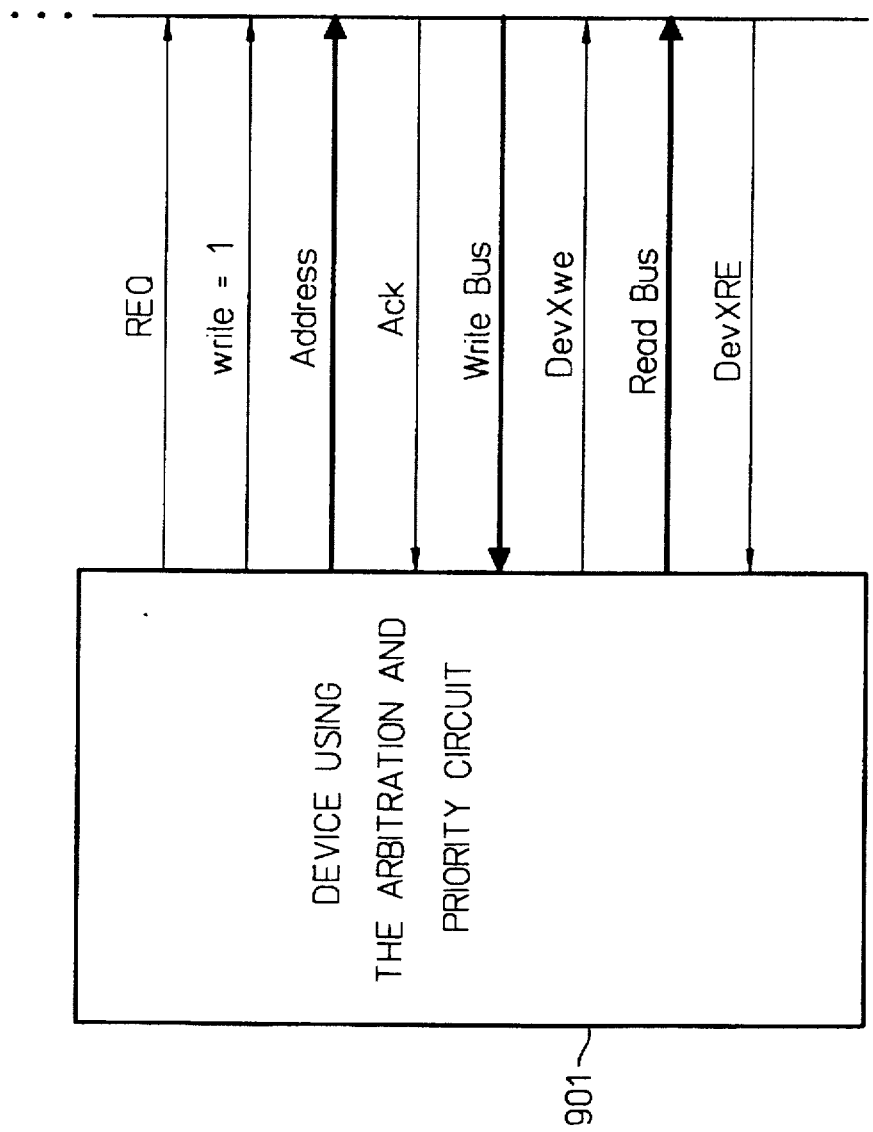
FIG. 9 is a block diagram of a generalized connection scheme for connecting devices to the bus arbitration and priority circuit (BAPC).

Each of the devices that are connected to the BAPC 825 are connected to the BAPC 825 according to a generalized connection scheme. FIG. 9 is a block diagram of this generalized connection scheme for connecting devices to the BAPC 825. Device 901 is one of the devices 805, 807, 809, 811, 815, 819, or 823. Accordingly, in the discussion that follows "Device 901" refers to any of devices 805, 807, 809, 811, 815, 819, or 823. The various devices 901 have different actual needs in terms of connection to the RAM. For example, the BAPC 825 only writes to (it does not read from) the Upstream Device 809. On the other hand, the Downstream Control Device 805 is only read from (and not written to). Each device has a "REQ" signal, a "WRITE" signal, and an "Address" bus. Each device receives an "ACK" signal from the BAPC 825. If a particular device has write capability, then an input bus called "write bus" and an input signal called DevXWE (Device X Write Enable) are connected to the device. If a particular device has read capability, then an output bus called "read bus" and an input signal called DevXRE (Device X Read Enable) are connected to the device. The X in DEVXWE and DEVXRE is a unique identifier for each particular device.

The Cipher Device (CD) 811 and the LAN-to-RAM Device 815 are special cases in that these also control by setting the "REQ", "Write", and "Address" signals and receiving the corresponding "ACK" signals on behalf of their respective interface circuits 813 and 817.

The Downstream Payload Device is a special case in that it controls two distinct sets of REQ, Write, and Address signals and receives two corresponding DevRE signals.

Bus Arbitration and Priority Circuit

Figure 10:
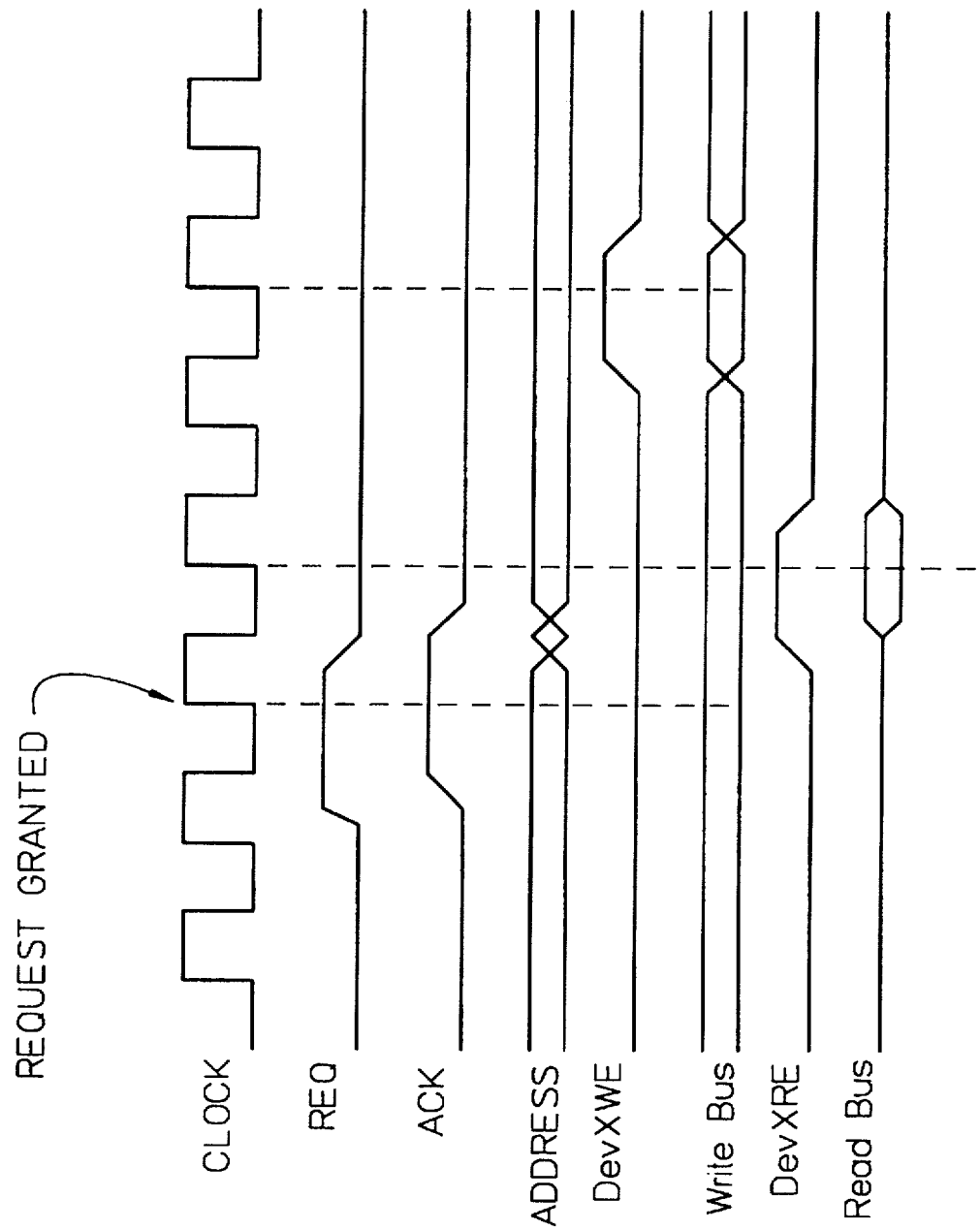
FIG. 10 is a timing diagram showing an example of transfer of data between a state machine controlled device and the BAPC.

FIG. 10 is a timing diagram showing an example of transfer of data between the device 901 and the BAPC 825. To request a data transfer, the device 901 asserts the REQ signal, the address of the RAM for the transaction, and the type of transaction by the WRITE signal (write=1, read=0). When this request is granted, the BAPC asserts the ACK signal. The device can immediately generate a new request when it sees the ACK at the clock edge. If this device has write capability, it must use the DevWE as the clock enable signal to clock the contents of the "write bus" into its internal register. If this device has read capability, it must use the DevRE signal to clock the contents of its internal register onto the "read bus".

Figure 11:
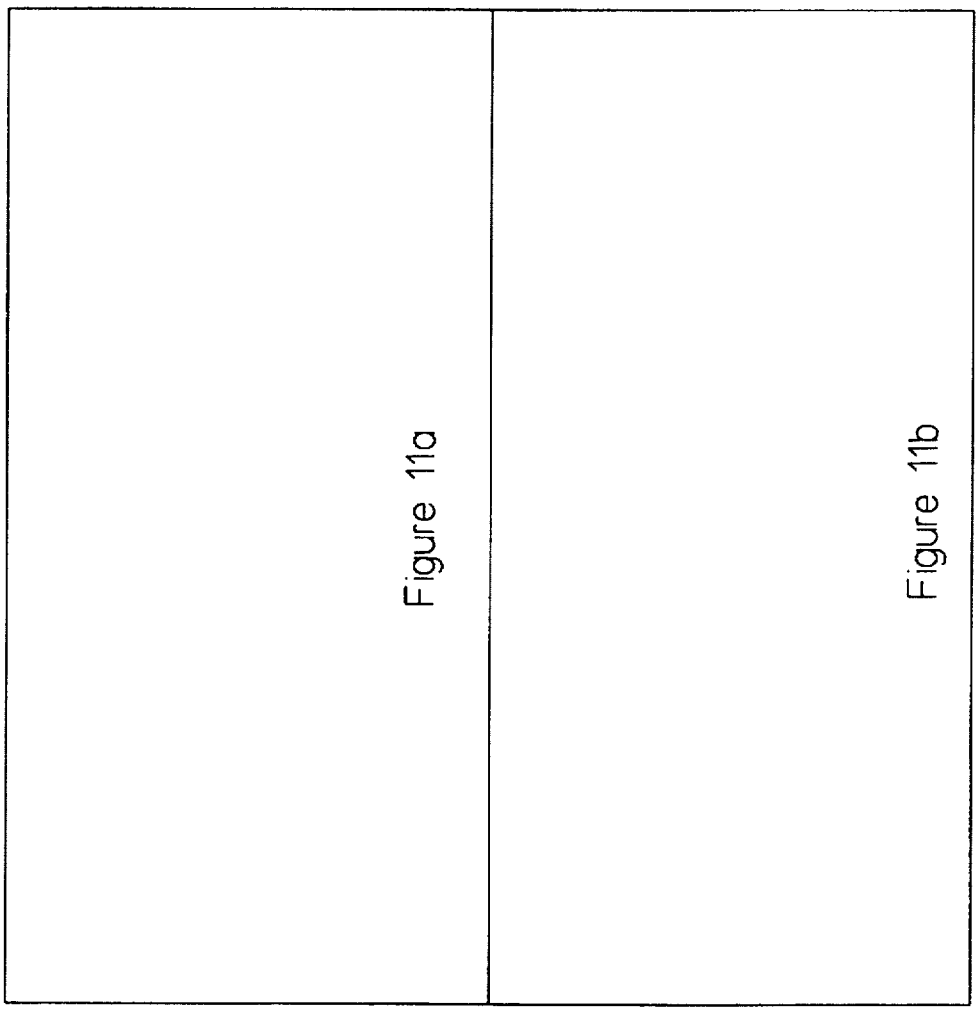
FIG. 11 is a schematic of the bus arbitration and priority circuit (BAPC).
Figure 11A:
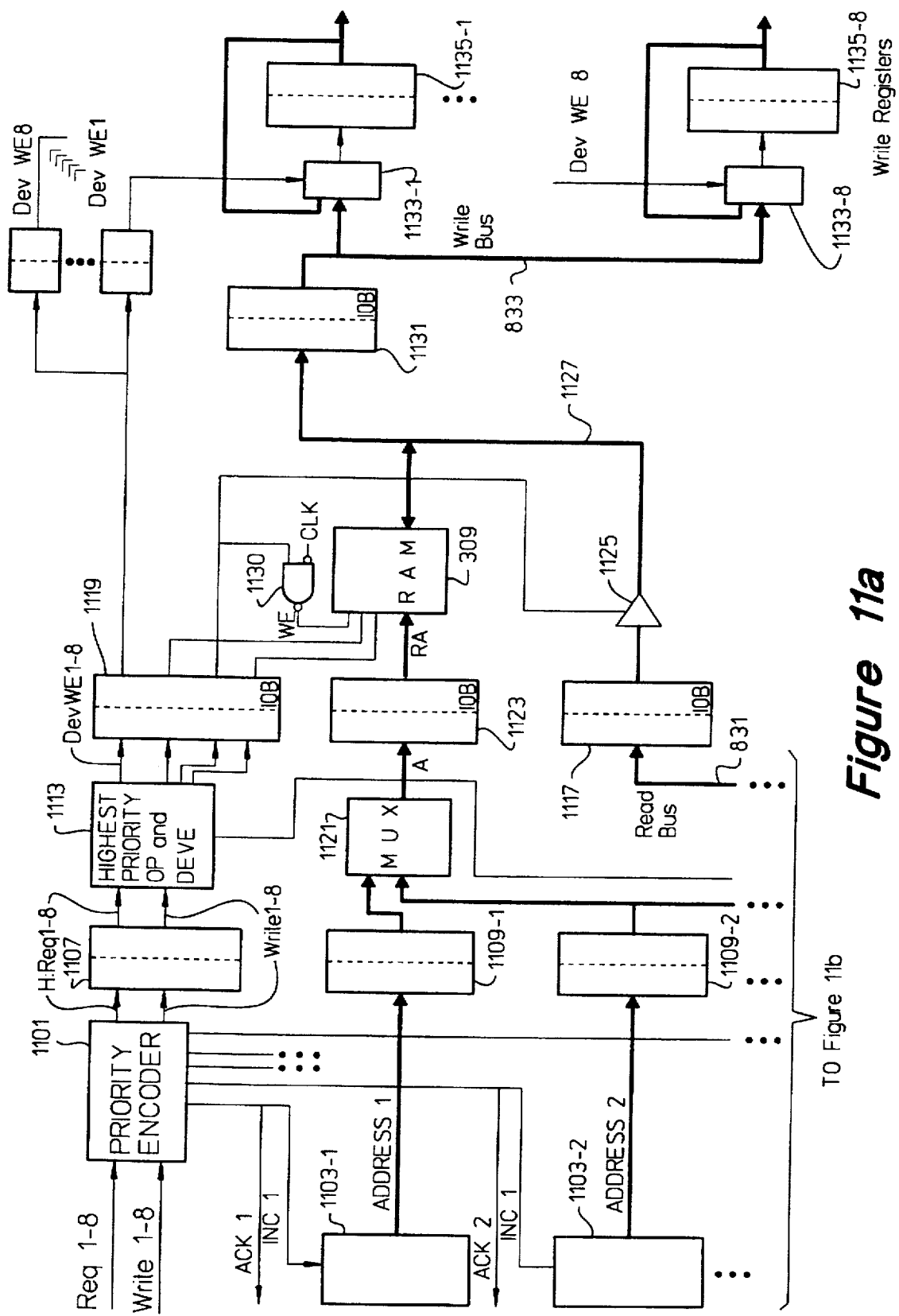
Figure 11B:
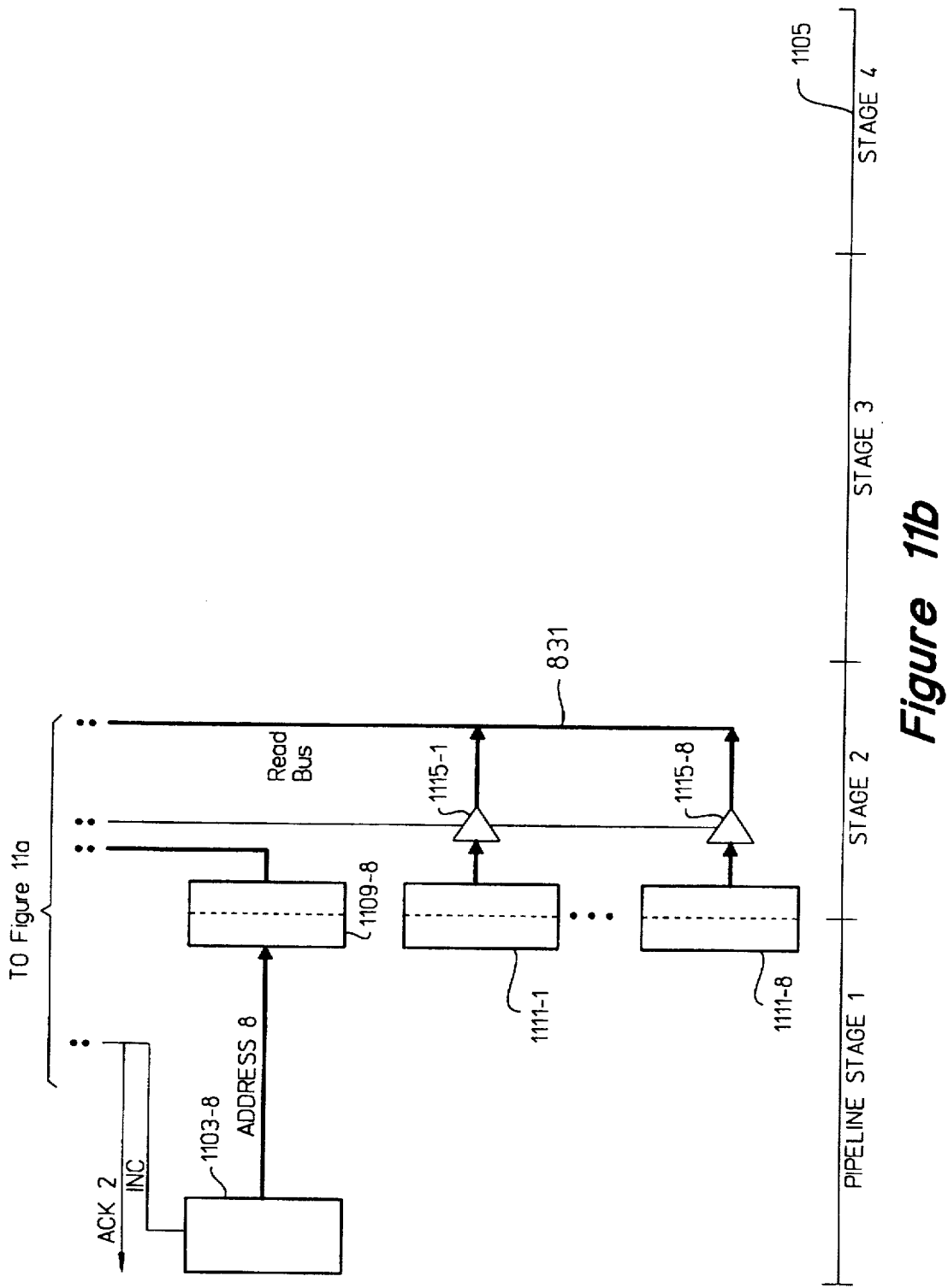

FIG. 11 is a schematic of the bus arbitration and priority circuit (BAPC) 825. In the preferred embodiment there are eight devices that can transfer data to the BAPC 825. Thus, according to the connection scheme of FIG. 11 there are eight separate REQ lines and eight separate Write lines, one of each for each device. The eight REQ lines and eight Write lines are connected to a Priority Encoder circuit 1101. The Priority Encoder determines which is the next device to be allowed access to the read bus 831 and write bus 833. The Priority Encoder 1101 sets the ACK signal high for the highest priority device that has set its REQ signal high. The Priority Encoder 1101 also has a Highest-Priority REQ signal for each of the Devices 1 through 8 (HiREQ1 through HiREQ8). The Priority Encoder 1101 selects for RAM access the Device 1 through 8 that has the highest priority and that has set its REQ signal high. For that device the Priority Encoder 1101 sets the corresponding HiREQ signal to high and leaves the other seven HiREQ signals low.

Figure 12:
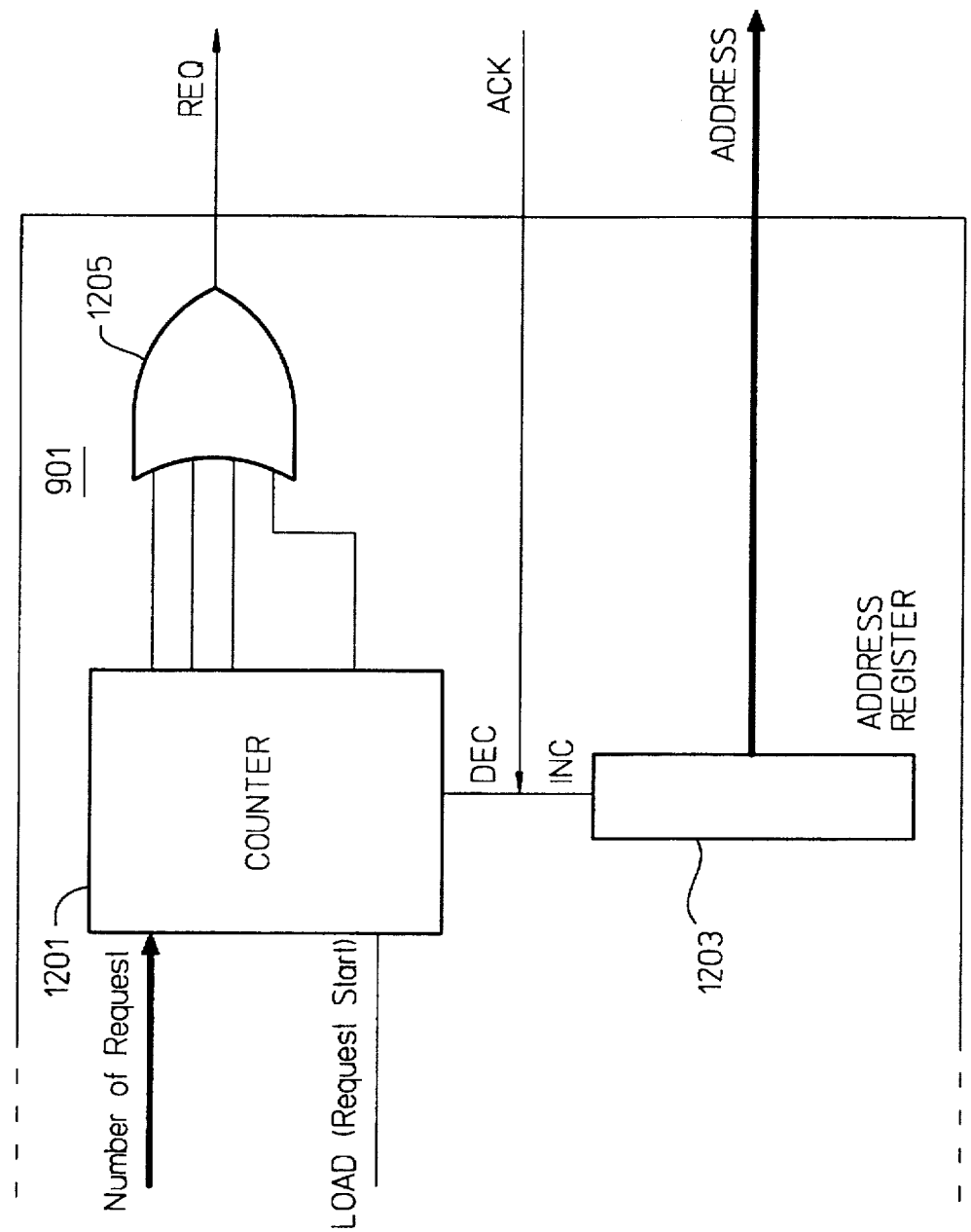
FIG. 12 is a schematic of a section of a device, namely, the section that receives the ACK signal and is an illustration of the operation of the device in burst mode.

A device 901 operates in either single request mode or in burst mode. In burst mode a counter in the device is set to the number of RAM 309 accesses the device 901 requires. The device 901 holds the REQ signal high until all those requests have been acknowledged. FIG. 12 is a schematic of a portion of the device 901 that receives the ACK signal and illustrates the operation of the device 901 in burst mode. The device 901 contains a counter register 1201 for storing the number of memory requests it needs to do. Each of the devices 901 may wish to operate iteratively on a block of data stored in the RAM 309. For example, the Cipher Device 811 iteratively encrypts a packet of data to be sent to the Signal Conversion System (SCS) 101. Therefore, when a device 901 needs to access a block of data, the number of records or words in the block that the device 901 needs access to is stored in the counter 1201.

The device 901 also contains an address register 1203 for storing the next address in the RAM 309 that the device 901 would like access to. The ACK signal is used to decrement the counter 1201 and increment the address register 1203. The bits that make up the counter are all fed into an OR-gate 1205. When all bits in the counter register are zero, the output of the OR-gate 1205 is zero, and thus the device's 901 REQ signal is down. The counter 1201 is also controlled by a "LOAD (request start)" signal. The count of words to access is loaded into the counter on a positive edge of clock when LOAD signal is high.

For the sake of clarity, in the discussion of the Bus Arbitration and Priority Circuit 825 each of the devices that are connected to it are assigned device numbers. Which device number correspond to which particular device is not significant. However, for exemplary purposes consider Device 1 to be the Downstream Control Device 805; from the perspective of the Bus Arbitration and Priority Circuit 825, the Downstream Payload Device 807 is two devices, one for the primary pointer and one for the secondary pointer, therefore consider these to be Devices 2 and 3; consider Device 4 to be the Upstream Device 809; consider the Cipher Device 813 to be Device 5; the LAN-to-RAM 815 to be Device 6; the RAM-to-LAN as Device 7; and consider the Microprocessor 302 (by way of the microprocessor interface 829) to be Device 8.

The Priority Encoder 1101 has an output ACK signal line for each of the devices that are connected to the Bus Arbitration and Priority circuit, namely, ACK 1 through ACK 8. Each of these lines is split into lines INC 1 through INC 8, which are in turn connected to their respective address registers 1103-1 through 1103-8 (the address registers corresponding to devices three through seven are not shown).

The Bus Arbitration and Priority Circuit 825 is a pipelined device. In other words, data is transferred internally in parallel in coordinated pipeline stages. The pipeline stages for read and write operations into and out of the RAM 309 are shown on the time line 1105.

Register 1107 is a pipeline register that accepts the HiREQ signals 1 through 8 and the Write signals from the Priority Encoder 1101. The address registers 1103-1 through 1103-8 are connected to pipeline registers 1109-1 through 1109-8, respectively. Each device that the Bus Arbitration and Priority Circuit 825 reads from contains a read register. The read registers are shown in FIG. 11 as registers 1111-1 through 1111-8 (note: not all devices are "read from" devices and, hence, not all devices have read registers). The registers 1107, 1109, and 1111 are parallel pipeline registers. Thus, data is clocked in and clocked out of registers 1107, 1109, and 1111 in parallel.

The first stage of the pipeline for the Bus Arbitration and Priority Circuit 825 consists of the Priority Encoder 1101, the loading or incrementing of address registers 1103, decrementing counters 1201, and preparing data to be loaded into read registers 1111.

The second stage of the pipeline for the BAPC 825 consists of a Read-Write Device Select circuit 1113. The Read-Write Device Select circuit 1113 operates to select which device to read from or which device to write to. Circuit 1113 accepts as input two sets of signals from the pipeline register 1107. The first set of signals consists of the eight HiREQ lines and the second set is the eight Write lines. Circuit 1113 has as output lines a Chip Enable (CE) line for enabling the RAM 309, an Output Enable (OE) line for setting the RAM in Write or Read mode as appropriate for the request by the selected device, and a signal line for clocking data in or out of the RAM (DevReadE). At the conclusion of the second stage these signals (CE, OE, DevReadE) are clocked into pipeline register 1119.

Additionally, there are eight Device Write Enable lines output from the Select circuit 1113. If the selected device has made a write request, the corresponding Device Write Enable line is set to high, otherwise it is left low. The Device Write Enable lines for all non-selected devices remain low. The eight Device Write Enable lines are clocked into the pipeline register 1119.

The Circuit 1113 has one output Read Select line corresponding to each device with a read register 1111. The Read Select line corresponding to the selected device is turned high by the Select circuit 1113 if the request from the selected device is a read request, otherwise it is held low. All other read select lines are held low. The read select lines are each fed into switches 1115-1 through 1115-8, respectively, which in turn are connected to the output of the read registers 1111-1 through 1111-8, respectively. The switches 1115 allow data to be transferred out of the read register 1111 to which it is connected onto the read bus 831. At the conclusion of the second stage the data on the read bus 831 is clocked into a pipeline register 1117. Thus, at the end of the second stage, for a read operation, the pipeline register 1117 contains the data read from the device.

The second stage also contains an address multiplexer 1121. The address multiplexer 1121 receives as inputs the addresses from the eight address pipeline registers 1109-1 through 1109-8. These addresses are selected by the HiREQ lines. Only one HiREQ line is held high at any one time. The address mux 1121 selects the address stored in the corresponding address register 1109. At the end of the second pipeline stage, the selected address is clocked from the mux 1121 into a pipeline register 1123.

The third pipeline stage consists of moving data into the RAM 309 or out from the RAM 309, as the case may be, depending on the type (read or write) of request made by the selected device.

The address pipeline register 1123 is connected to the RAM 309. On a positive clock transition the address stored in register 1123 is made available to the RAM 309 so that the RAM can access that particular address.

Three lines connect the RAM 309 to the pipeline register 1119. The first of these is the ChipEnable (CE) line. In stage 2, if a RAM 309 access is being processed, the Device Select Circuit 1113 sets the CE line high to enable the RAM 309. As the CE line value is stored in the pipeline register 1119, the CE value set by the Select Circuit 1113 is transferred to the RAM 309 in the third stage. A second control line from the pipeline register 1119 to the RAM is the Output Enable (OE) line. The OE line carries a signal for informing the RAM whether it is being accessed in write mode or in read mode.

A line for carrying the DevReadE signal connects the pipeline register 1119 to a switch 1125 that connects read data pipeline register 1117 to a RAM bus 1127. If a read operation (i.e., the RAM 309 is reading from the selected device) is being undertaken the DevReadE signal is high (as set by the Device Select Circuit 1113). When the DevReadE signal is high, the data in the pipeline register 1117 is allowed to transfer through the switch 1125 onto the bus 1127.

To perform a direct memory access the write-enable (WE) and OE signals for the RAM 309 and the selected device are reversed. In other words, when the RAM 309 "reads", the device "writes" and vice versa. Thus, the OE signal output from the Device Select Circuit 1113 is the inverse of the DevReadE signal. The DevReadE signal is also NANDed (via gate 1130) with the system clock signal to produce a write enable signal (WE) which is output from the gate 1130 to the RAM 309. The WE signal is a write strobe for the RAM 309. This is especially useful when two back-to-back write operations take place.

At the conclusion of the third stage for a read operation on the strobe provided by the WE signal, the data on the RAM bus 1127 is transferred into the RAM, at the address on the RA line connecting the address pipeline register 1123 to the RAM.

For write operations, i.e., where the RAM 309 is used to write to a device, during the third stage the data stored at the address on the RA line is transferred out of the RAM 309 onto the RAM bus 1127. At the conclusion of the third stage, for write operations, the data on the RAM bus 1127 is transferred into the Write Pipeline Register 1131.

Also during the third pipeline stage the DevWE 1 through 8 signals are transferred from pipeline registers 1119 into pipeline registers 1129-1 through 1129-8. This transfer is used to time the arrival of the DevWE signals to the arrival of the data to be written into the selected device's write register.

In the fourth stage of operation of the bus arbitration and priority circuit 825, the data in the Write Pipeline Register 1131 is transferred first onto the Write Bus 833 and then from the Write Bus 833 into the selected device's write register. Thus, the Write Pipeline Register 1131 is connected to the Write Bus 833. The Write Bus 833 is connected, via switches 1133-1 through 1133-8, to Write Registers 1135-1 through 1135-8. Because not all devices are "write to" devices, not all devices have write registers. The switches 1133 are each connected to and controlled by a corresponding DevWE line, e.g., switch 1133-1 is connected to DevWE1. When the particular DevWE line carries a high signal, the switch 1133 allows data to transfer from the Write Bus 833 into the corresponding Write Register 1135. Thus, for a write operation, at the conclusion of the fourth stage, the Write Register 1135 of the selected device contains the data held at the end of the third stage in the write pipeline register 1131.

Because the bus arbitration and priority circuit 825 is a pipelined architecture, it can process read and write requests from the devices 901 at a rate of one operation per clock cycle. The latency at the RAM level is 2 clock cycles. The latency at the device level is 3 clock cycles for the write devices (data written to the device), and 1 clock cycle for the read devices (data written to the RAM).

Figure 13:
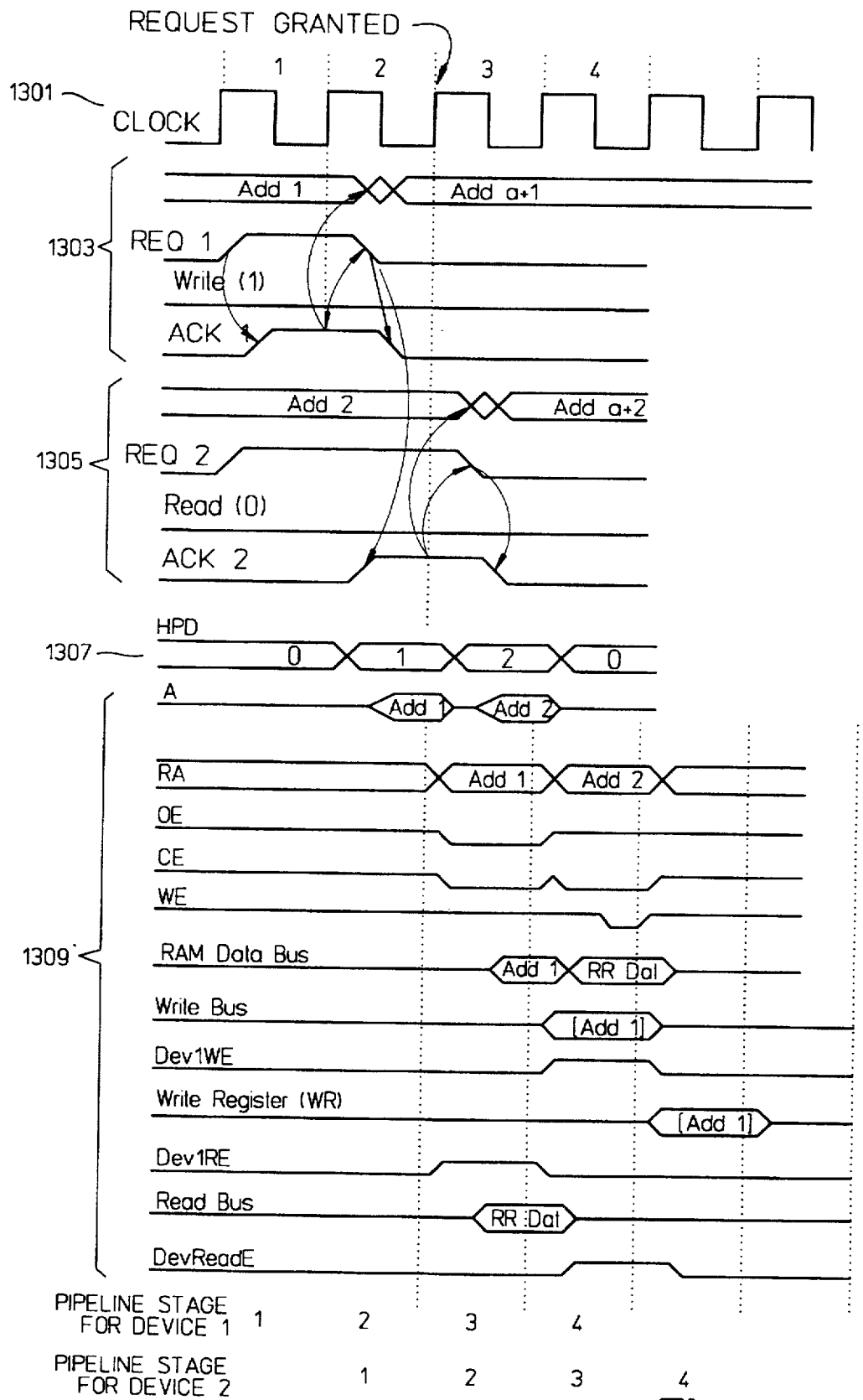
FIG. 13 is a timing diagram showing an exemplary set of transactions processed by the bus arbitration and priority circuit of FIG. 11.

FIG. 13 is a timing diagram showing an exemplary set of transactions processed by the bus arbitration and priority circuit 825 of FIG. 11. The diagram of FIG. 13 shows the system clock (1301), the address, REQ, Write (~Read), and ACK lines for a first device (lines 1303) and for a second device (lines 1305), the selected device (line 1307), and the values of various lines internal to the circuit shown in FIG. 11.

In the example of FIG. 13, two devices 901-1 and 901-2 are both seeking access to the RAM 309. Device 1 is making a write request and Device 2 is making a read request. In pipeline stage 1 both devices have raised their respective REQ signals. Device 1 is higher priority than Device 2, therefore, with two high REQ signals input to the Priority Encoder 1101 sends an ACK to Device 1, who lowers its REQ signal in stage 2. Therefore, in stage 2, Priority Encoder 1101 receives only the REQ signal from Device 2 as being high, and sends it an ACK.

Master of All Pointers

Each of the devices that access the RAM 309 (devices 805, 807, 809, 811, 813, 815, 817, 819, and 829) accesses a particular section or buffer of the RAM at a time. During the time interval that one device accesses a particular buffer no other device has concurrent access to that buffer. The address that a device accesses is stored in the device's internal address register (1203 of FIG. 12). That address is initialized by the microprocessor 302.

The Downstream Control Device 805 and the Downstream Payload Device 807 operate relatively autonomously from the microprocessor 302. The DCD 805 and DPD 807 both write to defined buffers in the RAM 309. For both DCD 805 and DPD 807 the buffer extent is defined by two registers in the control circuit 301, namely, the top of buffer (TOB) register and the bottom of buffer (BOB) register.

The other devices, i.e., devices 809, 811, 813, 815, 817, 819, and 829 operate on one packet of data at a time. The location of these packets is managed by a small register file in the control unit 301 called the Master of All Pointers 827.

The MOAP 827 is a 16×16 bit embedded memory which contains starting addresses of different buffers in the common RAM 309. Using C++ language's syntax:

```
int * addressA = new int[sizeof_block_A];
int * addressB = new int[sizeof_block_B];
int * addressC = new int[sizeof_block_C];
int * addressD = new int[sizeof_block_D];
...
int * MOAP[] = {addressA, addressB, addressC, addressD ... };
```

Figure 14A:
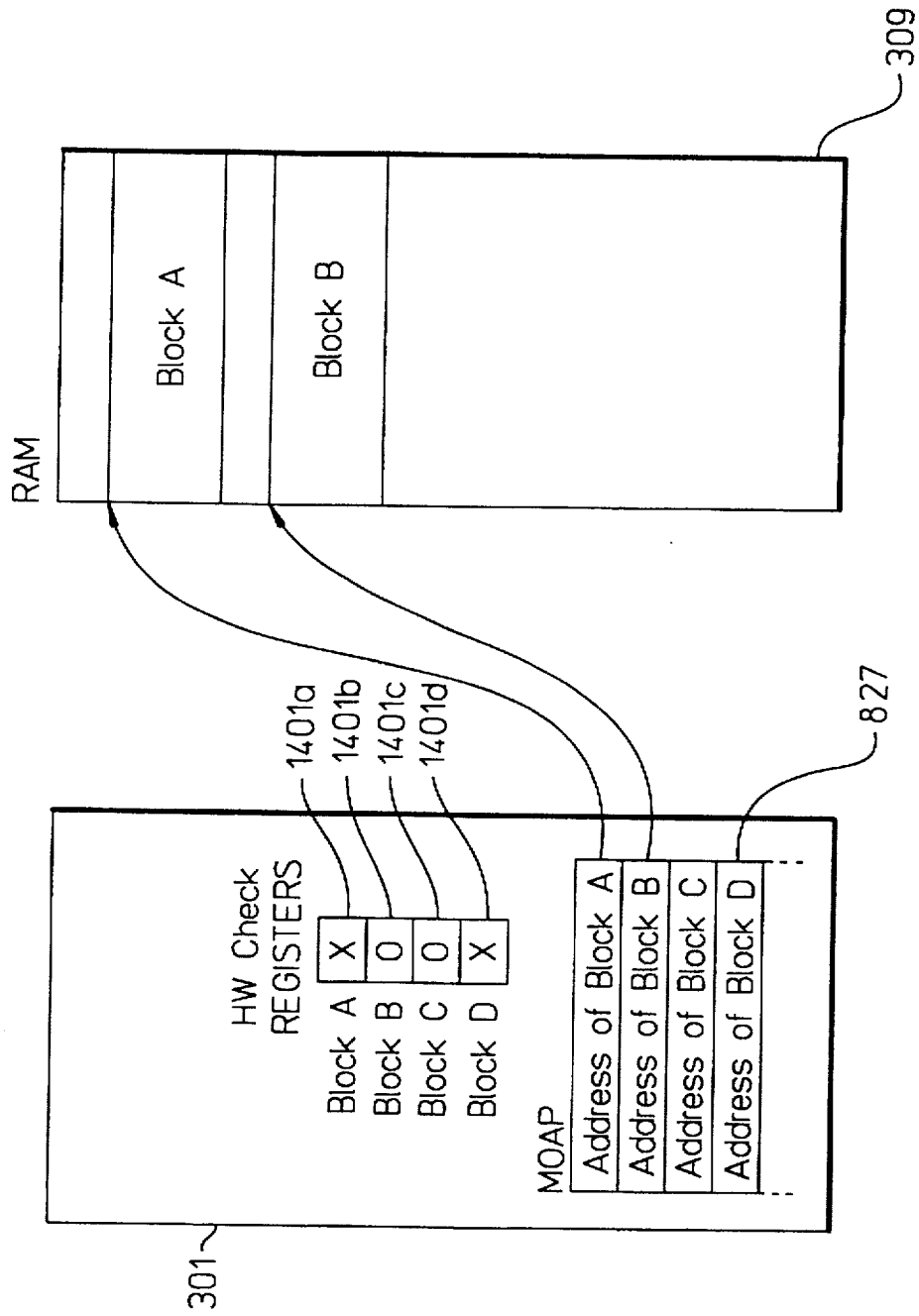
FIG. 14(a) is a high-level schematic of the Master of All Pointers (MOAP) structure of the control circuit of the cable modem as shown in FIG. 8.

FIG. 14(a) is a high-level schematic of the MOAP 827 structure. Using this structure the CM 113 is able to manipulate and move data blocks dynamically.

The operation of the MOAP 827 is best understood using an illustrative example. Suppose, the microprocessor 302 communicates with the LAN chip 307 and thereby learns that a data packet is available from the PC to be transmitted upstream to the SCS 101. The microprocessor 302 then allocates a portion of memory for this packet, writes the start of this address in MOAP 827, prepares the header with the iteration count information, and signals the LTR (LAN to RAM) Device 815 that this pointer is valid. LTR Device 815 copies this MOAP 827 entry into its own address register and starts to copy the data from the LAN chip 307 into the RAM 309 using the address register (of course using the BAPC 825 as described above).

When the entire packet is transferred to the RAM, the LTR Device 815 signals the microprocessor that it has completed its task. The microprocessor then prepares the cipher chip 311 by selecting or writing the correct decryption key to a register addressable by the Cipher Device 811, updates the header of the packet with the iteration count information, and then writes the beginning address of the data block into the MOAP 827 register for the Cipher Device 811 and signals the Cipher Device 811 to start the cipher operation.

The Cipher Device 811 copies its MOAP 827 entry into its own address register and begins the cipher operation. At the end of the cipher operation, the Cipher Device 811 signals the microprocessor 302.

At that point the data block is ready for transmission. The microprocessor writes the beginning address of this data block into MOAP 827 register for the Upstream Device 809, prepares the header, prepares the reservation block if necessary, and signals the Upstream Device 809 to transmit the packet.

The Upstream Device 809 then copies its MOAP 827 entry into its own address register and with collaboration with the Downstream Control Channel Device 805, transmits the block.

The advantage of the MOAP structure and the microprocessor 302 controlled method of accessing blocks of data in the RAM 309 is flexibility to focus the attention of different devices to a particular block in memory by writing the beginning address of this particular block into the MOAP 827 area and signal the devices to use that block for their particular use. Decision regarding size of buffers, number of buffers and location of buffers becomes simply a microprocessor decision and needs not be hard coded.

The only hardcoded values in a state machine that control the operations of any one of the devices is the address in the MOAP 827 entry pointing to the block of interest to that state machine. For example, the device working on block A in FIG. 14(a), is hardcoded to receive the pointer to block A from the first word of the MOAP 827. Whereas, the device interested in block B is hardcoded to receive pointer to block B from the second word of the MOAP 827.

There are several devices working simultaneously on several blocks of data within the control circuit 301. The mechanism for communication between the microprocessor 302 and the devices with respect to these blocks are single bit registers assigned to each group of memory blocks. These registers are read/writeable both by the devices and the microprocessor 302. These single bit registers are referred to as "check registers" and shown graphically in FIG. 14(a) as elements 1401a, 1401b, 1401c, and 1401d. Operations on these check registers 1401 are as follows:

The microprocessor 302 assigns a block of memory to a device, writes the beginning address to the MOAP 827, and sets the corresponding check register 1401 for the device. The state machine that controls the device normally waits for its check register 1401 to be set. When the check is set, the state machine progresses forward, copies the MOAP 827 entry, and unchecks the check register 1401. When the microprocessor 302 sees the register unchecked, the microprocessor 302 assigns the next block and sets the check again.

In the preferred embodiment, there are the following entries in MOAP:

```
MOAP[0] = next RAM to LAN block
MOAP[1] = next LAN to RAM block
MOAP[2] = next cipher block
MOAP[3] = next cipher block offset
MOAP[4] = upstream preamble block
MOAP[5] = upstream reservation block
MOAP[6] = upstream reservation block offset
MOAP[7] = next upstream transmit block
MOAP[8] = next upstream transmit block offset
```

Two blocks, pointed to by MOAP[0] and MOAP[1], need only the beginning address of the individual packets to be specified in MOAP. The packets in these two blocks need the attention of the microprocessor 302 individually and must always be prepared by the microprocessor 302 first. The microprocessor 302 decides which packet is going to be processed and it controls the LAN chip 307 prior to handing over the control of the packet to the devices of the control circuit 301.

There are two entries in MOAP for the Cipher Device 811 (MOAP[2], MOAP[3]). One entry points to the beginning of the packet which is actually the header to the packet. Another entry is the offset from the beginning of the packet to the actual data block to be ciphered. The reason for this arrangement is the fact that a cipher block can be one of several types of packets with different data formats. For example a downstream payload packet needs decryption, whereas, an upstream data packet needs encryption. The format for the upstream and down stream packets are different from each other. For this reason MOAP 827 contains additional information for the offset of the data for each packet. The microprocessor 302 decides which packet needs to be ciphered. Then, the microprocessor 302 loads the appropriate key, IV register, and sets the mode register of the cipher chip 311. After having done so, the microprocessor 302 updates MOAP[2] and MOAP[3] with the correct address and offset of the packet.

The upstream transmission is mostly a two step process. First, the microprocessor 302 decides which packet is going to be transmitted upstream. Then, based on the length of the packet and MTU (Maximum Transfer Units), the microprocessor 302 calculates the number of "slots" to be reserved for the upstream transmission. The microprocessor 302 then updates the reservation field of a reservation packet, which may either be an empty template or another data packet, with "slot" information and points MOAP[5,6] to this reservation packet. The microprocessor 302 then writes the beginning address and offset of the block to be transmitted to MOAP [7,8]. The microprocessor 302 then signals the Upstream Device 809 to transmit "with reservation".

The Upstream Device 809 first transmits the preamble in two parts, a constant stream of "1" by hardware, and the rest of the preamble pointed by MOAP[4], then the reservation packet over the contention channel using the full protocol for acknowledgment and back off as described above. The Upstream Device 809 then transmits the preamble and the actual data packet over the reservation channel without acknowledgment.

There are several variation of this scheme. For example, the microprocessor 302 may decide to send a packet with a length that is less than Minimum TU through the contention channel. In that case only the packet which is pointed by MOAP[7] will be transmitted over the contention channel with the acknowledgment.

In another case, the microprocessor may decide to group several packets into one reservation process and build one reservation packet pointed by MOAP[5] representing all these packets. The microprocessor then guarantees to update MOAP[7,8] with the address of the next packet during the transmission of the previous packet until all packets are transmitted.

No packet should be shorter than Minimum TU (difference in round trip delay between the closest and farthest cable modem). The mechanism to guarantee a minimum size packet regardless of the packet content is the size of the postamble. The postamble size is at least two bytes of don't care data. The amount of postamble in bytes is written on the header for the upstream transmission. The microprocessor 302 writes the size of postamble for each packet, including the reservation packet, on the header of the packet.

Packet Formats in RAM

Figure 14B:
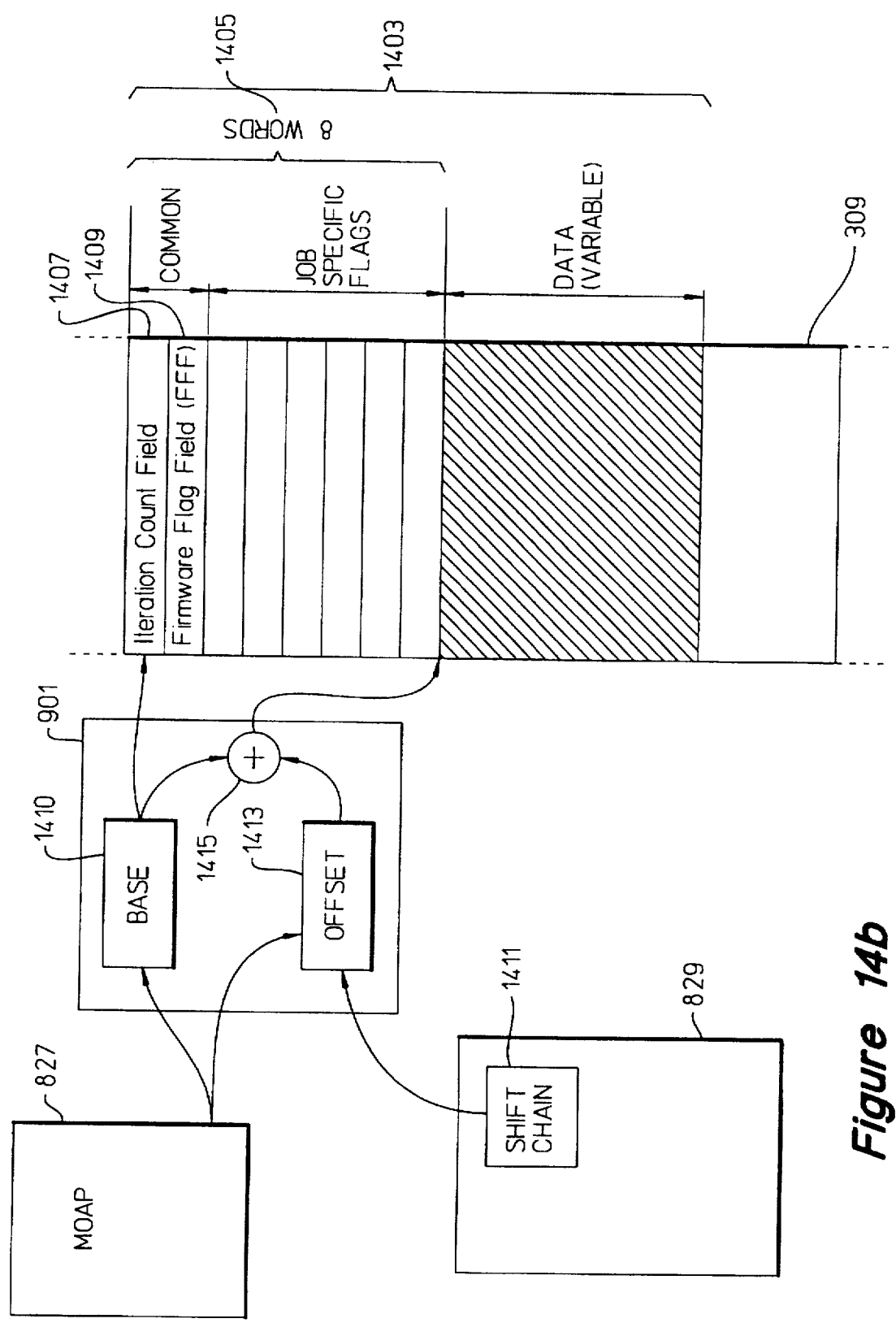
FIG. 14(b) is a schematic of the general formats of data packets as these are stored in RAM.

FIG. 14(b) is a schematic of the general formats of packets 1403 as these are stored in RAM 309. A header 1405 is added to each packet with some status and count information to help the state machines and the microprocessor 302. The size of the header is changed by programming the shift register chain (KTREG[0]). Eight words are added as a header 1405 of packets received on the downstream channel. The first two words are common to all packet types.

The first word 1407 is information regarding the number of iterations which the state machine which gets hold of the packet 1403 must go through in order to process the packet 1403. The iteration count word 1407 is written by the microprocessor 302. The second word 1409 is a Firmware Flag Field (FFF) and is reserved for the microprocessor 302.

Words 3 through 8 are job specific and are not necessarily used by a particular state machine.

An example of the header 1405 usage is the case of downstream payload data. The downstream payload data uses four words of the header during its journey from the cable 111 to the LAN chip 307. When packets are received, the downstream payload device 807 checks the type of incoming payload address. If the packet is a multicast packet,and it is addressed to this particular CM 113, the Downstream Payload Device 807 calculates the hash value for this address and writes it into header's 1405 word number 4.

When the packet is completely received, the DPD 807 writes the number of bytes of information received, including the overhead, to the header's 1405 word number 3.

The microprocessor 302 calculates the number of iterations for the decryption operation (multiples of 8, including the pads, excluding the overhead) and writes to the header's word number 1 (iteration field). The microprocessor also checks the E (Encryption) bit, T (subscriber payload in data) bits, and also address fields of the payload data to determine the correct decryption key for the cipher operation. If the address is a multicast address, the microprocessor 302 uses the header's 1405 word number 4 (hash value) to make a quick exact comparison of the MAC address. The microprocessor can then set the "green light" to start the Cipher Device 811 state machine.

After decryption, the microprocessor 302 reads the original byte counts (header's 1405 word 3), adjusts it for the overhead, and writes it to the LAN chip 307. Using the same information, the microprocessor 302 calculates number of words which must be written to the LAN chip and writes this value to the header's 1405 word number 1 (iteration field), and signals the RAM-to-LAN device 819 to iteratively transfer the data to the LAN chip 307.

Each state machine has at least a 16 bit register/counter which it uses as an address register. This register is the BASE register 1410 and is usually loaded from the MOAP 827. Each state machine also has a 5 bit OFFSET register 1413 which is loaded from the shift chain 1411 (the shift chain is described in the section entitled "Internal Registers"). Because the cipher blocks are either for encryption or decryption with different offset values for each cipher operation, the Cipher Device 813 loads its OFFSET register 1413 from the MOAP 827 pointer for each packet. To obtain the actual address of a packet to be accessed the BASE register 1411 content is added by adder 1415 to the OFFSET register 1413.

Microprocessor

The microprocessor 302 plays a major role in performance of cable modem 113 and the operations of the control circuit 301. The control circuit 301 contains a number of input/output registers (described below in Section "Microprocessor Register View"). The microprocessor 302 controls the operation of the cable modem 113 by setting these registers.

A number of initialization tasks are executed by the microprocessor 302. On initialization the microprocessor 302 determines the cable modem's MAC address and transfers the information to the hardware registers of the control circuit 301. The microprocessor 302 also initializes the control circuit 301, the tuner 303, and the transmitter 305.

Also during initialization the microprocessor 302 negotiates with the server station 101 thorough the upstream channel to do encryption key calculation and key exchange. There are two types of initialization: the intialization at installation and the initialization of a successfully installed cable modem 113 that goes through a power cycle.

At installation, the cable modem's 301 first task is to find a downstream channel. To find a downstream channel, the cable modem 113 performs a tune and test operation of the tuner 303 through a table of channels. This table is stored in the microprocessor 302 ROM. The ROM based channel tuning table is arranged so that the cable modem 113 tunes to high probability channels before trying low probability channels. For each entry in the table the cable modem tunes to the channel, and attempts to receive the downstream control stream. If the CM 113 does not receive the downstream control stream, the CM 113 assumes that the channel is not a downstream channel from the server station 101, and tunes the tuner 303 to the next entry in the table. If the cable modem 113 tunes completely through the table without finding a downstream control channel, an error indicator is turned on (e.g., an error light on the cable modem 113) and processing ceased until the cable modem 113 is power cycled again.

Once the cable modem 113 has recognized a downstream channel, it stores the channel number in a EEPROM and uses that downstream channel number on subsequent power-up.

The downstream channel number may change from time-to-time. The operator of the server station 101 changes the downstream channel by sending out a change-downstream-channel frame on the control channel some time before the actual change (e.g., one or two days). The cable modem stores the new channel number in EEPROM. When the cable modem 113 is no longer able to detect the old downstream channel, the cable modem 113 automatically changes to the new channel by causing the tuner 303 to change the channel on which to receive.

At cable modem 113 power on, the link between the cable modem 113 and the server station 101 is established by first tuning the tuner 303 to the downstream channel last stored in the EEPROM. The cable modem then waits for the server station 101 to describe the upstream channels currently in service. When the upstream channel number is known, the cable modem 113 waits for a sign-on slot. Sign-on slots are reserved for initializing the cable modem's 301 transmission power setting. The cable modem 113 transmits first at the average power setting (this information is sent out by the server station 101) and waits for a sign on-ACK from the server station 101. If no ACK is received, the power setting is increased and after a random number of sign on slots pass, the cable modem 113 retries. After exhausting the increased power settings the cable modem 113 begins backing off from the average power setting.

After the cable modem 113 has determined the correct power setting, this power is stored in EEPROM for reuse on subsequent power up sign-ons. The server station 101 may at any time request that the cable modem 113 increases or decreases its power setting.

After the correct transmission power setting has been established, the cable modem 113 can communicate with the server station 101. At that stage, the cable modem 113 sends Diffie-Heilman key exchanges necessary to identifying itself and to obtain the DES encryption keys. The microprocessor manages the key exchange algorithm and stores the exchanged keys and generated random numbers in registers for use by the Cipher Device 813 and the Cipher chip 311.

During initialization, the microprocessor 302 also initializes a register file that contains pointers that the devices (805, 807, 809, 811, 813, 815, 817, 819, and 829) use to access the RAM 309. The microprocessor also intializes the memory structures resident in the RAM 309.

During operation of the cable modem 113 the microprocessor interacts through registers (see discussion below under "Internal Registers") with the control circuit 301, and manages the RAM 309 and buffers held in the RAM 309.

The microprocessor also prepares the LAN chip 307 by reading and writing the LAN chip's 307 status and associated control registers.

The microprocessor 302 also manages the MOAP 827 and control registers in the control circuit 301 to guide the control circuit's 301 state machines to move data between the various devices of the control circuit 301. The state machines are described below in the section entitled "State Machines".

The microprocessor 302 also processes commands the cable modem 113 receives on the downstream control channel and the payload channel, and perform these commands.

Furthermore, the microprocessor 302 determines the duration of a timing slot from status registers in the microprocessor interface 829 of the control circuit 301 and provides this information to the Upstream Channel Device 809. Furthermore, the microprocessor 302 manages the construction and scheduling of the transmission of "Reservation Request Packets" when packet length of an upstream transmission is greater than current slot length. The microprocessor also provides support for the Upstream Channel Device 809 by setting the control circuit's internal registers for transmission functions as necessary.

Internal Registers

All transactions by the microprocessor 302 to CM 113 components, including the control circuit 301, are through the I/O registers. Each device is assigned a contiguous I/O space. For example LAN Chip 307 will be assigned "N" 16 bit registers with the starting address of LNBSE. The Control Circuit's 301 common RAM 309 is virtualized to appear as a 64K contiguous array of word registers. There are 6 I/O spaces in Cable Modem 113 including the common RAM 309 I/O. The base address for these I/O spaces are:

| | |
|---|---|
| LAN 307 | LNBSE |
| CIPHBR 311 | CIBSE |
| TUNER 303 | TUBSE (tuner and support circuitry) |
| TRANSMITTER 305 | TRBSE |
| Control Circuit 301 | KTREG (register space) |
| Control Circuit 301 | KTRAM (common RAM 309 space) |
| Control Circuit 301 | KTMOAP(MOAP register file) |
| The registers of the Control Circuit 301 are described below: | |
| KTRAM + n    common RAM word n | R/W |
| KTMOAP + n   MOAP word n | R/W |
| KTMOAP[0] = next RAM to LAN block | |
| KTMOAP[1] = next LAN to RAM block | |
| KTMOAP[2] = next cipher block | |
| KTMOAP[3] = next cipher block offset | |
| KTMOAP[4] = upstream preamble block | |
| KTMOAP[5] = upstream reservation block | |
| KTMOAP[6] = upstream reservation block offset | |
| KTMOAP[7] = next upstream transmit block | |
| KTMOAP[8] = next upstream transmit block offset | |
| KTMOAP[15:9] = unused | |
| KTREG + 0    Shift Chain | |
| bit 0   R/W     dout/din | |
| bit 1   W       shift | |

There are many registers inside the Control Circuit 301 which are initialized only once and their values don't change often. These registers are chained together and are accessed as a long shift register. The data at the end of the shift chain appears on bit 0 when register 0 is read. To shift a single bit of data into the shift chain two write operations are required. First write bit 0=data bit, and bit1=1 into register 0. Then write bit 0=same data bit, bit 1=0 into register 0. Data is shifted into the shift chain at the falling edge of the bit 1. Reading the shift chain is a destructive read. To preserve the contents of the shift chain when reading the chain, the microprocessor 302 first, reads bit 0, then shifts the bit back into the shift chain as described above. The microprocessor 302 must read or write the entire shift chain. The following are the contents of the shift registers:

| | |
|---|---|
| My MAC address | 48 bits |
| Payload state machine offset | 5 bits |
| LAN to RAM state machine offset | 5 bits |
| RAM to LAN state machine offset | 5 bits |
| Payload top of buffer (PTOB) | 16 bits |
| Payload bottom of buffer (PBOB) | 16 bits |
| Downstream control top of buffer (DSCTOB) | 16 bits |
| Downstream control bottom of buffer (DSCBOB) | 16 bits |
| Preamble block size | 4 bits |
| Preamble initial ONE's size | 3 bits |
| Back off algorithm parameter | 4 bits |
| Q256 signal to front end preprocessor | 1 bit |

In alternative embodiments, the registers in the shift chain are direct access registers.

My MAC address is the 6 byte MAC address which the cable modem is represented with. It is the cable modem's 113 MAC address.

The offset for packets residing in RAM 309 for the RAM-To-LAN 819, LAN-To-RAM 815, and Payload 807 state machines are set using offset registers. RAM 309 resident packets are described above in conjunction with FIG. 14(*b*). Changing the value of the offset register changes the size of the header.

PTOB, PBOB and DSCTOB, DSCBOB are top of buffer, bottom of buffer for the payload and downstream control buffers and are discussed in the section entitled "Buffer Management".

Preamble block size is the size (in words) of the fixed portion of the upstream preamble that is transmitted before each upstream block. The preamble block contains cable modem MAC address, sync, and part of the five-byte long all 1 flag.

Preamble initial ONE's size is the size of initial preamble all 1's flag, in words, which is transmitted by the hardware before transmitting the rest of the preamble from the RAM 309. Back off algorithm parameter is a number between 6 to 10 which is determined based on the installation and topology of the network. This parameter will determine efficiency of the back off algorithm.

| | | |
|---|---|---|
| KTREG + 1 | Check Registers (No Interrupt, Firmware to Hardware) R/W | |
| bit 0 PLFC | Payload from cable buffer is valid | |
| bit 1 CIPH | Cipher block ready | |
| bit 2 RTL | Spin Data from RAM to LAN Interface | |
| bit 3 DSCC | Down stream control buffer is valid | |
| bit 4 LTR | Spin data from LAN Interface to RAM | |
| bit 5 USTR_RSV | Upstream transmit, perform | reservation |
| bit 6 USTR_NC channel | Upstream transmit, No Contention | |
| bit 7 USTR_C | Upstream transmit, Contention channel | |
| bit 14 SMRTIASAP | State machines return to idle ASAP | |
| bit 15 SR | Set (1), reset (0) bit | |

KTREG+1 is a hardware check register in which the individual bits are set by the microprocessor 302. These individual bits signal the hardware state machines to perform their particular tasks. When they receive the command, the state machines clear these bits. Clearing the bits by the state machines works as sending an acknowledgment to the microprocessor 302. Since register 1 bits are set by the microprocessor 302, no interrupt will be generated when these flags are set.

Upstream transmission is a complicated operation of the cable modem 113 and in general is completed in two steps. The first step is the reservation, and the next step is the transmission of the data packet. Each step also must work with close timing cooperation with the downstream control channel. There are 3 cases of transmitting an upstream packet.

Case 1 is when the microprocessor 302 decides to transmit a single data packet through the reservation channel. In that case the microprocessor 302 must calculate the required number of reservation slots based on MTU and update the reservation structure in the common RAM 309. The microprocessor 302 then sets the USTR_RSV bit. The UD 809 first transmits the reservation packet through the contention channel and then transmits the data packet through the reservation channel.

Case 2 is when the microprocessor 302 decides to group several upstream packets for transmission through the reservation channel. In that case the microprocessor 302 calculates the required number of reservation slots based on MTU, individual, and total length of the upstream packets and updates the reservation packet template in the common RAM 309. The microprocessor 302 then sets the USTR_RSV bit for the first packet. The microprocessor 302 then monitors USTR_RSV bit. When this bit is cleared by the UD 809, it indicates the first packet is being transmitted. The microprocessor 302 then must prepare the next packet and set the USTR_NC bit to signal the state machine that the next packet is part of a series of packets participating in reservation scheme and must be transmitted at the beginning of the first available time slot. The microprocessor 302 then monitors and sets USTR_NC bits for the remaining packets as the previous packet is being transmitted.

Case 3 is the case the microprocessor 302 decides a packet shorter than MTU must be transmitted over the contention channel. In that case it prepares the packet and sets the USTR_C bit. The state machine then transmits that data packet only through the contention channel.

State machines are designed to monitor KTREG+1 bit 14, "SMRTIASAP, state machines return to idle ASAP", frequently and return to idle state when they see this bit is set to "1". This is a convenient way to halt all the actions in the cable modem 113. For best result, all other bits of KTREG+1 must be set to 0.

Each of the KTREG registers (e.g., KTREG+1) is not a single multi bit register. Each KTREG register is actually several independent 1 bit registers. Having independent bit registers prevents a race condition when microprocessor 302 tries to read and modify a bit while the control circuit 301 tries to clear another bit. To set a bit to 1, write a 1 to the corresponding bit position with bit 15 also set to 1. To reset a bit to 0, write a 1 to the corresponding bit position with the bit 15 set to 0. For example, writing a value of 0x8005 into KTREG+1 will set the PLFC and RTL to 1 without affecting the other bits, writing a value of 0x000A into KTREG+1 will clear the CIPH and DSCC bits without affecting the other bits.

| KTREG + 2 Firmware) R/W | Check Registers (With Interrupt, Hardware to |
|---|---|
| bit 0 PLFC_WRAP | Payload buffer did wrap around |
| bit 1 DSC_WRAP | Downstream control buffer did wrap around |
| bit 2 CDNE | Cipher done |
| bit 3 RTLDNE | RAM to LAN done |
| bit 4 PLFCDNE | Payload from cable one packet done |
| bit 5 LTRDDNE | LAN to RAM data done |
| bit 6 USTRTDNE (excluding the reservation packet) | Upstream transmit one packet done |
| bit 7 CONTRCD received | Downstream control one packet |
| bit 15 SR | Set (1), reset (0) bit. |

The bits of the KTREG+2 register are set by the hardware state machines and in general inform the microprocessor 302 progress status of the state machines and the hardware. The microprocessor 302 can clear the bits and wait for the next change condition on each bit. Setting of any of these register bits generates a microprocessor 302 interrupt. Interrupts can be enabled or disabled by writing into KTREG+3. It is up to the microprocessor 302 to decide to use the interrupts depending on algorithms used and the microprocessor's interrupt latency.

Bits 2 to 7 are cleared by the state machines when they grab the next block's address from the MOAP and are set when that packet is done. These bits remain set until either they are reset by the microprocessor 302, or until the next block begins to be processed. This is done to prevent a need for constant attention of the microprocessor 302. microprocessor 302 can monitor the corresponding bits of register 1 and arrange multiple packets to be processed one after another as soon as the state machine grabs the address of the block from the MOAP and clears the flag. Clearing the flag by the state machines means the previous block is done. Therefore, no need to check and clear the corresponding bits of KTREG+2. Because the state machines also clear the corresponding bits of the KTREG+2, these bits represent the state of the last packet being processed independent of whether another packet is queued up or not.

Bit 15 works exactly as bit 15 of KTREG+1.
KTREG + 3    Interrupt Mask Registers    W
KTREG+3 has one bit corresponding to each bit of above KTREG+2.

-continued

When a "1" is written to this bit position, the corresponding interrupt is enabled.

| KTREG + 4 | Errors (Payload) | R/W |
|---|---|---|
| bits 7:0 | Count of payload CRC error | |
| bits 15:8 | Count of payload missed buffer error | |
| KTREG + 5 | Status (Payload) | R/W |
| bits 15:0 | Count of received payload packets | |
| KTREG + 6 | Errors and Status (Downstream Control) | R/W |
| bits 7:0 | Count of downstream control CRC error | |
| bits 15:8 | Count of downstream control missed buffer error | |
| KTREG + 7 | Errors and Status (Downstream Control) | R/W |
| bits 15:0 | Count of received downstream control packets | |
| KTREG + 8 | Error and Status (Upstream) | R/W |
| bits 15:0 | Count of upstream retransmission error | |
| KTREG + 9 | Error and Status (Upstream) | R/W |
| bits 7:0 | Count of upstream dropped packets due to failure of back off | |
| KTREG + 10 | Status (Upstream) | R/W |
| bits 15:0 | Count of transmitted upstream packets | |
| KTREG + 11 | Buffer Management (Payload) | W |
| bits 15:0 | Payload firmware read pointer | |
| KTREG + 12 | Buffer Management (Payload) | R/W |
| bits 15:0 | Payload Control Circuit 301 write pointer (payload base register) | |
| KTREG + 13 | Buffer Management (Downstream Control) | W |
| bits 15:0 | Downstream control firmware read pointer | |
| KTREG + 14 | Buffer Management (Downstream Control) | R/W |
| bits 15:0 | Downstream Control Circuit 301 write pointer (Downstream control base register) | |
| KTREG + 15 | Error and Status Rollover registers | R/W |

Each bit in KTREG+15 is a flag indicating the rollover of a particular counter.

| bit 0 | Payload CRC error counter rollover | |
|---|---|---|
| bit 1 | Payload missed buffer error counter rollover | |
| bit 2 | Received payload packets counter rollover | |
| bit 3 | Downstream control CRC error counter rollover | |
| bit 4 | Downstream control missed buffer error | counter rollover |
| bit 5 | Received downstream control packets | counter rollover |
| bit 6 | Upstream retransmission error counter rollover | |
| bit 7 | Upstream dropped packet counter rollover | |
| bit 8 | Transmitted upstream packets counter rollover | |

The microprocessor 302 can only reset above bits. Writing a "1" in any bit position will only "reset that bit to 0" and will not affect the other bits. For example writing 0x0003 to this register will only reset bits 0 and 1 to "0" and will not affect other bits.

Above bits will remain set after the rollover until half of the maximum count is reached into the next count cycle. For example, bit 2 is set to "1" when KTREG[5] rolls over from 0xffff to 0x0000 and stays at "1" until the count reaches 0x8000 into the next counting cycle. This gives enough time for microprocessor 302 to clear the bit and accumulate the overall counts.

An interrupt is generated when any of these bits are set.

KTREG + 16    Interrupt Mask register for above KTREG +    14
              R/W
Writing a "1" into any bit position will enable the interrupt from the corresponding bit of KTREG[15]. Accordingly a "0" will disable the interrupt.
KTREG + 17 to 20    Multicast address Logical Address
                    Filter (LAF) registers    W
KTREG[17]15:0       LAF(15:0)
KTREG[18]15:0       LAF(31:16)
KTREG[19]15:0       LAF(47:32)
KTREG[20]15:0       LAF(48:63)
KTREG[21]    Hardware reset register    W
bit 0        Control Circuit 301 hardware reset
bit 1        Tuner hardware reset

| | |
|---|---|
| bit 2 | Cipher chip hardware reset |
| bit 3 | LAN hardware reset |
| bit 4 | Transmitter hardware reset |
| bit 5 | Microprocessor hardware reset |

Writing a 1 into any bit position sends a reset signal on the hardware reset line of the corresponding device. Sending a reset signal on the Control Circuit's 301 hardware reset line clears ALL internal registers.

Bit 5, microprocessor hardware reset is used by the microprocessor 302 to force a reset upon itself, which it does by writing a 1 in bit 5. A short reset pulse is generated after a brief initial delay. The reason for a hard reset rather than a software reset is that the former provides a clean initial hardware state including refreshed cache registers.

| | | |
|---|---|---|
| KTREG[22] | Mask and Configuration | W |
| bits[5:0] | Front End CBR mask | |
| bits[9:6] | Cable modem Upstream Channel Number | |

CBR mask is to mask on/off CBR bits received from the control channel. QAM symbol usage bitmap based on downstream channel number in KTREG[36] bits [7:0] will be used to determine the mask pattern. The Upstream Channel Number is assigned by the downstream control channel. The downstream control channel will generate the "status bitmap" for this channel and give it to the upstream transmit block.

| | | |
|---|---|---|
| KTREG + 32 | Timing and control parameters | R |
| bits 15:0 | Available upstream channel frequency | |
| KTREG + 33 | Timing and control parameters | R |
| bits 7:0 | Available upstream channel number | |
| bits 9:8 | Available upstream channel bits per symbol | |
| bits 15:10 | Available upstream channel symbol rate | |
| KTREG + 34 | Timing and control parameters | R |
| bits 15:0 | Slot MaxTU | |
| KTREG + 35 | Timing and control parameters | R |
| bits 3:0 | Version | |
| bits 7:4 | Channel type | |
| bits 14:8 | Slot timer length | |
| bit 15 | Valid (timing and control parameter registers, KTREG[32–37] have valid contents | |
| KTREG + 36 | Timing and control parameters | W |
| bits 7:0 | My downstream channel number | |
| bits 15:8 | Number of payload bits in downstream channel based on KTREG[37] QAM symbol usage bitmap. Default is 5 in 64-QAM configuration. | |
| KTREG + 37 | Timing and control parameters | R |
| bits 15:0 | QAM symbol usage bitmap based on downstream channel number in KTREG[36] bits [7:0] | |

Timing and control parameters are the information contained in control frame with the subcode 0x8001. Several fields are not directly sent through the subcode 0x8001 and are either generated by the hardware, or are obtained by some processing on the subcode 0x8001 frame.

KTREG[35], bits 14:8, (Slot timer length) is determined by the DCD 805. It is the maximum count of the slot timer field.

KTREG[36], bits 7:0 (cable modem downstream channel #), KTREG[36], bits 15:8 (number of payload bits), and KTREG[37], bits 15:0 (QAM symbol usage) are tied together to serve a common purpose. That purpose is to determine the number of payload bits within each symbol. For example, when using 64-QAM, the cable modem 113 receives 6 bits in each symbol. 1 bit is the control channel and 5 bits are the payload data. In an alternative embodiment there may be 1 bit of control, 2 bits of non payload data, and 3 bits of payload data with each symbol.

A control frame having the subcode 0x8001 transmits a QAM symbol usage bitmap associated with each downstream channel. The microprocessor 302 determines the downstream channel and write it into KTREG+36[7:0]. The control circuit 301 filters information and provides the QAM symbol usage bitmap associated with the downstream channel at KTREG+37[15:0]. The microprocessor 302 reads KTREG+37 and determines the number of payload bits. The microprocessor 302 then writes the number of the payload bits into KTREG+36[15:8]. The default value for 64-QAM is five (one bit control, five bits payload data, zero bits non payload data).

KTREG+35 bit 15 is the validation bit for all "timing and control parameters". The control channel makes sure all the data on KTREG[32–37] are valid then it qualifies them with a "1" on KTREG+35[15]. The microprocessor 302 always checks this bit once immediately before, and once immediately after reading any of the above discussed parameters. That prevents an invalid parameter from being read and used.

State Machines

Each device is controlled by a dedicated state machine. The microprocessor 302 controls the state machines by controlling hardware flags inside the control circuit 301. The various device state machines also communicate their status to the microprocessor 302 by controlling hardware flags. These hardware flags are stored in registers in the control circuit 301. All the state machines run simultaneously. Each state machine waits for a "Green Light" control flag from the firmware. There are two general categories of state machines controlling the various devices that interact with the RAM 309 through the BAPC 825 of the control circuit 301. The first category of state machines do processing on a single packet of data and go back to their idle state and wait for the next green light signal to work on the next packet. The state machine in the first category are the cipher state machine (for the CD 811), the upstream state machine (for the UD 809), the RAM to LAN state machine (for RTL 819), and the LAN to RAM state machine (for the LTR 815). The second category of state machines do work autonomously on several packets in sequence with little intervention from the microprocessor 302. The state machines in this category are the downstream payload state machine (for the DPD 807) and the down stream control state machine (for the DCD 805). For the first category, once the "Green Light" is given, the state machine performs its single task and returns back to the waiting state for the next "Green Light". Some state machines are further composed of several other parallel state machines. One main state machine controls other sub state machines to perform the sub tasks of the main task assigned to this state machine.

Figure 15:
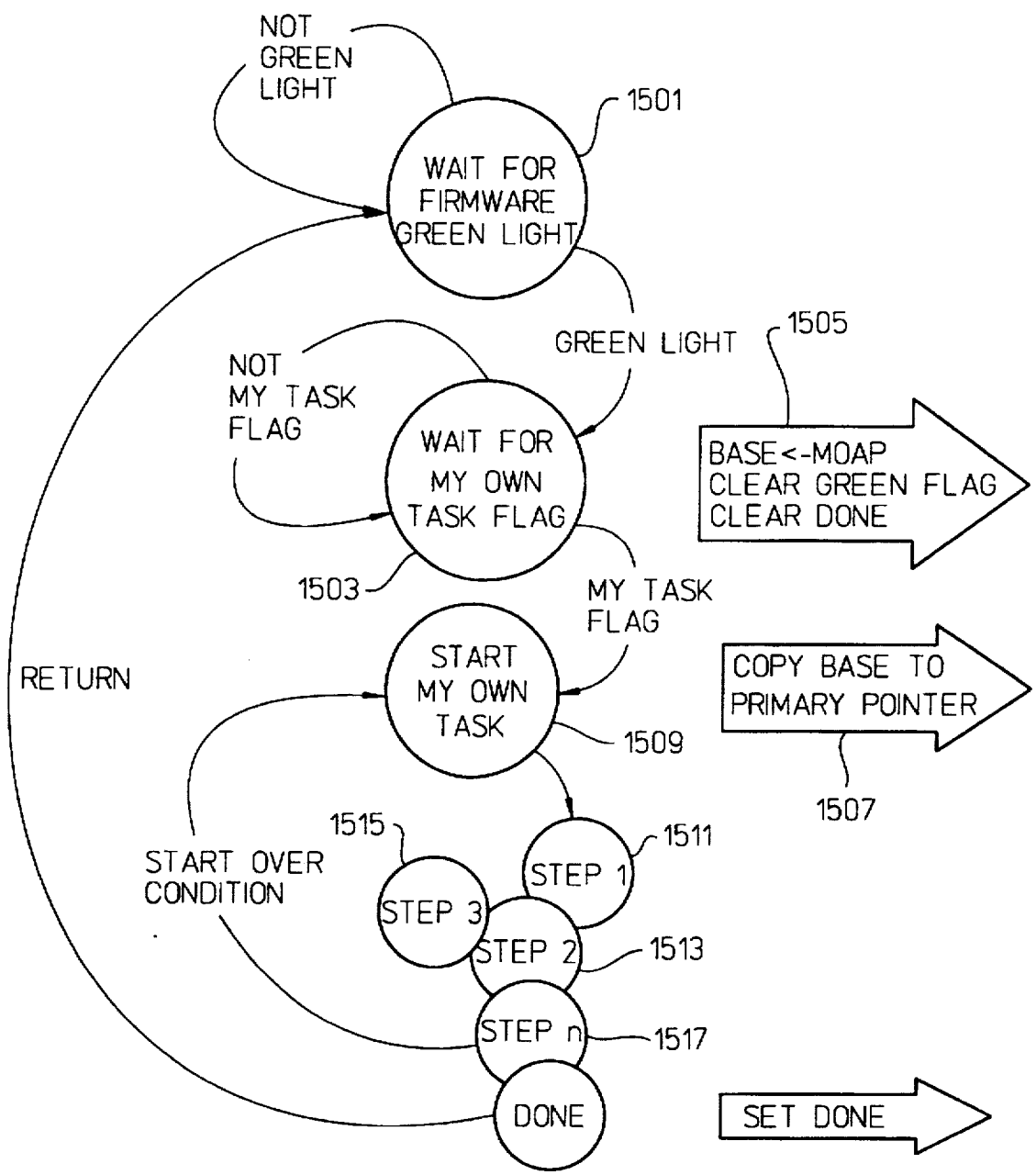
FIG. 15 is a "bubble-diagram" of the general form of first and second categories of state machines.

FIG. 15 is a "bubble" diagram of the general form of first and second categories of state machines. The state machine waits for the microprocessor 302 to give it a go ahead or a "Green Light" signal, state 1501. This is normally an indication that a buffer in the common RAM 309 is ready to be used and the MOAP 827 entry for this buffer is valid.

Figure 16:
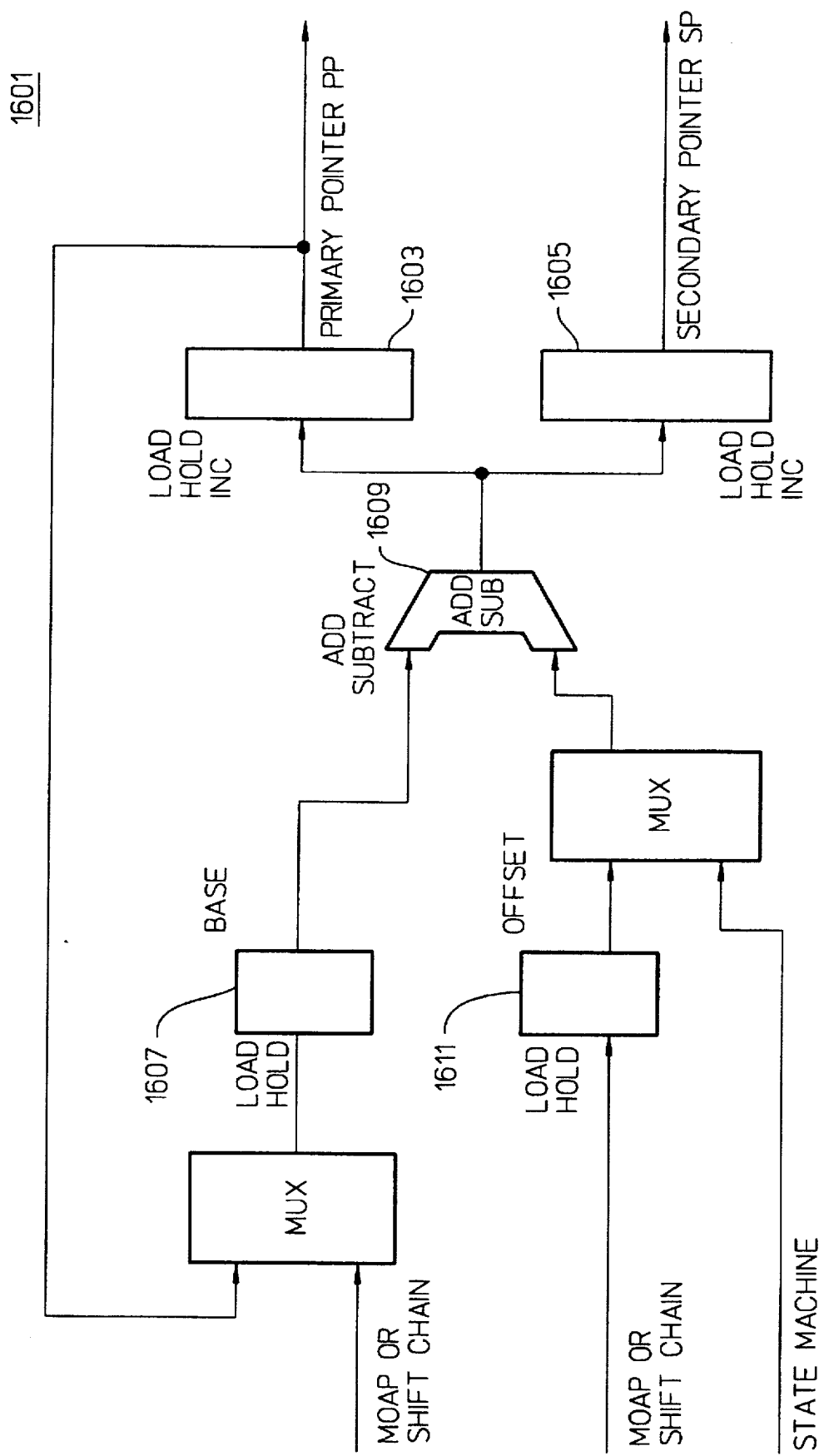
FIG. 16 is a schematic of the generalized data path 1601 of address registers of the component devices of the control circuit of the cable modem according to the present invention.

FIG. 16 is a schematic of the generalized data path 1601 of address registers of the devices 805, 807, 809, 811, 813, 815, 817, and 819. Not all devices require the full fledged structure of FIG. 16. A primary pointer 1603 and a secondary pointer 1605 store addresses to the next location in the RAM 309 to be processed by the device. The pointers 1603 and 1605 are subject to three operations: hold, load, and increment.

Generally, the pointers 1603 and 1605 are loaded from an addition by adder/subtractor 1609 of a base register (or base pointer) 1607 and an offset 1611. The base pointer 1607 is either loaded from the MOAP 827 register for the device or, in the case of devices that do not have base pointers in the MOAP 827, from the shift chain registers, or from the primary pointer 1603. Case of loading from the primary pointer 1603 is for example when a CRC error is encountered and the primary pointer 1603 must be reset to the beginning of packet pointed by the base pointer 1607, effectively discarding the packet. The adder/subtractor 1609 is for the case of the cipher device 811 which moves the pointer four words back for a read operation.

Alternatively, the same result is achieved by not using an adder, subtractor and associated mux, by directly connecting the output of the base pointer to the input of the PP 1603 and SP 1605, and adding a decrement operation to the PP 1603 and SP 1605. In that alternative the state machine can issue inc, and dec instructions to the PP 1603 and SP 1605 and achieve the same result. However, the latter alternative requires more number of clock cycles than the embodiment shown in FIG. 16.

Returning to FIG. 15, upon receiving the "Green Light" signal, the state machine proceeds to the next step which is generally to wait for its own task flag to become valid, state 1503. For example, a state machine which downloads the payload from the cable waits here for a new payload packet to become available before proceeding further. Some state machines bypass this step and go to the next step directly. For example, the cipher state machine does not have to wait here for its own task flag, because, the "Green Light" from the microprocessor 302 is an indication of both a valid buffer and a valid task. The first step in performing a particular task is to copy the beginning address of the buffer from the MOAP 827 into the state machine's base register, clear the "Green Light" signal to tell the microprocessor 302 it has grabbed the address of the packet so that the microprocessor 302 can go ahead and copy the address of a new packet in the MOAP 827, and clear the DONE bit for the packet, task 1505. Clearing the done bit is a very important handshake task between the microprocessor and the device. The microprocessor can monitor the process of consecutive packets by setting and monitoring the "Green Light" flag in the first category of state machines. When the state machine clears the flag, it means it finished its processing of the previous packet and is working on the current packet. Therefore, the microprocessor 302 does not need to inspect the DONE flag. If the microprocessor 302 does not wish to arrange a new packet, it simply can monitor the DONE bit to find out when the processing on the last packet has finished.

The next task is to copy the base pointer to the primary pointer, task 1507, and proceed with the state machine's specific task, state 1509. The reason for keeping the value of the base pointer is the fact that CM 113 may have to abort the current job due to some error. In that case CM 113 can always go back to the beginning of the packet and reuse the buffer. This condition is shown as "start over condition" transition in FIG. 16. Also, for some tasks the state machine needs to start over from the beginning of the header and add some new information into the header. This is done by copying the base pointer into the secondary pointer and using the secondary pointer. A typical case is the case of the downstream payload state machine 807 which writes the packet's multicast address's hash value into the header while receiving the rest of the packet. Also, when a device starts processing a new packet, it writes the byte count of the previous packet to its header.

The state machine then proceeds to the next step which is performing its own specific task, shown in FIG. 15 as overlapped states 1511, 1513, 1515, 1517. During execution of this task, the state machine may inform its progress to the microprocessor by setting status flags. Also, the state machine may also activate other sub state machines to perform some sub tasks in parallel. In general, when a task is done, the state machine sets a "DONE" flag, state 1519 and task 1521, and returns back to the waiting state for the next task, transition "return".

Front End Preprocessor

Returning to FIG. 8, the I and Q signals are input into the Front End Preprocessor (FEP) 801 of the control circuit 301. The FEP 801 decodes the I and Q QAM signals and decodes these into a symbol vector that is transmitted from the FEP 801 to a Front End Serializer (FES) 803. The Symbol data path from FEP 801 to FES 803 is an eight-bit data path.

The FEP 801 can accept either 64-QAM or 256-QAM signals. A flag bit Q256 is input to FEP 801 to control whether FEP 801 treats the I and Q signals as 64-QAM or as 256-QAM For 64-QAM, 3 bits of the I and Q signals, bits 0 to 2, are used and the Symbol vector to FES 803 is a six-bit vector corresponding to bit 7 and bits 4 to 0 of the Symbol line. For 256-QAM, 4 bits of the I and Q signals are processed by the FEP 801, and the Symbol vector is an eight-bit vector. For both 64-QAM and 256-QAM bit seven is the control channel bit.

The FEP 801 also outputs a baud-pulse. The baud-pulse is a one clock cycle wide pulse generated once per symbol. In the preferred embodiment, the symbols are received at a rate of 5M Symbols/sec and the baud_pulse has a duration of 25 nsec.

Front End Serializer

The Front End Serializer (FES) 803 receives the Symbol and Baud Pulse from the Front End Preprocessor 801 and partitions the Symbol vector into two serial streams. Symbol bit 7 is the control stream ("Cont_Out"). The Cont_Out stream is clocked out and applied to the Downstream Control Device 805 at the symbol rate (baud_pulse=5M bits/sec).

The second stream is the stream with payload data. This stream "P1_Dat" is derived from Symbol [0:4] for 64-QAM and from Symbol[0:6] for 256-QAM. The P1_Dat stream is transferred into the Downstream Payload Device 807 at a rate of 40M bits/sec. The P1_Dat stream is qualified with the signal "plse" (Payload Shift Enable), which is also fed into the Downstream Payload Device. By so qualifying the P1_Dat stream, only those bits that are payload are shifted into the Downstream Payload Device 807.

The Front End Serializer 803 also contains circuitry for descrambling the payload stream prior to transferring the payload stream to the Downstream Control Device 805.

Downstream Control Device

The Downstream Control Device 805 is a state machine controlled device that provides the following functions. It manages its own buffer in the RAM 309. The extent of its buffer range is determined by the microprocessor 302 which sets DSCTOB and DSCBOB registers. As the Downstream Control Device writes data into the RAM 309 buffer it maintains a write pointer DSCWP register indicating its current location. The microprocessor 302 maintains a Read pointer DSCRP indicating where it has read to.

The Downstream Control Device 805 continuously writes into the buffer until the DSCWP hits the end of the buffer as indicated by the DSCBOB register. The Downstream Control Device 805 then continues writing at the beginning of buffer, sets a flag DSCWRAP to indicate that it has done so.

The Downstream Control Device 805 continues writing into the buffer until the DSCWP is equal to the DSCRP indicating that it is about to overwrite not yet processed packets.

The Downstream Control Device 805 is connected to the Upstream Device 809 and the Transmitter Backend 821 and provide those devices with acknowledgment and timing signals. For many upstream messages the Upstream Device 809 will resend the message unless there is an acknowledgment received from the SCS 101. The Downstream Control Device 805 parses out such acknowledgments from the cont_out stream and transmits the acknowledgment to the Upstream Device 809. The Downstream Control Device 805 detects the on the cont_out stream the SYNC fields that indicate beginning of slots and of frames. The Downstream Control Device 805 also detects when time slots on the upstream channel are contention slots and sends that information to the Upstream Device 809.

The Downstream Control Device 805 also provides reservation information to the Upstream Device 809. Thus, if the Upstream Device 809 has been charged with sending a packet that is longer than MaxTU, it must wait for a reservation from the SCS 101. The Downstream Control Device 805 parses out the reservation grant and the number of time slots to wait before transmitting from the cont_out stream and provides this information to the Upstream Device 809.

Additional tasks for the Downstream Control Device 805 include:
  Provide downstream usage bitmap for the downstream channel.
  Provide status information to the microprocessor.
  Maintain status and error information for the microprocessor.
  Store downstream commands to the common RAM for processing only after verification that the command is intended for the cable modem.

Downstream Payload Device

The Downstream Payload Device 807 is a state machine controlled device for transferring downstream payload data packets from the Front End Serializer 803 into the RAM 309. The DPD 807 is controlled by the microprocessor through internal registers such as the top-of-buffer (PTOB), Bottom-of-Buffer (PBOB), Read and Write Pointers. The DPD 807 manages its own buffer using the technique discussed above for the Downstream Control Device 805.

Downstream Payload Device 807 is connected to the Front End Serializer 803 through two lines, the p1_dat line and the p1se line. The p1_dat line is a serial data stream containing the payload data. The data stream on the p1_dat line is shifted into the DPD 807 using a one pulse/bit pulse on p1se line.

The microprocessor 302 gives the DPD 807 its "green light" by setting an internal register flag. By giving the DPD 807 a green light the microprocessor 302 indicates to the DPD 807 that the buffer registers (PTOB, PBOB, PRP, and PWP) for the DPD 807 have been set and that the DPD 807 may commence transferring data into the RAM.

The Downstream Payload Device 807 then checks the p1_dat data stream for a SYNC flag. Payload data packets adhere to the frame format shown in FIG. 6(c). The first field 751 in a payload frame is a one-byte SYNC flag having the bit pattern "01111110" (six ones framed by two zeros). When there is no data to transmit on the payload channel, the SCS 101 transmits a continuous series of SYNC flags. Therefore, the DPD 807 knows that when it is receiving a SYNC flag followed by a SYNC flag, it is not receiving true payload data.

When the DPD 807 has detected a true payload data packet, it begins copying the data frame into the RAM 309 using the BAPC 825. The DPD 807 maintains two pointers into the RAM 309: a primary pointer PP and a secondary pointer SP.

The second field of the payload data packet is the modem MAC address 753. This address 753 may be a multicast address. If the address is a multicast address it matches one of the CM's 113 stored hash values for multicast address to which the CM 113 subscribes. The DPD 807 carries out the hash computation of the MAC address in parallel with writing packets into an elastic buffer internal to the DPD 807. The DPD 807 writes the hashed value into a RAM 309 location in packet header 1405 pointed to by the SP. The DPD 807 starts to write the payload data from the elastic buffer to the RAM 309 after MAC address verification.

The DPD 807 also contains an internal look-ahead shift register in which it receives the p1_dat data stream. The DPD 807 transfers data from the p1_dat data stream into the look ahead shift register which holds several bytes of data at a time. By always storing a few bytes of data in the look ahead shift register, the DPD 807 is able to "look ahead" before writing to the elastic buffer and eventually to the RAM 309.

The look ahead is useful to determine the length of the packet. A payload data packet may have an unspecified length. While receiving the message field 763 the DPD 807 keeps a count of how many bytes it has received. Not until after receiving the end of the packet is the message length known. By looking ahead the DPD 807 can detect the SYNC flag of the next packet and thereby know the length. This packet length is stored by the DPD 807 by using the SP while allowing the PP to be used to store the next packet.

Also when the SYNC flag has been detected, the DPD knows that the CRC field 765 has just been received. The DPD then compares the cyclic redundancy check to determine if the packet was received accurately. If the CRC check fails, the DPD sets an error flag for the microprocessor 302.

Upstream Device

The Upstream Device 809 is a state machine controlled device in charge of sending packets on the upstream channel. The Upstream Device 809 is connected to the transmitter backend 821. Bits of data are clocked out of the UD 809 into the transmitter backend 821 one bit at a time on a bit request pulse provided the UD 809 by the transmitter backend 821.

The microprocessor 302 initiates the activity of the UD 809 by setting the corresponding "green light" register and by placing the RAM 309 packet address in the MOAP 827 register for the UD 809. The UD 809 can transmit in one of three modes: "transmit-with-reservation", "transmit-on-no-contention-channel", and "transmit-on-contention-channel". There is a corresponding "green light" register for each.

Figure 17A:
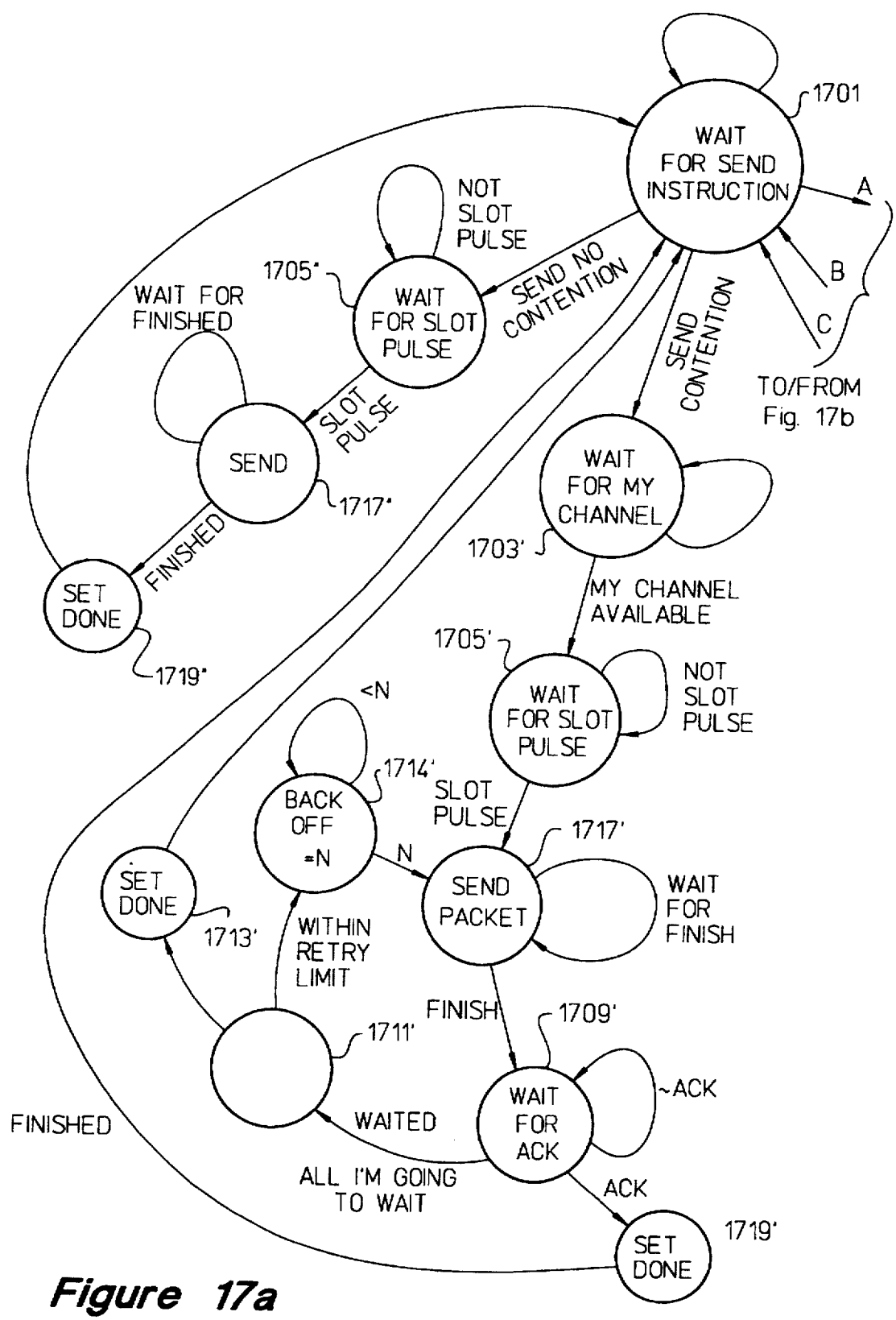
FIG. 17 is a "bubble-diagram" of the state machine that controlls the Upstream Device.
Figure 17B:
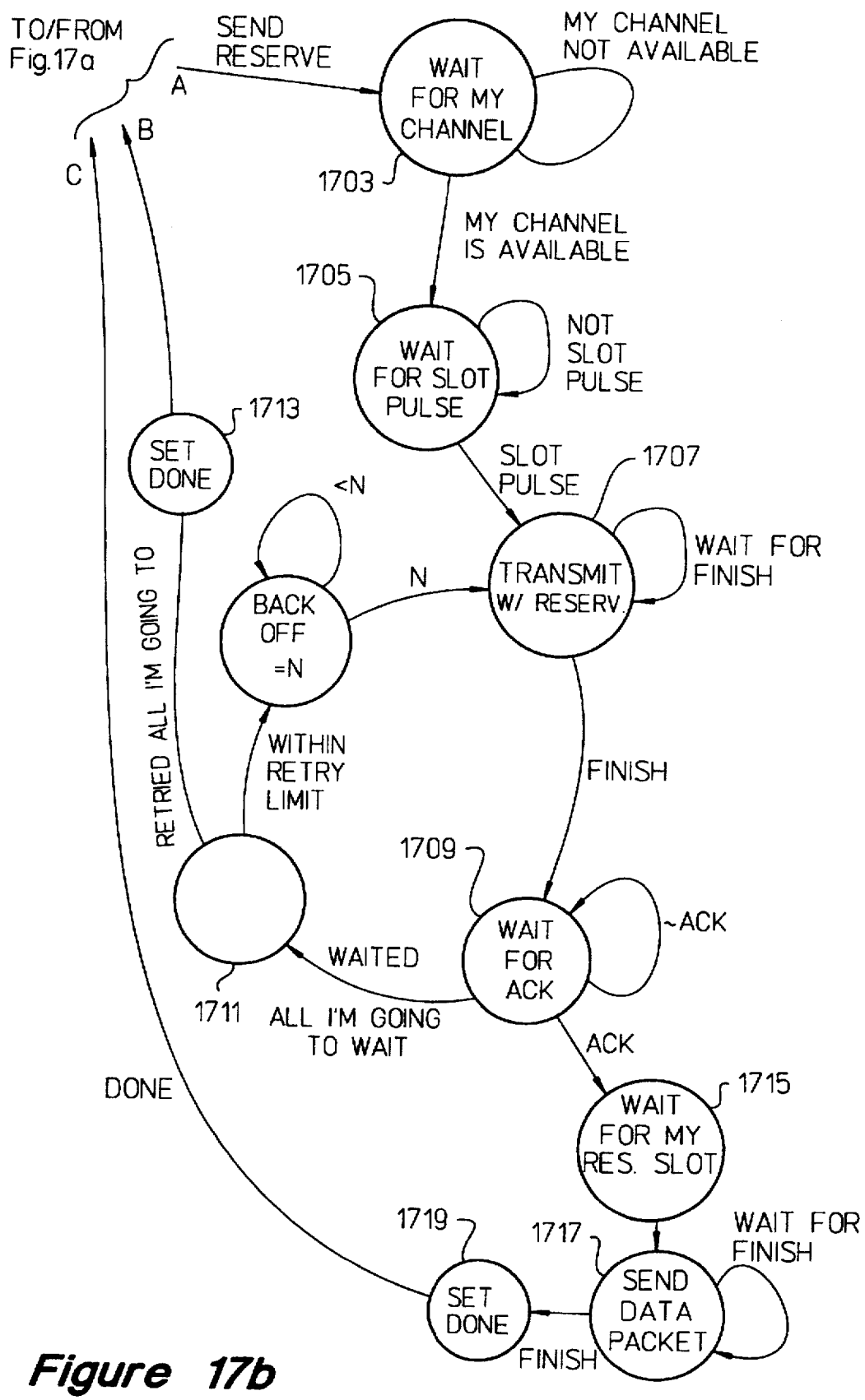

FIG. 17 is a "bubble-diagram" of the state machine for the Upstream Device 809. State 1701 is an idle state in which the UD 809 waits for an instruction to send a message in one of three modes: "transmit-with-reservation", "transmit-on-no-contention-channel", and "transmit-on-contention-channel". There is a branch in the state machine for each of these.

The "transmit-with-reservation" branch begins with waiting for availability of the particular upstream channel on which the CM 113 is transmitting, state 1703. A frame in the control channel for every time slot contains a channel/slot status subframe type frame. That frame includes a Channel Occupancy Bitmap (see table 1). The channel occupancy bitmap is transmitted from the DCD 805 to the UD 809.

When the UD 809 detects that its channel is vacant in the next slot, it moves onto wait for that next slot to begin, state 1705.

From state 1705, when the UD 809 has detected the next slot, as indicated by a slot pulse from the DCD 805, the UD 809 progresses to transmit the data by interacting with the transmitter backend 821 and waits for the transmission to finish, state 1707, and waiting for an acknowledgement from the SCS 101, state 1709. The acknowledgement is also received on the control channel and is transmitted to the UD 809 from the DCD 805.

The UD 809 has a set limit for how long to wait for an acknowledgement. The expected latency between sending a message and receiving an acknowledgement is a function of the distance between the CM 113 and the SCS 101. At installation that latency is unknown. Therefore, the first time the CM 113 attempts to send a packet it will wait for one millisecond, which is more than an adequate amount of time for the SCS 101 to acknowledge a successful receipt of a data packet. When the CM 113 receives that first acknowledgement, it stores in EEPROM as well as in an internal register that latency. For subsequent transmits, the UD 809 waits this known expected latency.

If the UD 809 does not receive the acknowledgement within the time limit, it either retries the transmit or aborts, state 1711. There is a fixed number of allowed retries, which is a programable parameter. If the UD 809 has not exceeded that limit, it first backs off to avoid another collision, state 1714, and then retransmits, state 1707.

If the UD 809 has hit its upper limit for retries, it aborts, and sets the Done flag, to indicate to the microprocessor 302 that it has finished processing and awaits another instruction, state 1713. The UD 809 also sets an error flag to indicate the transmit failure. Doing so allows the microprocessor to take appropriate action, e.g., initiate a change in upstream channel, or issuing an error report to the PC 115.

When having received the acknowledgement in the "transmit-with-reservation" branch, the acknowledgment indicates the number of time slots to wait. In the state 1715 the UD 809 waits that many number of slots, state 1715, starts transmission (by invoking a main transmission state machine, not shown) of the reserved data packet and waits for the transmission to finish, state 1717, and sets the Done flag, state 1719, and returns to the idle state, 1701.

A second branch of the UD 809 state machine is the "transmit-on-contention" branch. The second branch is essentially a subset of the first branch with a few minor differences. The states of the second branch that correspond to states in the first branch are indicated using the same reference numeral with an appostrophy added. Only differences between the two are discussed.

State 1707' differs from state 1707 in that a packet without a reservation request is sent. State 1709' differs from state 1709 in that on receiving an acknowledgment the UD 809 transitions directly from state 1709' to state 1719'.

The third branch of the state machine for UD 809 is the "transmit-no-contention" branch. When the CM 113 knows that it has to transmit a number of discontinuous data packets that in total exceed the MaxTU length, the CM 113 may make a reservation for the total number of time slots required to transmit this collection of data packets. To do so it would first execute a "transmit-with-reservation" branch of the state machine for UD 809. At the conclusion of it, the UD 809 lowers the "green light" which allows the microprocessor 302 to reset the MOAP pointers for the UD. When having done so, the microprocessor 302 issues a "transmit-no-contention" instruction because it knows that there are still time slots remaining on the intial reservation. As soon as the UD 809 transitions from state 1719 to the idle state 1701, it notices the "transmit-no-contention" instruction and transitions to the corresponding branch, namely at state 1705". State 1705" is like state 1705. Having received the slot pulse the UD 809 sends the data packet, state 1717", but does not wait for an acknowledgment. Having completed the transmission of the data packet, the UD 809 sets the Done flag, state 1719".

Cipher Device

The Cipher Device 811 is a state machine controlled device connected to the MOAP 827, the Bus Arbitration and Priority Circuit 825, and via the Cipher Chip Interface 813 to the Cipher Chip 311. The Cipher Device 811 retrieves data packets from the RAM 309 via the BAPC 825, routes these to the Cipher Chip 311 (via the CCI 813) for encryption or decryption (as applicable), receives the processed data from the Cipher Chip 311, and causes the resulting encrypted/decrypted data to be stored back into the RAM 309.

Figure 18:
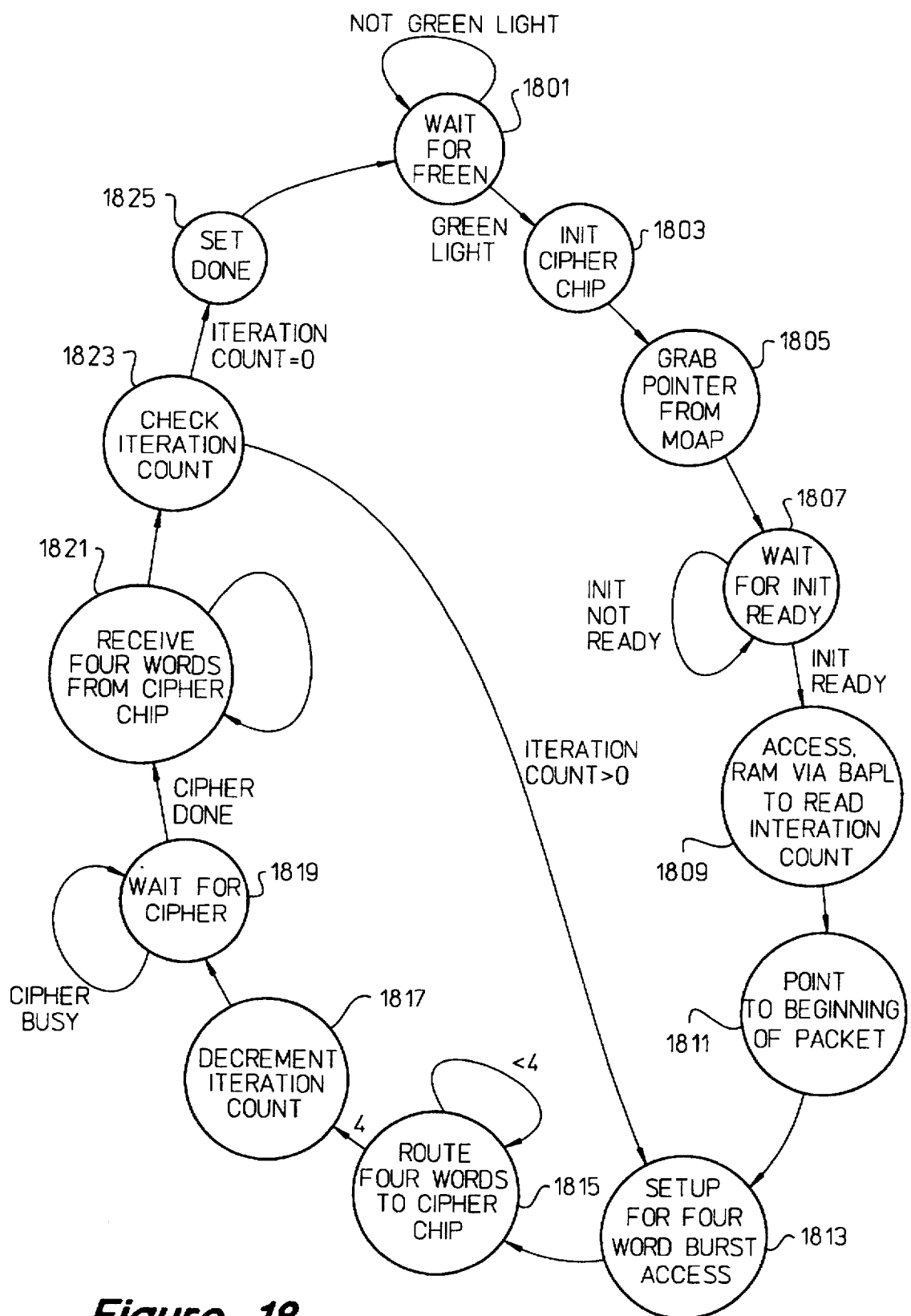
FIG. 18 is a "bubble-diagram" of the state machine that controls the Cipher Device.

FIG. 18 is a "bubble-diagram" of the state machine that controls the Cipher Device 811. In a first state, state 1801, the Cipher Device 811 is idle and waits for the green light from the microprocessor 302. The microprocessor, upon detecting the need to encrypt or decrypt a data packet, for example, at the direction of the end-user program running on the PC 115 or as indicated by the E bit 755, sets up the MOAP 827 pointers for the Cipher Device 811 to point to the data packet in RAM 309. MOAP 827 register 2 points to the iteration count word 1407 in the packet header, which indicates the number of eight-byte data blocks contained in the packet, and MOAP 827 register 3 points to the beginning of data blocks to be encrypted or decrypted.

When the Cipher Device 811 receives the green light, indicated by the microprocessor 302 setting the check register 1401 corresponding to the Cipher Device 811, the Cipher Device 811 initiates the initialization procedure of the Cipher Chip 311, state 1803. The Cipher Device does not wait for the initialization to complete. The Cipher Device 811 then copies the MOAP 827 pointers into Cipher Device 811 internal registers, state 1805, and, then, waits for the initialization of the Cipher Chip 311 to complete, state 1807. When the Cipher Chip 311 has initialized, the Cipher Device 811 retrieves the iteration count from the RAM, state 1809, and moves its primary pointer to point to the beginning of the data packet, state 1811.

To obtain a good encryption several words are encrypted at a time. In the preferred embodiment, the Cipher Chip 311 operates on four-word (eight byte) blocks of data at a time. Therefore, in state 1813 the Cipher Device 811 sets up its address register 1203 and counter register 1201 for burst mode access of the RAM 309, and in state 1815, the Cipher Device 811 accesses the RAM 309 via BAPC 825 four times to route four data words from the packet into the Cipher Chip 311.

In state 1817, the Cipher Device 811 decrements the iteration count. In state 1819 the Cipher Device 811 waits for the encryption/decryption to be concluded by the Cipher Chip 311. Next, the Cipher Device 811 arranges for the transfer of the data block from the Cipher Chip 311 to the RAM 309, and then waits for the Cipher Chip 311 to conclude the the transfer of the four encrypted/decrypted words back to the RAM 309, state 1821.

Having written the encrypted/decrypted data back to the RAM 309, if the iteration count is greater than zero, the Cipher Device 811 causes the same operation to repeat on the next four-word block by returning to state 1813. If the iteration count is zero, the Cipher Device sets the Done flag, state 1825, and returns to wait for the next green flag from the microprocessor 302.

LAN-To-RAM

The LAN-To-RAM device (LTR) 815 is connected to the MOAP 827, the Bus Arbitration and Priority Circuit 825, and via the LAN interface 817 to the LAN Chip 307. The LTR 815 causes the transfer of data packets from the LAN Chip 307 to the RAM 309. When the LAN Chip 307 has data to transfer, the LAN Chip 307 raises a signal on the LAN Interface 817, which the LAN Interface 817 retransmits to the microprocessor 302 via an internal register. The microprocessor 302 sets the MOAP 827 pointer to indicate the location in RAM 309 for the LTR 815 to store the packet, and turns on the "green light" for the LTR 815 to commence transferring data from the LAN Chip 307 to the RAM 309.

Upon receiving its "green light" from the microprocessor 302, the LTR 815 uses its MOAP 827 pointer and the BAPC 825 to transfer the packet into the RAM 309. When done the LTR 815 raises its done flag, which is a signal to the microprocessor 302 to transfer control of the packet to one of the other devices, e.g., the Upstream Device 809, for direct transmission, or to the Cipher Device 811, if the packet needs encryption.

RAM-To-LAN

The RAM-to-LAN device (RTL) 819 is connected to the MOAP 827, the Bus Arbitration and Priority Circuit 825, and via the LAN interface 817 to the LAN Chip 307. The RTL 819 causes the transfer of data packets to the LAN Chip 307 from the RAM 309. When a packet in RAM 309 is ready for transfer (i.e., it has been received by the Downstream Device 807 and decrypted by the Cipher Device 811) to the LAN Chip 307, the microprocessor 302 sets the MOAP 827 pointer to indicate the location in RAM 309 for the RTL 819 to retrieve the packet, and turns on the "green light" for the RTL 819 to commence transferring data to the LAN Chip 307.

Upon receiving its "green light" from the microprocessor 302, the RTL 819 uses its MOAP 827 pointer and the BAPC 825 to transfer the packet to the LAN Chip 307. When done the RTL 819 raises its done flag.

Interface Devices

As shown in FIGS. 3 and 8, the control circuit 301 interacts with several external devices, e.g., the tuner 303, the transmitter 305, the cipher chip 311, the LAN chip 307, and the RAM. Each of these devices have different timing requirements and different i/o configurations. However, the microprocessor 302 and the bus arbitration and priority circuit 825 have uniform interfaces to these other components. For example, the interface and timing between the devices that control the interaction between these external components and the BAPC 825 is shown in a generalized form in FIGS. 9 and 10.

To achieve the uniformity in interface between the BAPC 825 and the devices, each device has an interface unit. The interface unit for the Cipher Device 811 is the Cipher Chip Interface 813; the interface unit for the LAN-to-RAM Device 815 and RAM-to-LAN 819 is the LAN Interface 817.

For each device the corresponding interface unit consists of a thin hardware translation layer. The interface unit has two sides. The first side, which communicates with the bus arbitration and priority circuit 825, is illustrated in FIG. 9. The second side of the interface unit contains a section that interfaces with the external component, e.g., the LAN Chip, and another section that interfaces with the microprocessor 302.

Each interface unit contains a state machine to manage the timing differences between the two sides of the interface unit. The interface unit, as directed by its internal state machine, transfers data from the device side, e.g. LTR 815, to the component (e.g., the LAN Chip 307) side of the interface unit with appropriate handshake translation as required by the particular external component it is connected to. For example, in the case of the Cipher Chip 311, an address is generated for each word transfered.

Once a REQ is issued, the bus arbitration and priority circuit 825 assumes the device is always ready for that request. Therefore, the state machine inside the interface unit must set the RD_ready and WT_ready signals when it is prepared to accept the read and write transactions. The bus arbitration and priority circuit 825 state machine enters the REQ state when it sees the ready signal from the interface unit.

Adding these thin hardware translation layers provides flexibility to the control circuit 301 design. The bus arbitration and priority circuit 825 is designed without taking into consideration the specifics of each peripheral design. Accordingly, alternative embodiments having different external components may differ from one another. Such differences can be accomodated by changing the corresponding interface units.

Conclusion

Exemplary and preferred embodiments of the present invention have been described herein. There are many alternatives to these embodiments. For example, in FIG. 2 a Signal Conversion System 101 is described as having a shared bus based architecture and in FIG. 8 a Cable Modem 113 is described as having many parallel state machine-controlled devices operating on a shared memory 309. A first alternative embodiment of the SCS 101 incorporates the design of the Cable Modem 113. In the first alternative SCS, where the CM 113 uses a QPSK transmitter 305, the alternative SCS uses a 64-QAM transmitter; where the CM 113 uses a 64-QAM receiver, the alternative SCS uses a QPSK receiver; and rather than a LAN Chip 307, the alternative SCS uses a router interface. In the first alternative embodiment of the SCS, the LTR 815 and RTL 819 are replaced with interfaces between the RAM and the router interface.

As a person skilled in the art will realize that numerous modifications and changes may be made to the present invention, it is not desired to limit the invention to the exact construction and operation as illustrated and described. Hence, all suitable modifications and equivalents may be resorted to as falling within the scope of the invention.

We claim:

1. A parallel processing system for a high speed data communications modem, comprising:
   a. a first state machine controlled device that performs a first data communication function;
   b. a first register set addressable by said first device;
   c. a second state machine controlled device that performs a second data communication function;
   d. a second register set addressable by said second device;
   e. a microprocessor connected to said first and second register sets;
   f. a shared memory;
   g. a memory access arbitration unit connected to said first and second devices and to said shared memory, and operable to accept a memory access request from each of said first and second devices during each clock cycle of the parallel processing system and to access said shared memory in response to said memory access requests and;

h. a register file connected to said microprocessor and to said first and second devices, said register file containing a pointer to an area of said shared memory for storing data associated with said first data communication function and a pointer to an area of said shared memory for storing data associated with said second data communication function, said first and second pointers beina initialized by said microprocessor and said pointers beina provided to said memory access arbitration unit by said first and second devices as part of said memory access requests.

2. A memory access device connected to a plurality of communication processing devices and a memory, operable to provide memory access to each of said communication processing devices at an average rate of one memory access per clock cycle, comprising:

a. a first pipeline stage for accepting a memory access request from each of said communication processing devices during a clock cycle, the first pipeline staae having:
      i. a priority encoder operable to select one of said plurality of communication processing devices for next access to said memory,
      ii. a plurality of address registers, each corresponding to one of said communication processing devices, each containing an address in said memory to be accessed by said corresponding [processor] communication processing device, and
      iii. a plurality of acknowledgment lines each connecting said priority encoder with one of said address registers,
      iv. wherein said priority encoder causes an acknowledgment signal to be transmitted on said acknowledgment line connecting said priority encoder to said address register corresponding to said selected communication processing device;

b. a second pipeline stage, connected to said first pipeline stage by a first plurality of pipeline registers, wherein the address contents of said address registers are clocked into said first plurality of pipeline registers, said second pipeline stage having:
      i. a plurality of read registers, each corresponding to one of said communication processing devices,
      ii. a multiplexer, connected to each said pipeline register, operable to select contents of said pipeline register containing the address corresponding to said selected communication processing device; and c. a third pipeline stage, connected to said second pipeline stage by an address pipeline register, connected to said multiplexer, and having:
      i. a memory having a contents at each of a plurality of addresses, connected to said address pipeline register, wherein the contents of said address register provides an address to be accessed in said memory; and
      ii. a memory bus connected to said memory;
      iii. wherein said memory is operable to write the contents at said address to be accessed onto said memory bus.

* * * * *